United States Patent
Ohba et al.

(10) Patent No.: US 6,501,754 B1
(45) Date of Patent: Dec. 31, 2002

(54) SCHEME FOR LABEL SWITCHED PATH LOOP DETECTION AT NODE DEVICE

(75) Inventors: Yoshihiro Ohba, Kanagawa (JP); Junichi Takahashi, Tokyo (JP); Shigeo Matsuzawa, Tokyo (JP); Yasuhiro Katsube, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/131,361

(22) Filed: Aug. 7, 1998

(30) Foreign Application Priority Data

| Aug. 8, 1997 | (JP) | ............................................. 9-214842 |
| Dec. 8, 1997 | (JP) | ............................................. 9-337333 |
| Dec. 24, 1997 | (JP) | ............................................. 9-354807 |
| Jan. 13, 1998 | (JP) | ........................................... 10-005044 |

(51) Int. Cl.$^7$ .......................... H04L 12/28; H04L 12/50
(52) U.S. Cl. ........................ 370/389; 370/392; 370/396
(58) Field of Search ................................ 370/351, 363, 370/389, 395.1, 397, 399, 395.3, 395.52, 395.6, 400, 392, 396

(56) References Cited

U.S. PATENT DOCUMENTS

| 4,736,363 | A | | 4/1988 | Aubin et al. .................. 370/60 |
| 5,265,092 | A | | 11/1993 | Soloway et al. ............... 370/60 |
| 5,483,525 | A | * | 1/1996 | Song et al. ..................... 370/60 |
| 5,822,319 | A | | 10/1998 | Nagami et al. .............. 370/392 |
| 6,055,561 | A | * | 4/2000 | Feldman et al. ............ 709/200 |
| 6,069,889 | A | * | 5/2000 | Feldman et al. ............ 370/351 |
| 6,130,889 | A | * | 10/2000 | Feldman et al. ............ 370/397 |
| 6,148,000 | A | * | 11/2000 | Feldman et al. ............ 370/397 |
| 6,188,689 | B1 | | 2/2001 | Katsube et al. ............. 370/389 |

OTHER PUBLICATIONS

Cuneyt M. Ozveren, Robert Simcoe, and George Varghese, Reliable and Efficient Hop–by–Hop Flow Control, IEEE Journal on Selected Areas in Communications,vol. 13, No. 4, May 1995, pp. 642–650.*

T. Downey, "Overview of Tag Switching", 1997 Elec. Indus. Forum, Boston, May 6–8, 1997, pp. 61–66.

S. Murthy et al., "Loop–Free Internet Routing Using Hierarchial Routing Trees", Proc. of the IEEE Infocom '97, Apr. 7–12, 1997, vol. 1, pp. 101–108.

Y. Ohba et al., "MPLS Loop Prevention Mechanism", Network Working Group Internet–Draft, May 1999, pp. 1–32.

Luciani et al., "NBMA next Hop Resolution Protocol (NHRP)", Internet draft, (Feb. 6, 1998).

Viswanathan et al., "ARIS: Aggregate Route–Based IP Switching" Internet draft, (Mar., 1997).

Rosen et al., "A Proposed Architecture for MPLS", Internet draft, (May, 1997).

Doolan et al., "Tag Distribution Protocol", Internet draft, (Jul., 1997).

* cited by examiner

*Primary Examiner*—Alpus H. Hsu
*Assistant Examiner*—Toan Nguyen
(74) *Attorney, Agent, or Firm*—Foley & Lardner

(57) ABSTRACT

A node device and a label switched path loop detection method which are capable of detecting a label switched path loop efficiently and quickly are disclosed. In a node device for carrying out the label switching, an ingress node information is included in a message that is to be successively transmitted from the upstream side in order to set up a label switched path, and the fact that the message with the same ingress node information for the same packet flow will be received from a previous hop node that is different from before if the label switched path has a loop formed thereon is utilized. Also, at a time of transmitting a message for the purpose of setting up a label switched path, if a node at which the label switched path for that packet flow already exists on the upstream or downstream side is encountered, this already existing label switched path is traced along the same or opposite direction as the flow, and the label switched path is set up if no loop is detected after tracing to the end.

8 Claims, 32 Drawing Sheets m1=(INGRESS=R1,FLOWID=DEST,LABEL=a)
m2=(INGRESS=R1,FLOWID=DEST,LABEL=b)
m3=(INGRESS=R1,FLOWID=DEST,LABEL=c)
m4=(INGRESS=R1,FLOWID=DEST,LABEL=d)
m5=(INGRESS=R1,FLOWID=DEST,LABEL=e)

m1=(INGRESS=R1,FLOWID=DEST,LABEL=a)
m2=(INGRESS=R1,FLOWID=DEST,LABEL=b)
m3=(INGRESS=R1,FLOWID=DEST,LABEL=c)
m4=(INGRESS=R1,FLOWID=DEST,LABEL=d)
m5=(INGRESS=R1,FLOWID=DEST,LABEL=e)

m1=(INGRESS=R1,FLOWID=DEST,LABEL=a,HOPCOUNT=1)
m2=(INGRESS=R1,FLOWID=DEST,LABEL=b,HOPCOUNT=2)
m3=(INGRESS=R1,FLOWID=DEST,LABEL=c,HOPCOUNT=3)
m4=(INGRESS=R1,FLOWID=DEST,LABEL=d,HOPCOUNT=4)
m5=(INGRESS=R1,FLOWID=DEST,LABEL=e,HOPCOUNT=5)

m6=(INGRESS=R6,FLOWID=DEST,LABEL=f,HOPCOUNT=1)
m7=(INGRESS=R6,FLOWID=DEST,LABEL=g,HOPCOUNT=2)
m8=(INGRESS=R6,FLOWID=DEST,LABEL=h,HOPCOUNT=3)
m9=(INGRESS=R6,FLOWID=DEST,LABEL=c,HOPCOUNT=4)
m10=(INGRESS=R6,FLOWID=DEST,LABEL=d,HOPCOUNT=5)
m11=(INGRESS=R6,FLOWID=DEST,LABEL=e,HOPCOUNT=6)
m12=(INGRESS=R6,FLOWID=DEST,LABEL=c,HOPCOUNT=7)

m1=(INGRESS=R1,FLOWID=DEST,LABEL=d,HOPCOUNT=2)
m2=(INGRESS=R1,FLOWID=DEST,LABEL=e,HOPCOUNT=3)

(FLOWID=R5, INGRESS=R1, INGRESS LOCAL ID=1)

(FLOWID=R5, INGRESS=R1, INGRESS LOCAL ID=2)

FIG. 12

| 1BIT | 32BIT |
|---|---|
| MESSAGE TYPE | MESSAGE LENGTH |
| SOURCE NODE ADDRESS ||
| DESTINATION NODE ADDRESS ||
| INGRESS NODE ADDRESS ||
| INGRESS NODE LOCAL ID ||
| HOP COUNT ||
| FLOW TYPE | FLOW ID LENGTH |
| FLOW ID ||
| REQUEST ID ||
| LABEL ||
| ERROR CODE ||

ERROR CODE=1 (RESOURCE UNAVAILABLE)

ERROR CODE=2 (UNKNOWN LABEL)

ERROR CODE=3 (UNKNOWN FLOW TYPE)

ERROR CODE=4 (UNKNOWN FLOWID)

ERROR CODE=5 (REFUSED BY POLICY)

ERROR CODE=6 (HOPCOUNT THRESHOLD EXCEEDED)

ERROR CODE=7 (SAME FLOWID FOR SAME INGRESS INFO.)

FIG. 13

| FLOW ID | INGRESS NODE ADDRESS | INGRESS NODE LOCAL ID | INPUT SIDE LABEL | OUTPUT SIDE LABEL | HOP COUNT | INGRESS FLAG | EGRESS FLAG |

FIG. 17

| FLOW ID | INGRESS NODE ADDRESS | INGRESS NODE LOCAL ID | INPUT SIDE LABEL | OUTPUT SIDE LABEL | HOP COUNT | INGRESS FLAG | EGRESS FLAG | CONFIRMATION FLAG | m1 = (FLOWID=EGRESS[R1], LABEL=a, HOPCOUNT=1)
m2 = (FLOWID=EGRESS[R1], LABEL=b, HOPCOUNT=2)
m3 = (FLOWID=EGRESS[R1], LABEL=c, HOPCOUNT=2)
m4 = (FLOWID=EGRESS[R1], LABEL=d, HOPCOUNT=2)
m5 = (FLOWID=EGRESS[R1], LABEL=e, HOPCOUNT=3)
m6 = (FLOWID=EGRESS[R1], LABEL=f, HOPCOUNT=4)
m7 = (FLOWID=EGRESS[R1], LABEL=g, HOPCOUNT=3)

SCHEME FOR LABEL SWITCHED PATH LOOP DETECTION AT NODE DEVICE

BACKGROUND OF THE INVENTION

1. Field of the Invention

The present invention relates to a node device having a label switched path loop detection function and a label switched path loop detection method.

2. Description of the Background Art

In a network layer protocol in which IP (Internet Protocol) nodes are inter-connected on an NBMA (Non-Broadcast Multiple Access) network, there is a scheme for realizing high speed packet transfer called MPLS (Multi-Protocol Label Switching).

In the MPLS, specific "labels" are allocated to specific packet flows between nodes while a correspondence between an input side label and an output side label is stored at each node, and the label switching is carried out at each node by referring to this information, so that the IP processing can be omitted and a high speed packet transfer can be realized. For example, in the case where the link layer is ATM, VPI (Virtual Path Identifier)/VCI (Virtual Channel Identifier) will be used as a label. A route through which the packet flow is label switched will be referred to as a label switched path.

In the case of constructing the label switched path, the label allocation protocol is used. The label allocation protocol exchanges label allocation messages between nodes on a packet flow route in order to notify a correspondence between a flow identifier for identifying the packet flow in network global fashion and a label for identifying the packet flow in link local fashion.

Usually every time an IP packet passes through a node, a value of an TTL (Time To Live) field (or a hop limit field or their equivalents) within its packet header is decremented by one, and the IP packet is not forwarded any further when the TTL or the like becomes 0. In this way it is possible to prevent a packet to stay in the network indefinitely even when there is a loop in the route.

However, for a packet to be transferred by the label switched path, the IP processing will not be carried out at an intermediate node so that it is impossible to decrement the TTL or the like, and consequently the packet will not leave the label switched path forever if there is a loop in the label switched path. For this reason, it is necessary to provide a label switched path loop detection mechanism or a label switched path loop prevention mechanism in the label allocation protocol.

To this end, in the conventional label allocation protocol, the following two methods are available: (1) a method in which an information on a hop count from an ingress router which originated a label allocation message with respect to the packet flow is included in the label allocation message, and it is judged that a loop is present when the hop count exceeds a threshold (see Doolan et al., "Tag Distribution Protocol", Internet Draft, draft-doolan-tdp-spec-01.txt, May 1997); and (2) a method in which each node that forwards the label allocation message sequentially adds its own address to the label allocation message, and it is judged that a loop is present when the own address is already written in the received label allocation message (see Rosen et al., "A Proposed Architecture for MPLS", Internet Draft, draft-rosen-mpls-arch-00.txt, July 1997).

However, the above described method (1) has been associated with a problem that it takes a considerable amount of time until the loop detection because the presence of loop cannot be ascertained until the hop count exceeds the threshold.

Note that in this method if a loop is actually formed or not cannot be ascertained, and even if a loop is actually formed, it is impossible to ascertain a node at which a loop is formed.

On the other hand, the above described method (2) has been associated with a problem that the size of the label allocation message becomes quite large.

SUMMARY OF THE INVENTION

It is therefore an object of the present invention to provide a node device and a label switched path loop detection method which are capable of detecting a label switched path loop efficiently and quickly, in the case of constructing a label switched path to which the loop detection based on the TTL field of the IP packet is not applicable.

According to one aspect of the present invention there is provided a node device for label switching entered packets by referring to an input label information capable of identifying a packet flow to be entered and a corresponding information for specifying at least an output side interface, the node device comprising: a memory unit for storing a flow ID capable of network globally identifying a packet flow and an ingress node information regarding an ingress node of a label switched path, according to one label allocation message requesting a set up of the label switched path which is received from one previous hop node; and a judging unit for judging whether a label switched path loop is formed or not according to from which node another label allocation message that contains an identical flow ID and an identical ingress node information as said one label allocation message is received.

According to another aspect of the present invention there is provided a node device for transmitting packets to be label switched using an output label information capable of identifying a packet flow to be outputted, the node device comprising: a transmission unit for transmitting a label allocation message requesting a set up of a label switched path that contain at least an information on said node device as an ingress node information regarding an ingress node of the label switched path; and a judging unit for judging that a label switched path loop is formed upon receiving a label allocation message in which the ingress node information specifies said node device as the ingress node.

According to another aspect of the present invention there is provided a node device for label switching entered packets by referring to an input side label information capable of identifying a packet flow to be entered and a corresponding output label information capable of identifying the packet flow to be outputted, the node device comprising: an exchange unit for exchanging with a neighboring node on a route of one packet flow a label allocation message requesting a set up of a label switched path which contains a flow ID capable of network globally identifying said one packet flow and an ingress node information regarding an ingress node of the label switched path; and a judging unit for judging whether a label switched path loop is formed or not, when a label allocation message that contains a flow ID and an ingress node information that are matching with an existing label switched path is received, according to a change in the input side label information for the existing label switched path.

According to another aspect of the present invention there is provided a node device for label switching entered packets by referring to an input side label information capable of identifying a packet flow to be entered and corresponding one or a plurality of output label information capable of identifying the packet flow to be outputted, the node device comprising: an exchange unit for exchanging with each one of a previous hop node and one or a plurality of next hop nodes on a route of one packet flow a label allocation message requesting a set up of a label switched path which contains an identifier for identifying said one packet flow and an ingress node information regarding an ingress node of the label switched path; and a judging unit for detecting whether or not a message containing an identifier and an ingress node information that are identical to those of a previously exchanged message is received from a previous hop node different from one previous hop node from which the previously exchanged message is received, or whether or not a message that contains an identifier and an ingress node information that are identical to those of the previously exchanged message and changes the input side label information is received, and Judging whether a label switched path loop is formed or not according to a result of detecting.

According to another aspect of the present invention there is provided a node device for label switching entered packets by referring to one or a plurality of input side label information capable of identifying a packet flow to be entered and a corresponding output label information capable of identifying the packet flow to be outputted, the node device comprising: an exchange unit for exchanging with a neighboring node on a route of one packet flow a message for setting up a new label switched path or utilizing an existing label switched path, which contains an identifier for identifying said one packet flow and an ingress node information regarding an ingress node of the new label switched path or the existing label switched path; and a judging unit for detecting whether or not a message containing an identifier and an ingress node information that are identical to those of a previously exchanged message is received from a previous hop node device different from one previous hop node device from which the previously exchanged message is received, or whether or not a message that contains an identifier and an ingress node information that are identical to those of the previously exchanged message and changes the input side label information is received, and judging whether a label switched path loop is formed or not according to a result of detection.

According to another aspect of the present invention there is provided a node device for label switching entered packets by referring to an input side label information capable of identifying a packet flow to be entered and a corresponding output side label information capable of identifying the packet flow to be outputted, and for merging label switched paths by setting one output side label information and a plurality of input side label information in correspondence for one packet flow, the node device comprising: a transmission unit for transmitting to a next hop node in an existing label switched path a hop count update message that contains at least an ingress node information after merging and an updated hop count value, upon receiving one label allocation message requesting a set up of one label switched path that contains at least a given ingress node information regarding an ingress node of said one label switched path and a given hop count value, when said one label allocation message requires merging to the existing label switched path and the given hop count value makes a hop count value of the existing label switched path updated to a larger value than a current value; and a judging unit for judging whether a label switched path loop is formed or not according to from which node another hop count update or label allocation message for an identical packet flow that contains an identical ingress node information as a previously received label allocation message is received.

According to another aspect of the present invention there is provided a node device for label switching entered packets by referring to one or a plurality of input side label information capable of identifying a packet flow to be entered and a corresponding output label information capable of identifying the packet flow to be outputted, the node device comprising: an exchange unit for exchanging with a neighboring node on a route of one packet flow a message for setting up a new label switched path or utilizing an existing label switched path, which contains an identifier for identifying said one packet flow; a memory unit for storing an information indicating a set up of a label switched path corresponding to said message as pending until a response message corresponding to said message is received; and a Judging unit for Judging whether a label switched path loop is formed or not according to whether or not a message regarding a label switched path for which the information indicating pending is stored in the memory unit according to a previously exchanged message is received.

According to another aspect of the present invention there is provided a node device for label switching entered packets by referring to an input side label information capable of identifying a packet flow to be entered and a corresponding output side label information capable of identifying the packet flow to be outputted, and for merging label switched paths by setting one output side label information and a plurality of input side label information in correspondence for one packet flow, the node device comprising: a transmission unit for transmitting to a next hop node in an existing label switched path a hop count update message that contains at least an updated hop count value, upon receiving one label allocation message requesting a set up of one label switched path that contains at least a given hop count value, when said one label allocation message requires merging to the existing label switched path and the given hop count value makes a hop count value of the existing label switched path updated to a larger value than a current value; a memory unit for storing a correspondence between the input side label information and the output side label information for said one packet flow according to said one label allocation message, and storing an information indicating a storing of the correspondence as pending until a success message corresponding to the hop count update message is received; and a judging unit for judging whether a label switched path loop is formed or not according to whether or not a hop count update or label allocation message indicating a packet flow or a correspondence between the input side label information and the output side label information for which the information indicating the storing of the correspondence as pending is stored in the memory unit according to a previously received label allocation message is received.

It is to be noted that the present invention is equally realizable as a method of label switching loop detection in the node device as described above, or a computer usable medium having computer readable program codes embodied therein for causing a computer to function as the node device as described above.

Other features and advantages of the present invention will become apparent from the following description taken in conjunction with the accompanying drawings.

BRIEF DESCRIPTION OF THE DRAWINGS

FIG. 12 is a diagram showing an exemplary format of a message such as a label allocation failure message that can be used in the present invention.

FIG. 13 is a diagram showing one exemplary format of an entry of a flow table that can be used in the present invention.

FIG. 17 is a diagram showing another exemplary format of an entry of a flow table that can be used in the present invention.

DETAILED DESCRIPTION OF THE PREFERRED EMBODIMENTS

Figure 1:
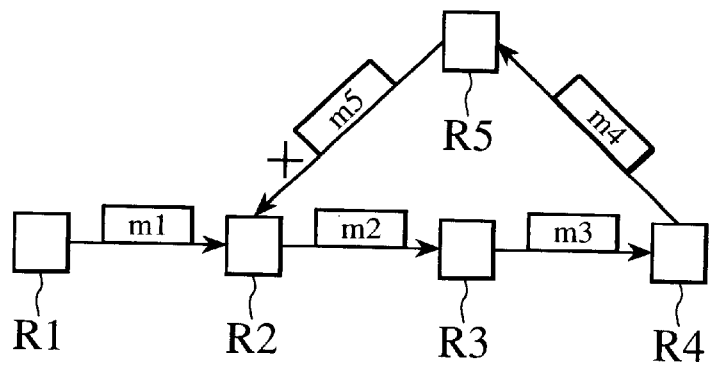
FIG. 1 is a schematic diagram for explaining an operation of a node device according to the first embodiment of the present invention.

Now, the preferred embodiments of the node device and the label switched path loop detection method according to the present invention will be described in detail with references to the drawings.

In short, in one aspect of the present invention, an ingress node information is included in a message that is to be successively transmitted from the upstream side in order to set up a label switched path, and the fact that the message with the same ingress node information for the same packet flow will be received from a previous hop node that is different from before if the label switched path has a loop formed thereon is utilized.

Also, according to another aspect of the present invention, at a time of transmitting a message for the purpose of setting up a label switched path (which can be done either by the ingress node initiative where the message is transmitted from the ingress toward the downstream side or by the egress node initiative where the message is transmitted from the egress toward the upstream side), if a node at which the label switched path for that packet flow already exists on the upstream or downstream side is encountered, this already existing label switched path is traced along the same or opposite direction as the flow, by transmitting an update message, for example. Then, the label switched path is set up if no loop is detected after tracing to the end.

By including the ingress node information in the message used in this tracing, the message with the same ingress node information for the same packet flow will be received from a previous hop node different from before if there is a loop, so that the loop can be detected by utilizing this fact. Alternatively, by setting a flag indicating that a state is pending at a time of transmitting or receiving the message, the message will arrive at a node which is indicated to be in a pending in state by the flag for the same packet flow if there is a loop, so that the loop can be detected by utilizing this fact.

The present invention is applicable to both: (1) the case (called Ingress Control) of generating a label switched path by an initiative of an ingress node, i.e., the case in which a label allocation message is transmitted from the ingress node toward a next hop node, and a label allocation success/failure message is transmitted from the egress node toward a previous hop node; and (2) the case (called Egress Control) of generating a label switched path by an initiative of an egress node, i.e., the case in which a label allocation message is transmitted from the egress node toward a previous hop node, and a label allocation success/failure message is transmitted from the ingress node toward a next hop node.

In the embodiments described below, either a confirmation flag or an ingress node information is used for the purpose of label switched path loop detection.

Apart from the purpose of loop detection, the confirmation flag can also be utilized for the purpose of maintaining a consistency among label switched path states held at nodes over the entire network, in such a manner that, after a label allocation request message or update message is transmitted to a next/previous hop node, when another label allocation request message or update message is received from an upstream/downstream node in a state of waiting for ACK to a transmitted message, a received message will not be accepted.

The ingress node information can be used in detecting a loop quicker than the case of using the confirmation flag.

In the case of ingress node initiative (Ingress Control), the loop detection using only the confirmation flag is possible when every node of the network carries out the label merging. In the case of egress node initiative (Egress Control), the loop detection using only the confirmation flag is possible both when every node of the network carries out the label merging as well as when some or all nodes of the network do not carry out the label merging.

In the case of ingress node initiative (Ingress Control), it is preferable to use the ingress node information for the loop detection when every node of the network does not carry out the label merging or when the network includes nodes that carry out the label merging and nodes that do not carry out the label merging.

In the present invention, the hop count can be used for the purpose of setting an upper limit to the number of hops in the path, rather than for the purpose of loop detection. As a result, it becomes possible to realize such controls as: (1) a control for decrementing the TTL (Time To Live) field of the IP packet at an entrance or exit of the label switched path as much as the number of hops in the path; (2) a control for preventing the spiral loop formation in which the number of hops keep increasing, in the case of not carrying out the label merging (in the case of Ingress Control); and a control for carrying out the label merging without transmitting a message for notifying a change of state to a next hop node, with respect to the merging in which the maximum number of hops from the ingress does not change, in the case of carrying out the label merging.

Note that, there are a variety of possible procedures for the label switched path loop detection using different combinations of the hop count, the ingress node information, and the confirmation flag as information to be used.

There are also a variety of ways for construing which packets belong to an identical packet flow, including: (1) a way In which packets with the same destination IP address are construed as belonging to the identical packet flow; (2) a way in which packets with the same IP address portion corresponding to the network mask (i.e., prescribed upper bits of the destination IP address) are construed as belonging to the identical packet flow; (3) a way in which packets with the same set of source IP address and destination IP address are construed as belonging to the identical packet flow; (4) a way in which packets with the same set of source IP address portion corresponding to the first network mask and destination IP address portion corresponding to the second network mask are construed as belonging to the identical packet flow; (5) a way in which packets that pass through a node having some IP address are construed as belonging to the identical packet flow; and (6) a way in which packets with the same source and/or destination port numbers among those satisfying the criterion of any of the above described (1) to (5) are construed as belong to the identical packet flow. In the embodiments described below, an exemplary case where packets with the same destination IP address are construed as belonging to the identical packet flow will be described.

In the following, the embodiment directed to the case of Ingress Control in which the label allocation message is transmitted from the ingress node toward a next hop node and the label allocation success/failure message is transmitted from the egress node toward a previous hop node will be described first.

First Embodiment

Figure 2:
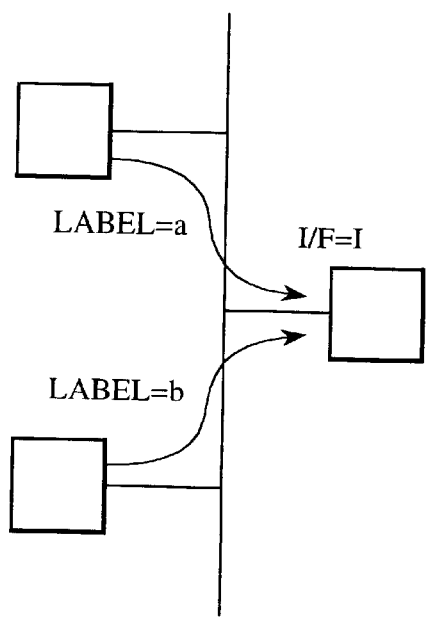
FIG. 2 is a schematic diagram for explaining a case of bus type connection between neighboring nodes.
Figure 3:
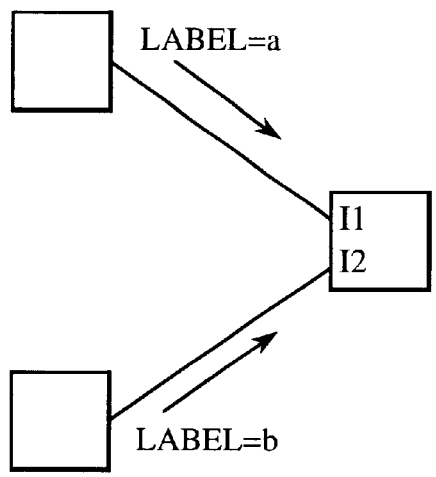
FIG. 3 is a schematic diagram for explaining a case of point-to-point link connection between neighboring nodes.

Referring now to FIG. 1 to FIG. 3, the label allocation protocol and the node device for carrying out the label switching according to this label allocation protocol according to the first embodiment of the present invention will be described.

Here, it is assumed that the node device is separately carrying out an exclusive control by which the node device refuses to receive a message that requires a change of state from the previous hop node while waiting for an ACK signal after the message transmission to the next hop node.

FIG. 1 shows an exemplary configuration of a network formed by connecting the node devices of this first embodiment together.

In FIG. 1, the node devices R1 to R5 of this first embodiment are connected together, and in particular, a loop is formed by the node devices R2 to R5. Note that FIG. 1 only shows a part of the entire network and a part of a whole of the node devices R1 to R5 are actually connected with other node devices (not shown).

Each of the node devices R1 to R5 has a function for carrying out the IP (Internet Protocol) processing, as well as a function for carrying out the label switching according to the label allocation protocol of this first embodiment. In addition, except for those node devices which are located at network ends and do not carry out any relaying, each node device also has a router function. For example, in FIG. 1, each of the node devices R2 to R5 has the router function, while the router function is unnecessary for the router device R1 as long as it is located at a network end and does not carry out any relaying.

Also, in this first embodiment, it is assumed that each node device of the network does not carry out the label merging.

The label switched path is formed by successively transmitting a label allocation message to the respective next hop node devices, starting from an ingress node device. In this first embodiment, the label allocation message contains at least an ingress node information (Ingress), a flow ID (Flowid), and a link ID (Linkid). For the link ID, any one or a combination of two or more of a label, a layer 2 connection identifier, a label allocation message source node address, and a request identifier in the case where the label allocation is to be carried out by a downstream side node upon receiving the label allocation message (the case of Downstream on demand allocation) can be used.

For the ingress node information, one of the IP addresses allocated to an output interface of the ingress node device is used. This IP address is a network global address so that the ingress node can be identified network globally in this case.

The flow ID is an information for identifying a packet flow in network global fashion.

The label contained in the message is assumed to be an information for identifying a packet flow in link local fashion, and so is the request identifier.

The label switched path is actually established when the label allocation success message is successively returned to the respective previous hop node devices starting from an egress node device, in response to the label allocation message described above. Here, an exemplary label allocation protocol in which the label allocation or update success message is successively returned from the egress node after the label allocation or update message reached up to the egress node of the label switched path will be mainly described, but it is also possible to employ such a label allocation protocol in which the label allocation or update success message is returned from an intermediate node on a route of the label switched path to its previous hop node device without waiting for the label allocation or update message to reach to the egress node and the label allocation or update success message to come back from there.

In this first embodiment, an exemplary case in which the node that transmits the label allocation message (upstream side node) carries out the label allocation (the case of Upstream allocation), that is, the case in which the "label" is contained in the label allocation message, will be described, but in the case of the Downstream on demand allocation, the label allocation message contains the "request identifier", and the label allocation success message to be returned in response contains the "label" or the "layer 2 connection identifier".

Each node device has an information on an interface ID for identifying input/output interfaces with respect to neighboring node devices. For a given packet flow, a set of the label allocated to the upstream side of the own node and the interface ID of the upstream side will be referred to as an input side label, and a set of the label allocated to the downstream side of the own node and the interface ID of the downstream side will be referred to as an output side label. Note that the interface ID may not necessarily be used at a node that has only one interface. Here, for the sake of explanation, the node device R2 is assumed to have the interface IDs "i1" with respect to the node device R1, "i5" with respect to the node device R5, and "i3" with respect to the node device R3.

Then, in the case of actually carrying out the packet transfer using the established label switched path, the packet transfer by omitting the IP processing (i.e., the label switching) is carried out by referring to a correspondence between the input side label and the output side label according to the label information contained in a packet.

In the case where the label allocation message transmitted from the previous hop node or the label allocation success message to be returned by the own node contains the "label", this "label" is going to be the label that constitutes the input side label. In the case where the label allocation message to be transmitted by the own node or the label allocation success message returned from the next hop node contains the "label", this "label" is going to be the label that constitutes the output side label.

On the other hand, when the label allocation message or the label allocation success message contains the "layer 2 connection identifier" rather than the "label", the label that is separately obtained in correspondence to this layer 2 connection identifier is going to be the label that constitutes the input side label or the output side label. More specifically, in the case of using ATM as the link layer and the network configuration in which an ATM switch is provided between the neighboring nodes, it is the VPI/VCI that is used as the "label" in the actual switching, but this value will be rewritten at the intermediate ATM switch, so that another identifier called VCID (Virtual Connection ID) will be used so that the ATM connection between the neighboring nodes can be uniquely identified by the both end-nodes. This VCID is an example of the "layer 2 connection identifier" that can be contained in the label allocation protocol.

By combining the above described "link ID" that is contained in the message with the interface ID at which the message is received, the node that received the label allocation message or the (hop count) update message can detect the fact that the message is received from a previous hop node that is different from the one from which the label allocation message with the same flow ID and the same ingress node information were received before. In such a case, it is Judged that there is a loop.

Note that, in the case where the upstream side neighboring node does not have the above described loop detection function, there can be cases of receiving the label allocation message with the same flow ID and the same ingress node as before but which contains a different label (or layer 2 connection identifier or request identifier), from the same previous hop node as before. In such a case, the node that received this message will carry out the loop detection on behalf of the upstream side neighboring node.

Consequently, it is also possible to provide the loop detection function not for explicitly detecting whether the message with the same flow ID and the same ingress node information is received from a previous hop node that is different from before or not, but for detecting whether the message with the same flow ID and the same ingress node information but which contain a label (or layer 2 connection identifier or request identifier) that is different from before is received or not. In this manner, using the single criterion, each node device carries out the detection as to whether the message is received from a different previous hop node or not if the upstream side neighboring node has the loop detection function, or the detection as to whether a different label is received or not if the upstream side neighboring node has no loop detection function so as to detect a loop that has been overlooked at the upstream side.

In the following, the case of using the "label" as the "link ID" will be described. In the case of using something other than the label as the link ID, the loop detection can be realized similarly by replacing the "label" in the following description with the "layer 2 connection identifier", the "label allocation message source node address", the "request identifier", or a combination of any two or more of these and the "label". For example, a set of the "layer 2 connection identifier", the "label allocation message source node address" or the "request identifier" and the interface ID of the upstream side is going to be referred to as the input side label.

Note however that in the example described below, the "input side label" is used not only for detecting whether the message with the same flow ID and the same ingress node information is received from a previous hop node that is different from before or not (for judging that there is a loop when the previous hop node is different), but also for detecting whether the message with the same flow ID is received from the same previous hop node as a message with a different ingress node information or not (for continuing a new label switched path set up when the ingress node information is different), so that in the case where the upstream side neighboring node does not carry out the label merging, it is preferable to replace the "label" with the "layer 2 connection identifier" or the "request identifier" (either one alone) or else the combination of the "label allocation message source node address" and the other link ID, rather than with the "label allocation message source node address" alone.

Note also that in the description given above and below, the fact that the label allocation message with the same flow ID and the same ingress node information is received from a different previous hop node is detected (judged as a loop) using the "link ID" contained in the message, but there is also a case where this detection can be done by using only the "interface ID" from which the message is received. This is the case when the neighboring nodes are connected not by a bus type connection as shown in FIG. 2 but by a point-to-point link as shown in FIG. 3. Note here that it is preferable to use such a loop detection using the interface ID alone (without relying on the link ID) instead of the input side label only when the upstream side neighboring node carries out the label merging.

Also, in the case of FIG. 2, the loop is to be detected using the link ID (the label, for example), and this label or request identifier is to be allocated by each upstream side node such that values coming from different previous hop nodes appear different from a viewpoint of the downstream side node.

FIG. 1 shows the label allocation messages m1, m2, m3, m4 and m5 that are sent from R1 to R2, from R2 to R3, from R3 to R4, from R4 to R5, and from R5 to R2, respectively.

Here, mi=(ingress node (Ingress)=x1, flow ID (Flowid)= x2, label=x3) indicates the label allocation message m1 which contains x1 as the ingress node information, x2 as the flow ID, and x3 as the label.

As for the timing at which the node device transmits the label allocation message as an ingress node, the following options are available, for example.

(1) Each node device transmits the label allocation message at a timing where the routing table with respect to the destination "dest" is created.

(2) Each node device transmits the label allocation message at a timing where the amount of traffics with respect to the destination "dest" exceeds a threshold after the routing table with respect to the destination "dest" is created.

(3) Only a node device that satisfies the conditions that the amount of traffics with respect to the destination "dest" exceeds a threshold after the routing table with respect to the destination "dest" is created, and that the previous hop node device of the traffic (datagram) does not support the label allocation protocol according to this first embodiment, transmits the label allocation message by judging the own node as the ingress node at this timing (see INTERNET-DRAFT <draft-ietf-rolc-nhrp-11.txt. NBA Next Hop Resolution Protocol (NHRP), for example).

Next, the operation according to the label allocation protocol of this first embodiment will be described.

Here, an exemplary case where the route of a packet destined to the destination "dest" from the node device R1 is looping along the sequence of R1, R2, R3, R4, R5, R2, R3, . . . will be described.

First, the node device R1 allocates a new label "a" at the output interface to the node device R2 which is a next hop node of the own node with respect to the destination "dest", and transmits the label allocation message m1 (ingress node=R1, flow ID=dest, label=a) to the node device R2, at a timing where the routing table with respect to the destination "dest" is created, for example, as described above. Also, the node device R1 stores at least the flow ID, the ingress node information, and the output side label, in correspondence, and attaches an information that indicates pending.

Upon receiving the label allocation message m1 from the node device R1, the node device R2 allocates a new label "b" at the output interface to the node device R3 which is a next hop node of the own node, and transmits the label allocation message m2 (ingress node=R1, flow ID=dest, label=b) to the node device R3. Also, the node device R2 stores the label switching information, i.e., at least the flow ID, the ingress node information, the input side label (the received label and the link ID with respect to the node device R1), and the output side label (the allocated label and the link ID with respect to the node device R3), in correspondence, and attaches an information that indicates pending. Thus, at this point, the node device R2 stores therein at least the flow ID "dest", the ingress node information "R1", the input side label "(i1, a)", and the output side label "(i3, b)", in correspondence.

Note that each information mentioned above is to be stored by using one or plural tables (such as a flow table shown in FIG. 13), for example. Also, as for a timing for storing each information mentioned above, it is possible to store all of them collectively before or after transmitting the label allocation message m2, for example, or it is possible to store the flow ID, the ingress node information and the input side label when the label allocation message m1 is received and store the output side label after the label "b" is allocated, for example.

Similarly, as the label allocation message is successively forwarded from R3 to R4, from R4 to R5, and then from R5 to R2, the allocation of a label at the output interface, the storing of each information such as the flow ID, and the attaching of an information that indicates pending are carried out at each of the node devices R3 to R5.

Next, when the node device R2 receives the label allocation message m5 (initial node=R1, flow ID=dest, label=e) from the node device R5, the node device R2 Judges that there is a loop because, in relation to the set of information such as the flow ID that is already stored in response to the reception of the label allocation message m1 from the node device R1, this message has the same ingress node information and the same flow ID but a different input side label ((i1, a) as oppose to (i5, e)), so that the node device R2 either discards the received label allocation message m5 or returns a label allocation failure message to the node device RS. In this example, it is assumed that the node device that detected the loop returns the label allocation failure message.

When the label allocation failure message is received in this manner, the node device R5 cancels the output side label information that was stored at a time of transmitting the label allocation message m5 among a set of information such as the flow ID, and changes the information that indicates pending into an information that indicates confirmed, and transmits a label allocation success message to the previous hop node device.

Also, the node device other than the ingress one which received the label allocation success message from the next hop node device (R4, R3 and R2 in this example) transmits the label allocation success message to the previous hop node device. Also, the node device which received the label allocation success message (R4, R3, R2 and R1 in this example) changes the information that indicates pending that is attached to a set of information such as the flow ID that was stored in response to the label allocation message, into an information that indicates confirmed.

As a result, the label switched path in the sequence of R1, R2, R3, R4 and R5 is formed. Also, the usual IP transfer using the TTL (Time To Live) field, the hop limit field or their equivalents of an IP packet is carried out from the node device R5.

Note that such a state is a transient state, and the routing protocol operates such that a normal route is recovered after a prescribed period of time elapses, while the change of the label switched path is also carried out in conjunction with that.

If the label allocation message reaches to the egress node without detecting any loop, this egress node device transmits the label allocation success message to the previous hop node device, and then the label allocation success message is successively transmitted to the respective previous hop node devices until finally reaching to the ingress node device, so that a loop-free label switched path is formed.

Note that it is also possible to modify this first embodiment to use the conventional method for detecting a loop when the hop count exceeds a threshold in addition.

Note also that when the node device of this first embodiment becomes the egress node of the label switched path, it is preferable to transmit the label allocation message repeatedly at appropriate timings thereafter. There can be various reasons for returning the label allocation failure message such as that a loop is detected or that there is no available label, but in some cases there is a possibility for being able to extend the label switched path further as a result of having a previously detected loop resolved when the routing table is rewritten, or having an available label secured when the previously used label is released. Note however that when the hop count exceeding the threshold is the reason for the label allocation failure, the repeated transmission of the label allocation success message at appropriate timings should not be made. As for the reason for the label allocation failure, it is preferable to transmit it to the previous hop node device by writing it into the label allocation failure message at the node device.

Now, the case where the node device discards the received label allocation message upon judging that there is a loop will be described.

The node device (R2 in this example) that detected the loop repeatedly carries out the procedure for re-transmitting the label allocation message if the label allocation success message is not returned from the node device (R5 in this example) which originally transmitted the label allocation message that resulted in the loop detection, after a prescribed period of time since the transmission of the label allocation message. Then. when the number of repeated re-transmission exceeded a threshold, it is regarded that the label allocation failure message was returned. Note that it is preferable to provide this function also in the case of using the node device which returns the label allocation failure message when it is Judged that there is a loop.

Each upstream side node device (such as R4 in this example) of the node device (R5 in this example) which originally transmitted the label allocation message that resulted in the loop detection to the node device (R2 in this example) which detected the loop will also re-transmit the label allocation message as the label allocation success message is not returned after a prescribed period of time has elapsed since the transmission of the label allocation message. Here, when the label allocation message with the same flow ID, the same input side label and the same ingress node information (the label allocation message with the same flow ID, the same input side label, the ingress node information, and the same hop count in the case of using the hop count as well) is received, the node device is to return the label allocation success message in response to this. Therefore, for example, when the node device R4 re-transmits the label allocation message to the node device R5, the node device R4 is going to receive the label allocation success message from the node device R5.

Second Embodiment

Referring now to FIG. 4 to FIG. 8, the label allocation protocol and the node device for carrying out the label switching according to this label allocation protocol according to the second embodiment of the present invention will be described.

This second embodiment is basically similar to the first embodiment described above, so that the difference from the first embodiment will be mainly described in the following.

In this second embodiment, similarly as in the first embodiment, each node device has a function for carrying out the IP (Internet Protocol) processing, as well as a function for carrying out the label switching according to the label allocation protocol of this second embodiment (including the case of additionally using the hop count in the loop detection function of the first embodiment). In addition, except for those node devices which are located at network ends and do not carry out any relaying, each node device also has a router function. Also, it is assumed that the node device is separately carrying out an exclusive control by which the node device refuses to receive a message that requires a change of state from the previous hop node while waiting for an ACK signal after the message transmission to the next hop node.

This second embodiment differs from the first embodiment in particular in that, unlike the first embodiment where it is assumed that each node device does not carry out the label merging, the node device of this second embodiment carries out the label merging by setting the identical output side label in correspondence to a plurality of input side labels with the same flow ID. In other words, the node device of this second embodiment has a function for carrying out a processing regarding the label merging as a function for carrying out the label switching.

Note that it is not necessary for every node device to carry out the label merging, and there may be some node devices which do not carry out the label merging. The node device that carries out the label merging differs from the node device that does not carry out the label merging in having a function for transmitting a hop count update message in response to the label allocation message, prior to the label merging, and regarding the label merging as success when a hop count update success message is returned.

In this second embodiment, at a time of receiving the label allocation message, allocating a label at the output interface, and transmitting the label allocation message to the next hop node device, the node device stores at least the ingress node information, the flow ID, the input side label, the output side label, and the hop count (that is the number of hops from the ingress), in correspondence. Then, the node device that is trying to merge the labels in response to the label allocation message carries out the merging when the hop count h1 of a new packet route to be merged now is less than or equal to the hop count h2 of a packet route to which the label switched path has already been set up, whereas when the hop count h1 exceeds the hop count h2, this node device transmits to a next hop node a hop count update message containing at least the ingress node information, the flow ID, the label, and the hop count, prior to the merging.

Here, in the case where the merging of the other path has already been made and a plurality of hop counts with respect to different ingress nodes are already registered at this node device, the maximum hop count among them is taken as hmax, and the merging is carried out when the hop count h1 of a new packet route to be merged now is less than or equal to this hop count hmax, whereas when the hop count h1 exceeds the hop count hmax, this node device transmits the hop count update message prior to the merging.

The node device which received the hop count update message then transmits the hop count update message to the next hop node when the loop is not detected (by the similar method as in the first embodiment) and the hop count is less than or equal to a threshold, but in the case of receiving the hop count update message which has the flow ID and the ingress node information coinciding with but the input side label differing from the stored set of information such as the flow ID, or in the case where the hop count exceeds the threshold, it is Judged that there is a loop. Note however that, in the case where the node device located at an ending point of the label switched path receives the hop count update message and the loop is not detected while the hop count is less than or equal to the threshold, the label allocation message is transmitted to the next hop node instead of the hop count update message.

Here, it is assumed that the threshold for the hop count is set to be 8.

In the first embodiment, the messages to be exchanged between node devices included three messages of the label allocation message, the label allocation success message and the label allocation failure message, but in this second embodiment, there are three additional messages of the hop count update message, the hop count update success message and the hop count update failure message which are provided for the sake of the merging. In addition, the hop count is described in each message. Note that, as already mentioned above, the node device that does not carry out the label merging will not be a starting point for transmitting the hop count update message, but has a function for carrying out the processing upon receiving the hop count update message, the hop count update success message, or the hop count update failure message.

In this second embodiment, it is assumed that the packets with the same destination IP address are construed as belonging to the same packet flow, similarly as in the first embodiment.

The ingress node information, the flow ID, the label, the link ID, the input side label, and the output side label are similar to the first embodiment.

Next, the operation according to the label allocation protocol of this second embodiment will be described with references to FIG. 4 to FIG. 7.

Here, an exemplary case where the route of a packet destined to the destination "dest" from the node device R1 is looping along the sequence of R1, R2, R3, R4, R5, R2, R3, . . . and the label switched path along the sequence of R1, R2, R3, R4 and R5 is formed similarly as in the first embodiment, and then a connection from the node devices R6, R7 and R8 to the node device R3 is formed and the label merging is to be carried out at the node device R3 will be described first. Here, for the sake of explanation, it is assumed that the node device R3 has the link IDs of "i2" with respect to the node device R2, "i4" with respect to the node device R4, and "i8" with respect to the node device R8, while the node device R1 has the link ID of "i1" at the output link between the node devices R1 and R2.

Figure 4:
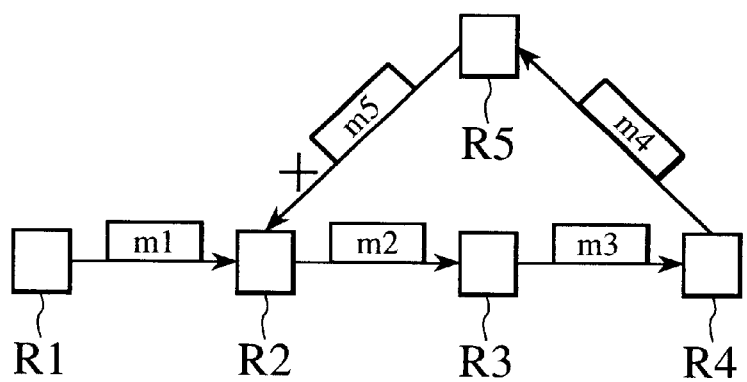
FIG. 4 is a schematic diagram for explaining an operation of a node device according to the second embodiment of the present invention.

First, in FIG. 4, the node device R1 allocates a new label "a" at the output interface to the node device R2 which is a next hop node of the own node with respect to the destination "dest", and transmits the label allocation message m1 (ingress node=R1, flow ID=dest, label=a, hop count=1) to the node device R2, at a timing where the routing table with respect to the destination "dest" is created, for example, as described above. Also, the node device R1 stores at least the flow ID, the ingress node information, the output side label, and the hop count (=0) in correspondence, and attaches an information that indicates pending.

Upon receiving the label allocation message m1 from the node device R1, the node device R2 allocates a new label "b" at the output interface to the node device R3 which is a next hop node of the own node, increments the received hop count, and transmits the label allocation message m2 (ingress node=R1, flow ID=dest, label=b, hop count=2) to the node device R3. Also, at appropriate timing, the node device R2 stores at least the flow ID (=dest), the ingress node information (=R1), the input side label (=(ii, a)), the output side label (=(i3, b)), and the received hop count (=1), in correspondence, and attaches an information that indicates pending.

Similarly, as the label allocation message is successively forwarded from R3 to R4, from R4 to R5, and then from R5 to R2, the allocation of a label at the output interface, the storing of the set of information such as the flow ID, and the attaching of an information that indicates pending are carried out at each of the node devices R3 to R5.

Next, when the node device R2 receives the label allocation message m5 (initial node=R1, flow ID=dest, label=e, hop count=5) from the node device R5, the node device R2 judges that there is a loop because, in relation to the set of information that is already stored in response to the reception of the label allocation message m1 from the node device R1, this message has the same ingress node information and the same flow ID but a different input side label ((i1, a) as oppose to (i5, e)), so that the node device R2 either discards the received label allocation message m5 or returns a label allocation failure message to the node device R5.

Hereafter the processing is similar to the first embodiment.

As a result, the label switched path in the sequence of R1, R2, R3, R4 and R5 is formed. Also, the usual IP transfer using the TTL (Time To Live) field, the hop limit field or their equivalents of an IP packet is carried out from the node device R5.

Note that, as already mentioned above, such a state is a transient state, and the routing protocol operates such that a normal route is recovered after a prescribed period of time elapses, while the change of the label switched path is also carried out in conjunction with that.

In addition, it is also judged that there is a loop when the hop count exceeds the threshold, and in such a case, the node device also either discards the received label allocation message or returns a label allocation failure message to the previous hop node device.

Figure 5:
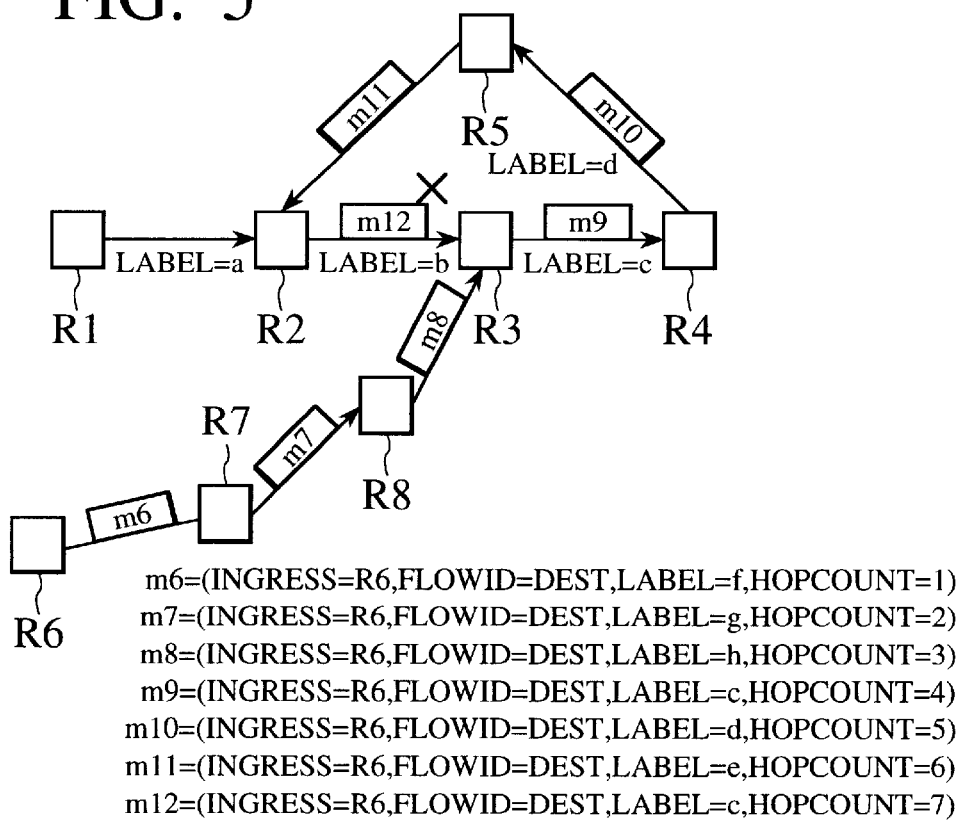
FIG. 5 is another schematic diagram for explaining an operation of a node device according to the second embodiment of the present invention.

Next, the loop detection and the label switched path formation in the case of carrying out the label merging will be described for an exemplary case where, starting from a state of having the label switched path in the sequence of R1, R2, R3, R4 and R5 formed as shown in FIG. 4, new node devices R6, R7 and R8 are connected to form a topology as shown in FIG. 5, and the node device R6 transmits the label allocation message.

First, the node device R6 allocates a new label "f" at the output interface to the node device R7, and transmits the label allocation message m6 (ingress node=R6, flow ID=dest, label=f, hop count=1) to the node device R7. Also, the node device R6 stores at least the flow ID, the ingress node information, the output side label, and the hop count (=0), in correspondence, and attaches an information that indicates pending at this point.

Upon receiving the label allocation message m6 from the node device R6, the node device R7 allocates a new label "g" at the output interface to the node device R8 which is a next hop node of the own node, increments the received hop count, and transmits the label allocation message m7 (ingress node=R6, flow ID=dest, label=g, hop count=2) to the node device R8. Also, at appropriate timing, the node device R7 stores at least the flow ID, the ingress node information, the input side label, the output side label, and the received hop count, in correspondence, and attaches an information that indicates pending.

Upon receiving the label allocation message m7 from the node device R7, the node device R8 allocates a new label "h" at the output interface to the node device R3 which is a next hop node of the own node, increments the received hop count, and transmits the label allocation message m8 (ingress node=R6, flow ID=dest, label=h, hop count=3) to the node device R3. Also, at appropriate timing, the node device R7 stores at least the flow ID, the ingress node information, the input side label, the output side label, and the received hop count, in correspondence, and attaches an information that indicates pending.

Next, when the node device R3 receives the label allocation message m8 from the node device R8, there is the set of information such as the flow ID (flow ID=dest, ingress node information=R1, input side label=(i2, b), output side label=(i4, c), hop count=2) that is already stored in response to the label allocation message m2 received from the node device R2, and the flow ID is the same but the input side label is different and the ingress node information is also different, so that it is set to be a target of the merging.

Here however, the maximum number of hops (hop count) from the ingress node increases from 2 to 3, so that the newly received label h and the already allocated output side label c are not set in correspondence immediately, and a hop count update message m9 (ingress node=R6, flow ID=dest, label=c, hop count=4) for the purpose of updating the ingress node information and the hop count is transmitted to the downstream side node device R4. Also, the node device R3 stores at least the flow ID (=dest), the ingress node information (=R6), the input side label (=(i8, e)), the output side label (=(i4, c)), and the received hop count (=3), in correspondence, and attaches an information that indicates pending.

Note that in this second embodiment, the ingress node information to be written into the hop count update message is set to be the ingress node information regarding the ingress node for which the hop count from the initial node that is located on the upstream side from the node that transmits the hop count update message becomes maximum, but the loop detection is also possible by writing the ingress node information in arbitrary flow table entry for the flow of interest which has the common output side label into the hop count update message and transmitting such a hop count update message.

Upon receiving the hop count update message m9 from =the node device R3, the node device R4 transmits the hop count update message m10 (ingress node=R6, flow ID=dest, label=d, hop count=5) to the node device R5 which is a next hop node of the own node. Also, the node device R4 stores the set of information such as the flow ID in correspondence and attaches an information that indicates pending, while holding the updated ingress node information R6 and the updated hop count value 4 for the set of information such as the flow ID that was stored in response to the label allocation message m3 before, and attaching an information that indicates updated pending.

Upon receiving the hop count update message m10 from the node device R4, the node device R5 that is at the ending point of the label switched path transmits the label allocation message m11 (ingress node=R6, flow ID=dest, label=e, hop count=6) to the node device R2 which is a next hop node of the own node. Also, the node device R5 stores the set of information such as the flow ID in correspondence and attaches an information that indicates pending, while holding the updated ingress node information R6 and the updated hop count value 5 for the set of information such as the flow ID that was stored in response to the label allocation message m4 before, and attaching an information that indicates updated pending.

When the node device R2 receives the label allocation message m11 from the node device R5, there is the input side label "a" corresponding to the same flow ID that was already received from the node device D1, but the hop count value of this message is larger than the hop count value corresponding to the label "a", so that the received label=e and the output side label=b are not set in correspondence yet, and a hop count update message m12 (ingress node=R6, flow ID=dest, label=b, hop count=7) in which the received hop count is incremented is transmitted to the node device R3 which is a next hop node of the own node. Also, the node device R2 stores at least the set of information such as the flow ID in correspondence, and attaches an information that indicates pending.

When the node device R3 receives the hop count update message m12 from the node device R2, the node device R3 has received the label allocation messages with the same ingress node=R6 and the same flow ID=dest but the different input side labels (i2, b) and (i8, e), so that it is judged that there is a loop, and this hop count update message m12 is discarded, while a hop count update failure message is transmitted to the node device R2.

Upon receiving the hop count update failure message from the node device R3, the node device R2 transmits the label allocation failure message to the node device R5 that had transmitted the label allocation message m11 for updating the hop count to the own device, while cancelling the set of information such as the flow ID that was stored in response to the label allocation message m11.

Hereafter, the message is to be successively transmitted from the node device R5 to its upstream side node devices (R5→R4→R3→R8→R7→R6), and there are several options for the processing for this purpose. In the following, each of the following two cases will be described: (1) the case in which the node device (R5 in this example) that received the label allocation failure message transmits the hop count update failure message to the upstream side node device (R4 in this example) (the case of not allowing the merging); (2) the case in which the node device (R5 in this example) that received the label allocation failure message transmits the hop count update success message to the upstream side node device (R4 in this example) (the case of allowing the merging).

First, the case (1) in which the node device (R5 in this example) that received the label allocation failure message transmits the hop count update failure message to the upstream side node device (R4 in this example) (the case of not allowing the merging) will be described.

Upon receiving the label allocation failure message from the node device R2, the node device R5 transmits the hop count update failure message to the node device R4 that had transmitted the hop count update message m10 to the own device, while cancelling the set of information such as the flow ID that was stored in response to the hop count update message m10. Also, for the set of information such as the flow ID that was stored in response to the label allocation message m4, the original ingress node information R1 and the original hop count value 4 are maintained, and the information that indicates updated pending is cleared.

Upon receiving the hop count update failure message from the node device R5, the node device R4 transmits the hop count update failure message to the node device R3 that had transmitted the hop count update message m9 to the own device, while cancelling the set of information such as the flow ID that was stored in response to the hop count update message m9. Also, for the set of information such as the flow ID that was stored in response to the label allocation message m3, the original ingress node information R1 and the original hop count value 3 are maintained, and the information that indicates updated pending is cleared.

Upon receiving the hop count update failure message from the node device R4, the node device R3 transmits the label allocation failure message to the node device R8 that had transmitted the label allocation message m8 for updating the hop count to the own device, while cancelling the set of information such as the flow ID that was stored in response to the label allocation message m8.

Hereafter, similarly as in the procedure of the first embodiment, the node device R8 that received the label allocation failure message from the node device R3 transmits the label allocation success message to the node device R7 that had transmitted the label allocation message m7 to the own device, and the node device R7 transmits the label allocation success message to the node device R6 that had transmitted the label allocation message m6 to the own device. Also, the node device R7 cancels the output side label information among the set of information such as the flow ID that was stored at a time of transmitting the label allocation message m7 upon receiving the label allocation message m6, and changes the information that indicates pending into the information that indicates confirmed. The node device R6 changes the information that indicates pending that was attached to the set of information such as the flow ID that was stored at a time of transmitting the label allocation message m6 into the information that indicates confirmed.

Figure 6:
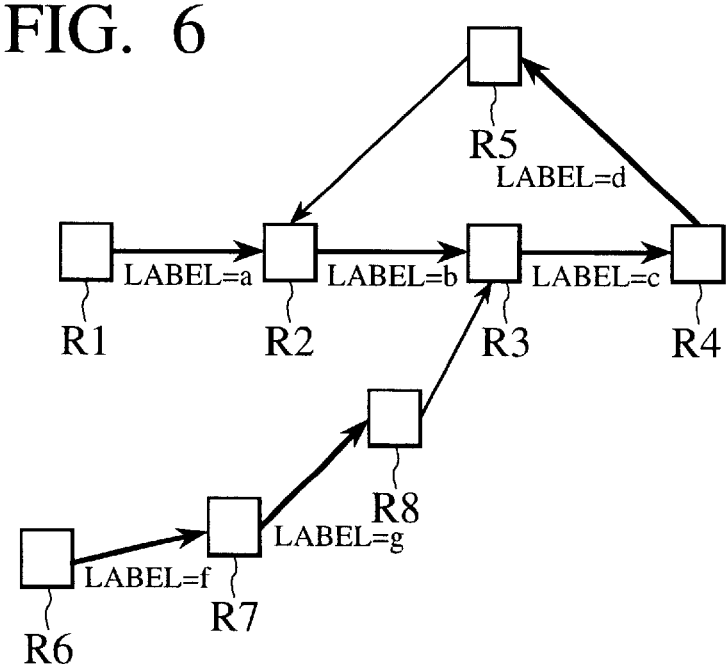
FIG. 6 is another schematic diagram for explaining an operation of a node device according to the second embodiment of the present invention.

As a result, as shown by a thick line in FIG. 6, apart from the label switched path in the sequence of R1, R2, R3, R4 and R5, another loop-free label switched path in the sequence of R6, R7 and R8 is formed.

Note that, in the case where the node device that had transmitted the label allocation message or the hop count update message that updates the hop count among the set of information such as the flow ID that was already stored receives the label allocation success message or the hop count update success message in response, this node device transmits the label allocation success message or the hop count update success message corresponding to the previous hop node device that had transmitted the label allocation message or the hop count update message for updating the hop count to the own device, updates the hop count to the updated value, clears the information that indicates updated pending, and changes the information that indicates pending that was attached to the set of information such as the flow ID that was newly stored at that time into the information that indicates confirmed.

Next, the case (2) in which the node device (R5 in this example) that received the label allocation failure message transmits the hop count update success message to the upstream side node device (R4 in this example) (the case of allowing the merging) will be described.

Upon receiving the label allocation failure message from the node device R2, the node device R5 transmits the hop count update success message to the node device R4 that had transmitted the hop count update message m10 to the own device, while deciding upon the set of information such as the flow ID that was stored in response to the hop count update message m10.

Upon receiving the hop count update success message from the node device R5, the node device R4 transmits the hop count update success message to the node device R3 that had transmitted the hop count update message m9 to the own device, while changing the information that indicates pending that was attached to the set of information such as the flow ID that was stored in response to the hop count update message m9. Also, for the set of information such as the flow ID that was stored in response to the hop count update message m9 into the information that indicates confirmed.

Upon receiving the hop count update success message from the node device R4, the node device R3 transmits the label allocation success message to the node device R8 that had transmitted the label allocation message m8 for updating the hop count to the own device, while changing the information that indicates pending that was attached to the set of information such as the flow ID that was stored in response to the label allocation message m8 into the information that indicates confirmed.

Hereafter, similarly as in the procedure of the first in embodiment, the node device R8 that received the label allocation success message from the node device R3 transmits the label allocation success message to the node device R7 that had transmitted the label allocation message m7 to the own device, and the node device R7 transmits the label allocation success message to the node device R6 that had transmitted the label allocation message m6 to the own device. Also, each of the node devices R8, R7 and R6 changes the information that indicates pending that was attached to the set of information such as the flow ID that was stored at a time of transmitting the label allocation message upon receiving the label allocation message into the information that indicates confirmed.

Figure 7:
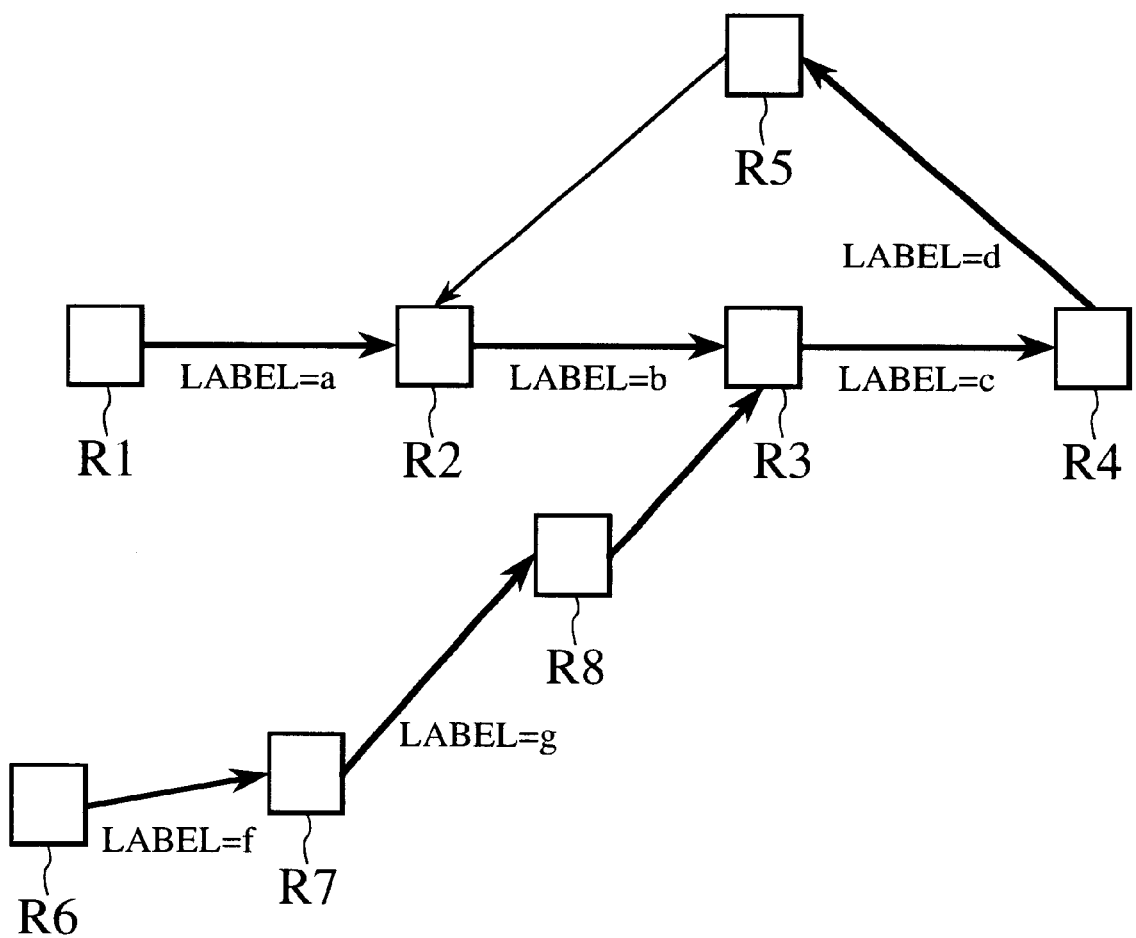
FIG. 7 is another schematic diagram for explaining an operation of a node device according to the second embodiment of the present invention.

As a result, as shown by a thick line in FIG. 7, a single tree shaped label switched path in which the label switched path in the sequence of R1, R2, R3, R4 and R5 and the label switched path in the sequence of R6, R7, R8, R3, R4 and R5 are merged at their common portion in the sequence of R3, R4 and R5 is formed.

Note that, in the case where the node device that had transmitted the label allocation message or the hop count update message that updates the hop count among the set of information such as the flow ID that was already stored receives the label allocation success message or the hop count update success message in response, this node device transmits the label allocation success message or the hop count update success message corresponding to the previous hop node device that had transmitted the label allocation message or the hop count update message for updating the hop count to the own device, updates the hop count to the updated value, clears the information that indicates updated pending, and changes the information that indicates pending that was attached to the set of information such as the flow ID that was newly stored at that time into the information that indicates confirmed.

In the examples described above, the loop was detected before the hop count exceeds the threshold 8, but when the threshold for the hop count is smaller, there can be cases where it is Judged as update failure because of the hop count exceeding the threshold before the loop is detected.

Now, the operation described up to now is the case when the threshold for the hop count is set to be 8, but when the threshold for the hop count is greater than or equal to 5, that is, when the hop count update message generated at the node device R3 in conjunction with the connection of the node device R6 can forwarded up to the node device R3 that is the egress node, without having its hop count exceeding the threshold, and the hop count also does not exceed the threshold even at the node device R5, the hop count update success message is returned from the node device R5 to the node device R4 regardless of whether the node device R5 transmits the label allocation message to the node device R2 immediately or not and also regardless of the outcome in the case of transmitting the label allocation message immediately.

In the following, the case where the threshold for the hop count is 4 while the node device R6 transmits the label allocation message m6 in a state shown in FIG. 5 will be described.

In this case where the threshold for the hop count is 4, similarly as in the case where the threshold for the hop count is greater than or equal to 5, the label switched path in the sequence of R1, R2, R3, R4 and R5 is formed first.

Also, when the node devices R6, R7 and R8 are connected next, similarly as in the case where the threshold for the hop count is greater than or equal to 5, when the label allocation message with the ingress node=R6 is transmitted from the node device R6 first, this message is successively forwarded to the node devices R7, R8 and R3 while the hop count is sequentially incremented, and the hop count update message with the ingress node=R6 is forwarded to the downstream side from the node device R3 while the hop count is sequentially incremented.

The hop count update message is then forward up to the node device R5 without having the hop count exceeding the threshold. The node device R5 that received the hop count update message judges that there is a loop because the received hop count exceeds the threshold, and returns the hop count update failure message to the node device R4 while cancelling the set of information such as the flow ID that was stored in response to the hop count update message.

Upon receiving the hop count update failure message from the node device R5, the node device R4 transmits the hop count update failure message to the node device R3 that had transmitted the hop count update message m9 to the own device, while cancelling the information that indicates pending that was attached to the set of information such as the flow ID that was stored in response to the hop count update message m9.

Upon receiving the hop count update failure message from the node device R4, the node device R3 transmits the label allocation failure message to the node device R8 that had transmitted the label allocation message m8 for updating the hop count to the own device, while cancelling the information that indicates pending that was attached to the set of information such as the flow ID that was stored in response to the label allocation message m8.

Hereafter, similarly as in the procedure of the first embodiment, the node device R8 that received the label allocation failure message from the node device R3 transmits the label allocation success message to the node device R7 that had transmitted the label allocation message m7 to the own device, while cancelling the output side label information among the set of information such as the flow ID that was stored at a time of transmitting the label allocation message m8 upon receiving the label allocation message m7, and changes the information that indicates pending into the information that indicates confirmed. Also, the node device R7 transmits the label allocation success message to the node device R6 that had transmitted the label allocation message m6 to the own device. Also, each of the node devices R7 and R6 changes the information that indicates pending that was attached to the set of information such as the flow ID that was stored at a time of transmitting the label allocation message upon receiving the label allocation message into the information that indicates confirmed.

In the above, some examples based on this second embodiment have been described, and in the following, some variations of this second embodiment will be described.

In the above, the node device R3 that received the hop count update message m12 from the node device R2 has been described to detect the loop and transmit the hop count update failure message to the node device R2, but the node device that detected the loop upon receiving the hop count update message may be made to discard the hop count update message and not to transmit the hop count update failure message.

Now, in the above, the node device R3 that received the hop count update failure message from the node device R4 has been described to transmit the label allocation failure message to the node device R8 so that the newly formed label switched path was merely the route in the sequence of R6, R7 and R8. However, instead of that, it is also possible to form the new label switched path in the sequence of R6, R7, R8 and R3 in such a way that the node device R3 does not carry out the label merging but transmits the label allocation success message to the node device R8 and cancels only the output side label without cancelling the entire set of information such as the flow ID that was stored in response to the label allocation message m8 before, and becomes itself an ending point node.

Also, in the above, the node device (R5 in the above example) which is the ending point of the label switched path transmits the label allocation message to the next hop node device of the own node upon receiving the hop count update message. However, as already mentioned above, in the case where the node device is made to transmit the label allocation message repeatedly at appropriate timing when this node device itself becomes the ending point of the label switched path, when the node device R5 receives the hop count update message from the node device R4 and the prescribed condition is satisfied, the node device R5 may transmit the hop count update message to the previous hop node device instead of transmitting the label allocation message to the node device R2, and then transmit the label allocation message repeatedly at appropriate timing.

Next, with reference to FIG. 8, the exemplary case where it is judged that there is a loop according to the label allocation protocol of the first embodiment or the second embodiment in a situation where a loop in the route is actually not formed will be described.

Figure 8:
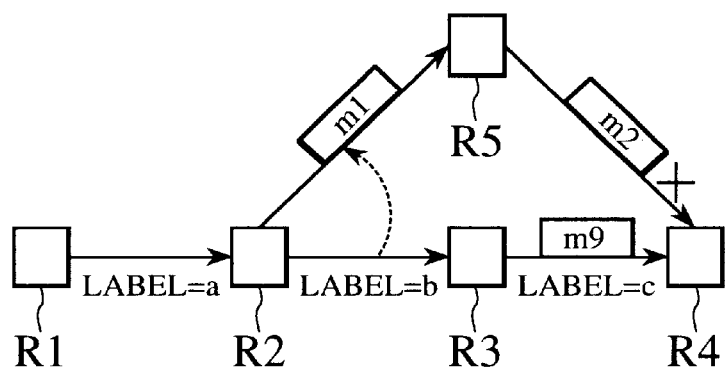
FIG. 8 is another schematic diagram for explaining an operation of a node device according to the first and second embodiments of the present invention.

As shown in FIG. 8, suppose that the label switching in the sequence of R1, R2, R3 and R4 was already formed from the node device R1 with respect to the destination "dest", and at some timing, the node device R3 breaks down so that the route from the node device R1 to the destination "dest" is changed to that in the sequence of R1, R2, R5 and R4. At this point, the node device R2 releases the allocation of the label "b" to the node device R3 which is a next hop node toward the destination "dest", and transmits the label allocation message m1 (ingress node =R1, flow ID=dest, label= d, hop count=2) to the node device R5 which is a new next hop node toward the destination "dest". Also, similarly as described above, the set of information such as the flow ID is stored.

Upon receiving the label allocation message m1 from the node device R2, the node device R5 allocates a new label "d" at the output interface to the node device R4 which is a next hop node of the node device R5, increments the received hop count, and transmits the label allocation message m2 (ingress node=R1, flow ID=dest, label=e, hop count=3) to the node device R4. Also, similarly as described above, the set of information such as the flow ID is stored.

Upon receiving the label allocation message m2 from the node device R5, the node device R4 returns the label allocation failure message to the node device R5 without storing a correspondence of the label "e" and the flow ID, the ingress node information, etc., if the label "c" whose allocation is requested from the node device R3 is not yet released or if the hop count from the ingress node is already reaching to the threshold. At this point, the reason for the label allocation failure is written in the label allocation failure message On the other hand, upon receiving the label allocation message from the node device R5, the node device R4 stores a correspondence of the label and the flow ID, the ingress node information, etc. from the node device R5, while returning the label allocation success message corresponding to the label allocation message to the node device R5, if the label "c" whose allocation is requested from the node device R3 is already released and the hop count from the ingress node is not yet reaching to the threshold.

Upon receiving the label allocation failure message, the node device R5 re-transmits the label allocation message regularly to the node device R4 as long as the reason for the label allocation failure is other than the hop count exceeding the threshold. As a result, the label switched path in the sequence of R1, R2, R5 and R4 is formed by the label allocation message that is re-transmitted after the label "c" between the node device R3 and the node device R4 is released.

As such, there are cases where a loop is detected even though a loop is actually not formed, in the case of the route change. In such a case, it is possible to resolve the problem that many unnecessary label switched paths are formed temporarily under a situation where the route is changed frequently in the transient state of the routing protocol, by ensuring that there is always only one label that is corresponding to the specific set (of the ingress node information and flow ID).

Third Embodiment

Referring now to FIG. 9 to FIG. 24, the label allocation protocol and the node device for carrying out the label switching according to this label allocation protocol according to the second embodiment of the present invention will be described.

In this third embodiment, a network layer address allocated to the output interface of the ingress node and a local identifier allocated to the output interface of the ingress node are used as the ingress node information used in the first and second embodiments described above.

In this case, it becomes possible to transmit a plurality of label allocation requests with respect to the same flow from a single ingress node, so that the label allocation protocol becomes flexible and it becomes easier to realize the interconnection between different label allocation protocols, the set up of the label switched path corresponding to multipath, etc.

In the following, some examples of the label switched path formed by using a network layer address allocated to the output interface of the ingress node and a local identifier allocated to the output interface of the ingress node as the ingress node information will be described.

Figure 9:
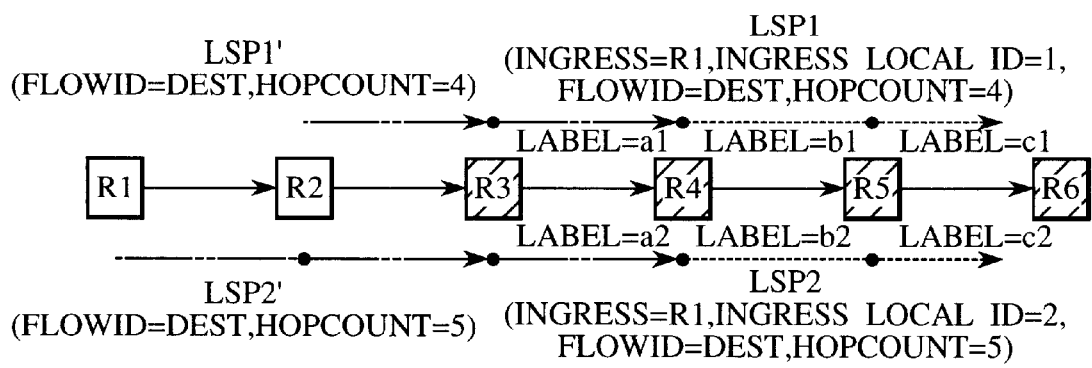
FIG. 9 is a schematic diagram for explaining an operation of a node device according to the third embodiment of the present invention.

In FIG. 9, the node devices R1 and R2 are node devices for setting up the label switched path using the conventional label allocation protocol, and the node devices R4 to R6 are node devices for setting up the label switched path using the label allocation protocol of this third embodiment. Also, the node device R3 is a node device which supports both the conventional label allocation protocol and the label allocation protocol of this third embodiment and connects the label switched paths formed by respective protocols.

In FIG. 9, two label switched paths (LSPs) 1' and 2' are set up from the ingress node devices R1 and R2 with respect to the destination address "dest". In this case, the node device R3 is the ending point node of the label switched paths 1' and 2', and functions to extend these label switched paths using the label allocation protocol of this third embodiment. Here, the label switched paths 1' and 2' have no ingress node information so that the node device R3 allocates local ID=1, 2 that are local at the output interfaces of the node device R3 to the label switched paths 1' and 2' in order to distinguish these two paths. Using these, the label switched paths 1 and 2 which have the node device R3 as the ingress node of the label switched path according to the label allocation protocol of this third embodiment are set up, and when the set up is completed, the label switching between the label switched paths 1' and 1 as well as between the label switched paths 2' and 2 becomes possible.

Figure 10:
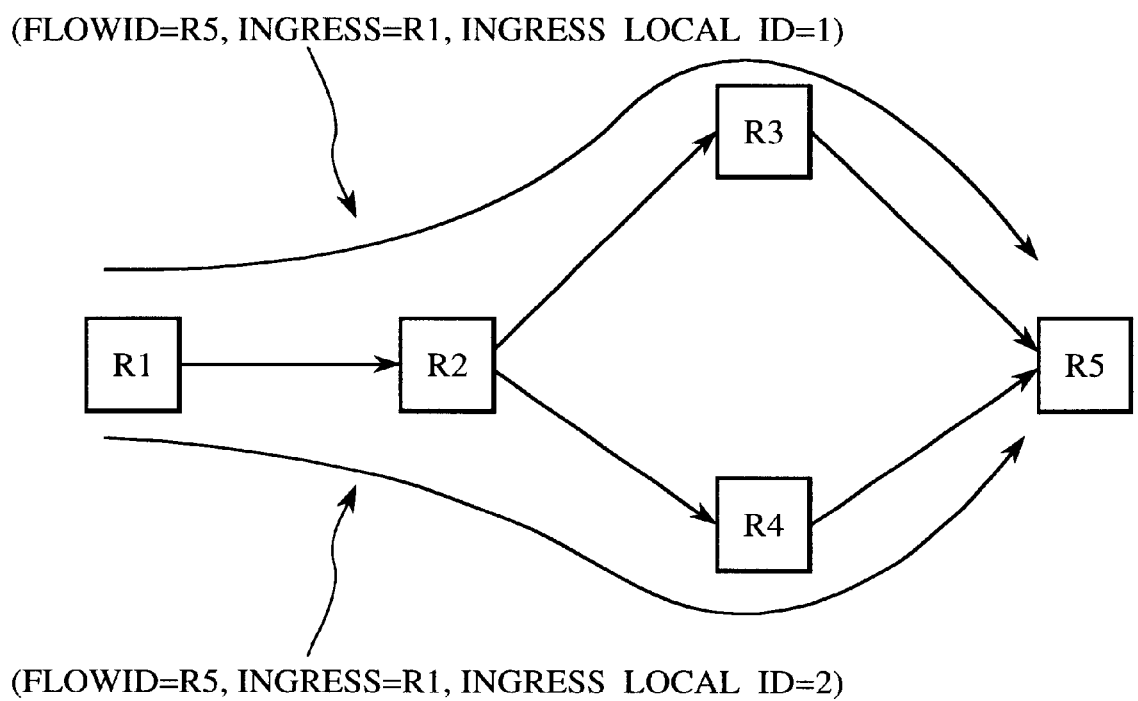
FIG. 10 is another schematic diagram for explaining an operation of a node device according to the third embodiment of the present invention.

FIG. 10 shows another example of the label switched path formed by using the local identifiers allocated to the output interfaces of the ingress node.

In FIG. 10, there are two routes from R1 to R5 including a router of R1→R2→R3→R5 and a route of R1→R2→R4→R5. In the case of forming the label switched paths corresponding to these routes with respect to a flow of Flowid=R5, two label switched paths are going to be formed from the ingress node R1. In order to distinguish these paths, two different Ingress Local ID including Ingress Local ID=1 and Ingress Local ID=2 are used with respect to the same Ingress=R1.

In the following, an exemplary message format, an exemplary flow table format, and an exemplary node device operation procedure for each embodiment described above will be described.

Figure 11:
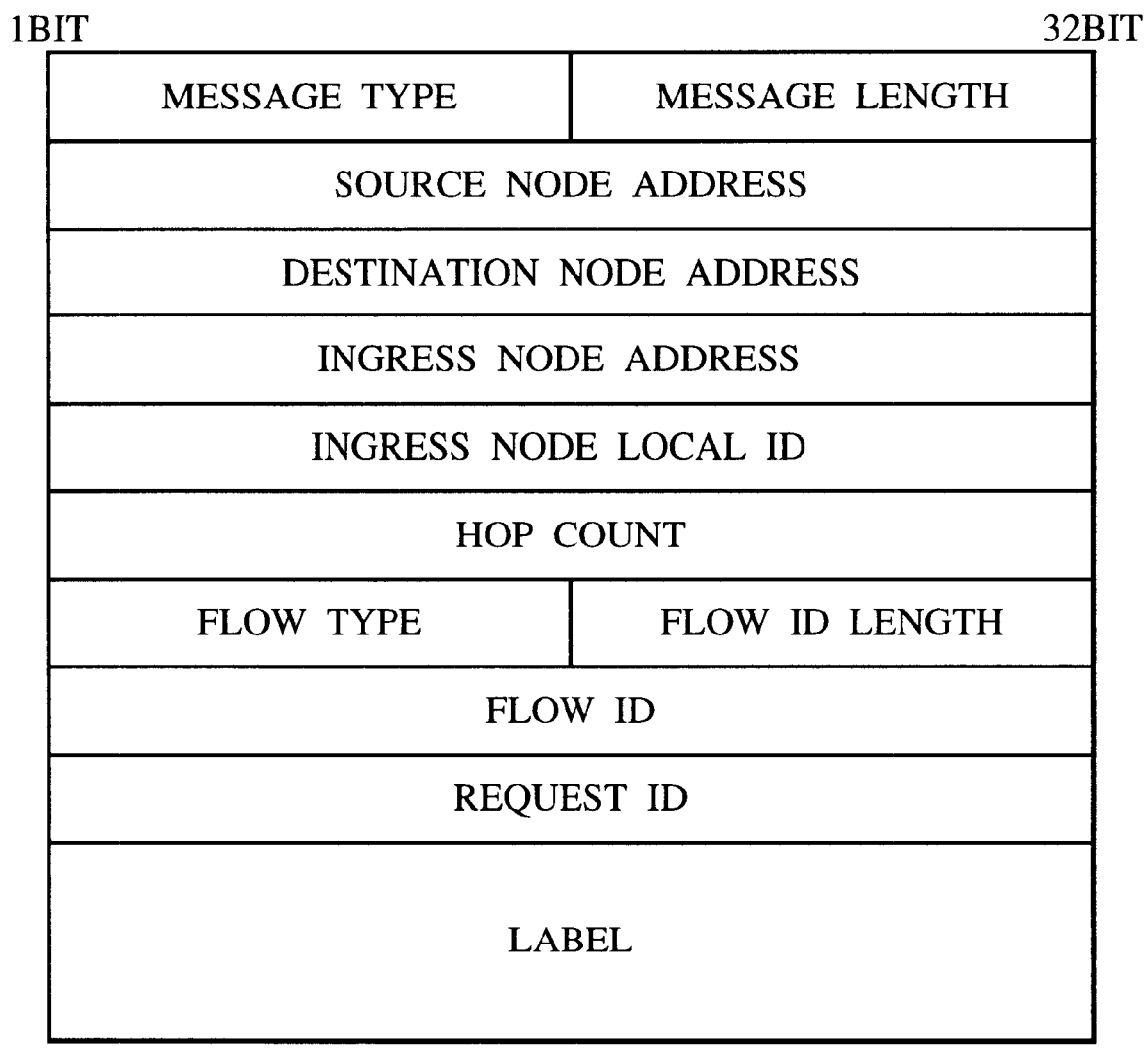
FIG. 11 is a diagram showing an exemplary format of a message such as a label allocation message that can used in the present invention.

FIG. 11 and FIG. 12 show two exemplary message formats that can be used. The format of FIG. 11 is to be used for the label allocation message, the label allocation success message, the hop count update message, the hop count update success message, the label release message, and the label release success message, while the format of FIG. 12 is to be used for the label allocation failure message, the hop count update failure message, and the label release failure message. FIG. 11 and FIG. 12 are identical except that an error code field is attached in the format of FIG. 12.

Note that in the case where the upstream side node allocates a label, the request ID field may be omitted. Also, in the case of not using the ingress node information, the ingress node address field and the ingress node local ID field may be omitted. Also, in the case of not using the hop count, the hop count field may be omitted, in which case the "hop count update message" will be referred to simply as "update message".

In FIG. 11 and FIG. 12, the message type field indicates a type of message (the label allocation message, the label allocation success message, the label allocation failure message, the hop count update message, the hop count update success message, the hop count update failure message) to be used in the label allocation protocol. In the first embodiment, the label allocation message, the label allocation success message and the label allocation failure message are used, whereas in the second embodiment, the label allocation message, the label allocation success message, the label allocation failure message, the hop count update message, the hop count update success message, and the hop count update failure message are used.

Also, the message length field indicates a length of an entire message. The source node address and destination node address fields indicate network addresses of the source and destination nodes of this message, respectively. The ingress node address field indicates an address of a node which generated the label allocation message initially. The ingress node local ID field indicates a local ID of an ingress node which is necessary in setting up the label switched path with respect to the same flow ID from the same ingress node.

In the first and second embodiments, the ingress node address constitutes the ingress node information. In this case, the ingress node local ID field is unnecessary. In the third embodiment, a set of the ingress node address and the ingress node local ID constitutes the ingress node information.

Also, the hop count field indicates the hop count from the ingress node. The flow type field indicates a type of flow ID, the flow ID length field indicates a bit or octet length of the flow ID, and the flow ID field indicates the flow ID expressed in bit or octet length specified by the flow ID length.

Also, the label field indicates a label allocated by the upstream side node in the case where the upstream side node allocates a label, or a label allocated by the downstream side node in correspondence to the request ID in the case where the downstream side node allocates a label (in which case the label field of the label allocation message transmitted from the upstream side node to the downstream side is either left empty or omitted). This label field may also indicate the layer 2 connection identifier.

In the label allocation failure message in the format of FIG. 12, the error code field is attached in addition to the fields of the label allocation message, where the reason for the label allocation failure is indicated by an error code. Here, seven error codes including those for "resource unavailable", "unknown label", "unknown flow type", "unknown flowid", "refused by policy", "hopcount threshold exceeded", and "same flowid for same ingress info." are defined as indicated in FIG. 12.

Note that the node that received the label allocation failure message may choose either an operation to transmit the label allocation message repeatedly at appropriate timing or an operation to stop transmission of the subsequent label allocation message, according to the error code value. For example, the transmission of the subsequent label allocation message is stopped when the error code is "hopcount threshold exceeded", and the label allocation message is transmitted repeatedly at appropriate timing for any other error code.

Next, FIG. 13 shows an exemplary format of a flow table to be used at the node device on which the label allocation protocol of the present invention operates.

The flow table registers a flow ID, an ingress node information (ingress node address or a set of ingress node address and ingress node local ID), an input side label (link ID, label), an output side label (link ID, label), a hop count, an ingress flag indicating whether it is an ingress node or not, and an egress flag indicating whether it is an egress node or not, for the flow that is currently label switched.

In the first and second embodiments, the Ingress node local ID field is unnecessary. Also, in the case of not using the hop count in the first embodiment, the hop count field is unnecessary.

The ingress flag is set by the node device corresponding to the ingress node information, at a time of transmitting the label allocation message.

The egress flag is set by the node device which is a destination of the flow specified by the flow ID or the node device whose next hop node does not support the label allocation protocol of the present invention, at a time of receiving the label allocation message, for example.

Note that each node device can learn whether the neighboring node device is supporting the label allocation protocol of the present invention or not by carrying out communications with the neighboring node device either in advance or as the need arises, for example.

Figure 14:
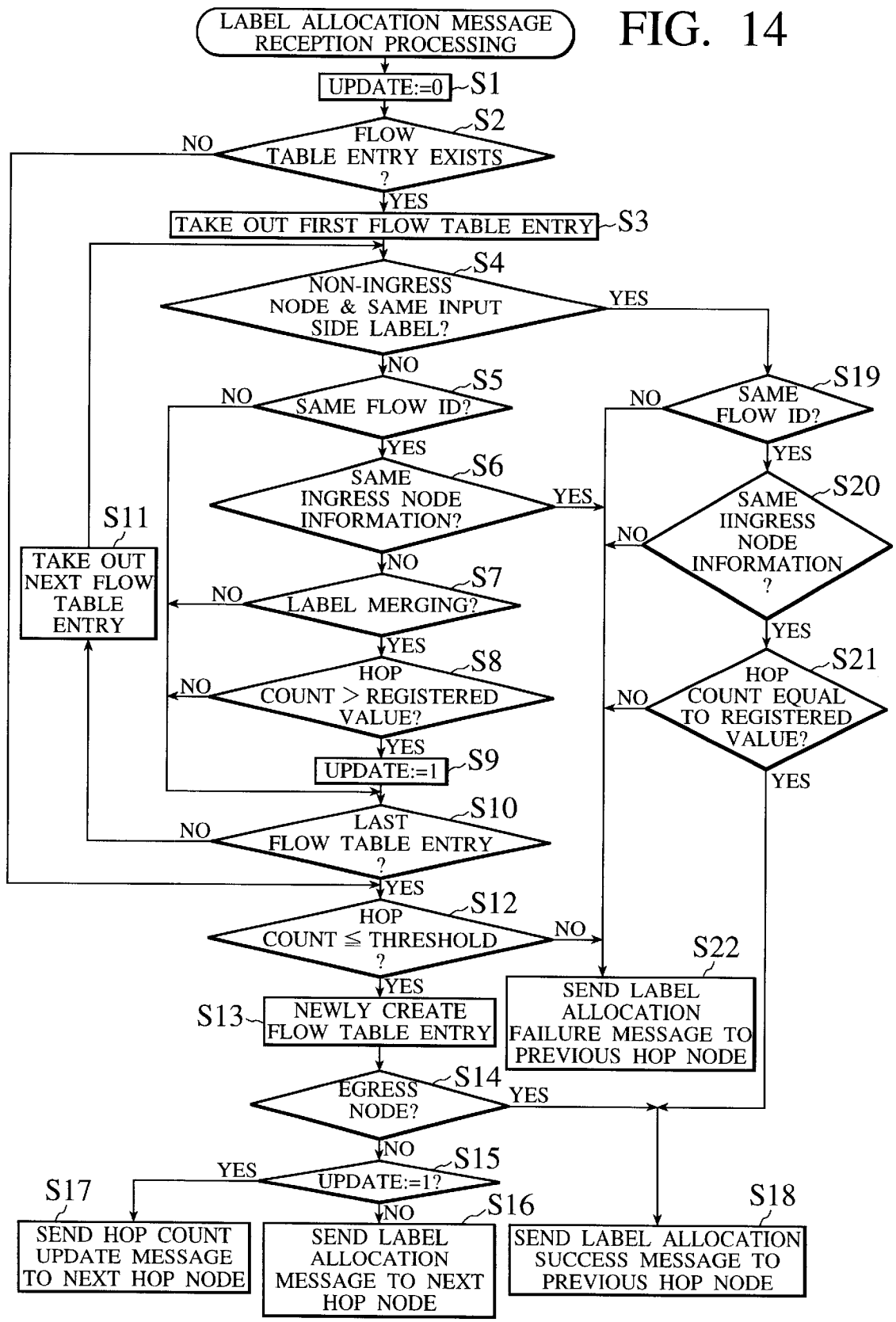
FIG. 14 is a flow chart for one exemplary operation of node device according to the present invention at a time of label allocation message reception.

Next, FIG. 14 shows an exemplary operation of the node device at a time of receiving the label allocation message in the first embodiment or the second embodiment.

When the label allocation message is received, an Update flag that indicates the hop count update is cleared first (step S1), and the flow table entry is sequentially taken out from the top of the flow table (steps S2, S3, S10, S11). When there is no flow table entry, the operation proceeds to the step S12.

When it is not an ingress node (the ingress flag is OFF) and the input side label in the entry is the same as the label in the received message (step S4 YES), whether the flow ID, the ingress node information and the hop count in the received message are the same as the values in the entry or not is checked (steps S19, S20, S21) and when they all coincide, the label allocation success message is returned to the previous hop node (step S18). Otherwise, the label allocation failure message is returned to the previous hop node (step S22). In this case, the label allocation message reception processing is terminated here.

On the other hand, when it is an ingress node (the ingress flag is ON) or the input side label in the entry is different from the label in the received message (step S4 NO), the flow ID is checked (step S5). When the flow ID is different, the next flow table entry is checked (steps S10, S11). When the flow ID is the same, whether the ingress node information is the same or not is checked (step S6). When the ingress node information is the same, the label allocation failure message is returned to the previous hop node (step S22).

When the ingress node information is different, if the label merging is supported and the hop count in the received message is greater than the hop count in the entry (steps S7 YES, S8 YES), the Update flag is set (step S9), and the next flow table entry is checked (steps S10, S11). When the label merging is not supported or the hop count in the received message is less than or equal to the hop count in the entry (step S7 NO or S8 NO), the next flow table entry is checked (steps S10, S11) while leaving the Update flag unchanged.

When the check of the flow table entry is finished to the end (step S10 YES), the hop count in the received message is checked (step S12). When the hop count exceeds the threshold, the label allocation failure message is returned to the previous hop node (step S22). When the hop count is less than or equal to the threshold, a flow table entry is newly created (step S13).

Then, if it is not an egress node (the egress flag is OFF) (step S14 NO), the Update flag is checked (step S15), and when the Update flag is ON, the hop count update message is transmitted to the next hop node (step S17). When the Update flag is OFF, the label allocation message is transmitted to the next hop node (step S16). At this step S16, the label allocation success message may also be transmitted to the previous hop node. If it is an egress node (the egress flag is ON) (step S14 YES), the label allocation success message is transmitted to the previous hop node (step S18).

Note that in the creation of the flow table entry at the step S13, the decision is kept pending, and confirmed only when the label allocation success message is returned, as already described above.

Also, in the case of not using the hop count, in FIG. 14, the output of the step S7 YES can be directly connected to the input of the step S9, the output of the step S2 NO and the output of the step S10 YES can be directly connected to the input of the step S13, and the output of the step S20 YES can be directly connected to the input of the step S18. In this case, the update message will always be transmitted to the next hop node from the merging point if it is not an egress node, so that the number of messages to be transmitted increases compared with the case of using the hop count.

Figure 15:
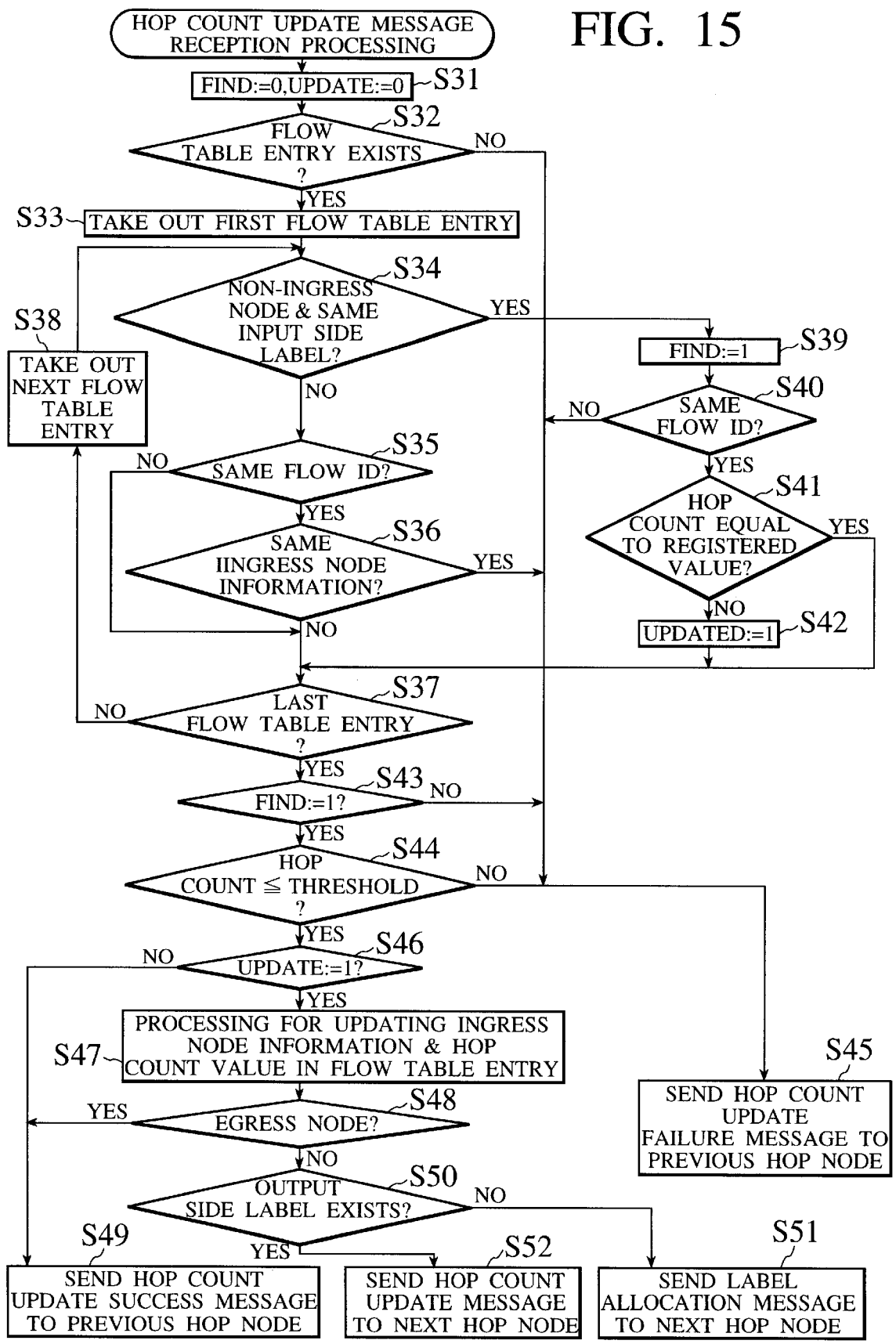
FIG. 15 is a flow chart for one exemplary operation of a node device according to the present invention at a time of hop count update message reception.

Next, FIG. 15 shows an exemplary operation of the node device at a time of receiving the hop count update message in the second embodiment.

When the hop count update message is received, a Find flag and an Update flag are set to 0 (step S31), and the flow table entry is sequentially taken out from the top of the flow table (steps S32, S33, S37, S38). When there is no flow table entry, the hop count update failure message is returned to the previous hop node (step S45).

When it is not an ingress node (the ingress flag is OFF) and the input side label in the entry is the same as the label in the received message (step S34 YES), the Find flag is set to 1 (step S39), and whether the flow ID in the received message is the same as the value in the entry or not is checked (step S40), and if they do not coincide, the hop count update failure message is returned to the previous hop node (step S45). If they coincide, whether the hop count is the same as the value in the entry or not is checked (step S41). If the hop count is the same, the next flow table entry is checked (steps S37, S38), whereas if the hop count is different, the Update flag is set to 1 (step S42) and the next flow table entry is checked (steps S37, S38).

On the other hand, when it is an ingress node (the ingress flag is ON) or the input side label in the entry is different from the label in the received message (step S34 NO), whether the flow ID in the received message is the same as the value in the entry or not is checked (step S35), and if they do not coincide, the next flow table entry is checked (steps S37, S38). If they coincide, whether the ingress node information in the received message is the same as the value in the entry or not is checked (step S36). If they coincide, the hop count update failure message is returned to the previous hop node (step S45). If they do not coincide, the next flow table entry is checked (steps S37, S38).

When the check of all the flow table entries is finished (step S37 YES), if the Find flag still remains 0 (step S43 NO), the hop count update failure message is returned to the previous hop node (step S45). If the Find flag is 1 (step S43 YES), whether the hop count in the received message is less than or equal to the threshold or not is checked (step S44), and if it exceeds the threshold, the hop count update failure message is returned to the previous hop node (step S45). If the hop count is less than or equal to the threshold, the Update flag is checked next (step S46).

If the Update flag still remains 0, the hop count update success message is transmitted to the previous hop node (step S49). If the Update flag is 1, the processing for updating the ingress node information and the hop count in the flow table entry is carried out (step S47), and whether it is an egress node or not is checked (step S48). If it is an egress node, the hop count update success message is transmitted to the previous hop node (step S49). If it is not an egress node, whether the output side label exists or not is checked (step S50). If it exists, the hop count update message is transmitted to the next hop node (step S52), whereas if it does not exist, the label allocation message is transmitted to the next hop node (step S51).

Note that in the processing for updating the ingress node information and the hop count in the flow table entry at the step S47, the decision is kept pending, and confirmed only when the hop count update success message is returned, as already described above.

Also, in the case of not using the hop count, in FIG. 15, the output of the step S43 YES can be directly connected to the input of the step S46, and the output of the step S40 YES can be directly connected to the input of the step S42. In this case, the label allocation message or the update message will always be transmitted to the next hop node if Find=1 and it is not an egress node, so that the number of messages to be transmitted increases compared with the case of using the hop count.

The processing procedure of the node device at a time of receiving the label allocation success message, the label allocation failure message, the hop count update success message or the hop count update failure message as well as the processing procedure of the ingress node device at a time of transmitting the label allocation message are the same as described above.

Figure 16:
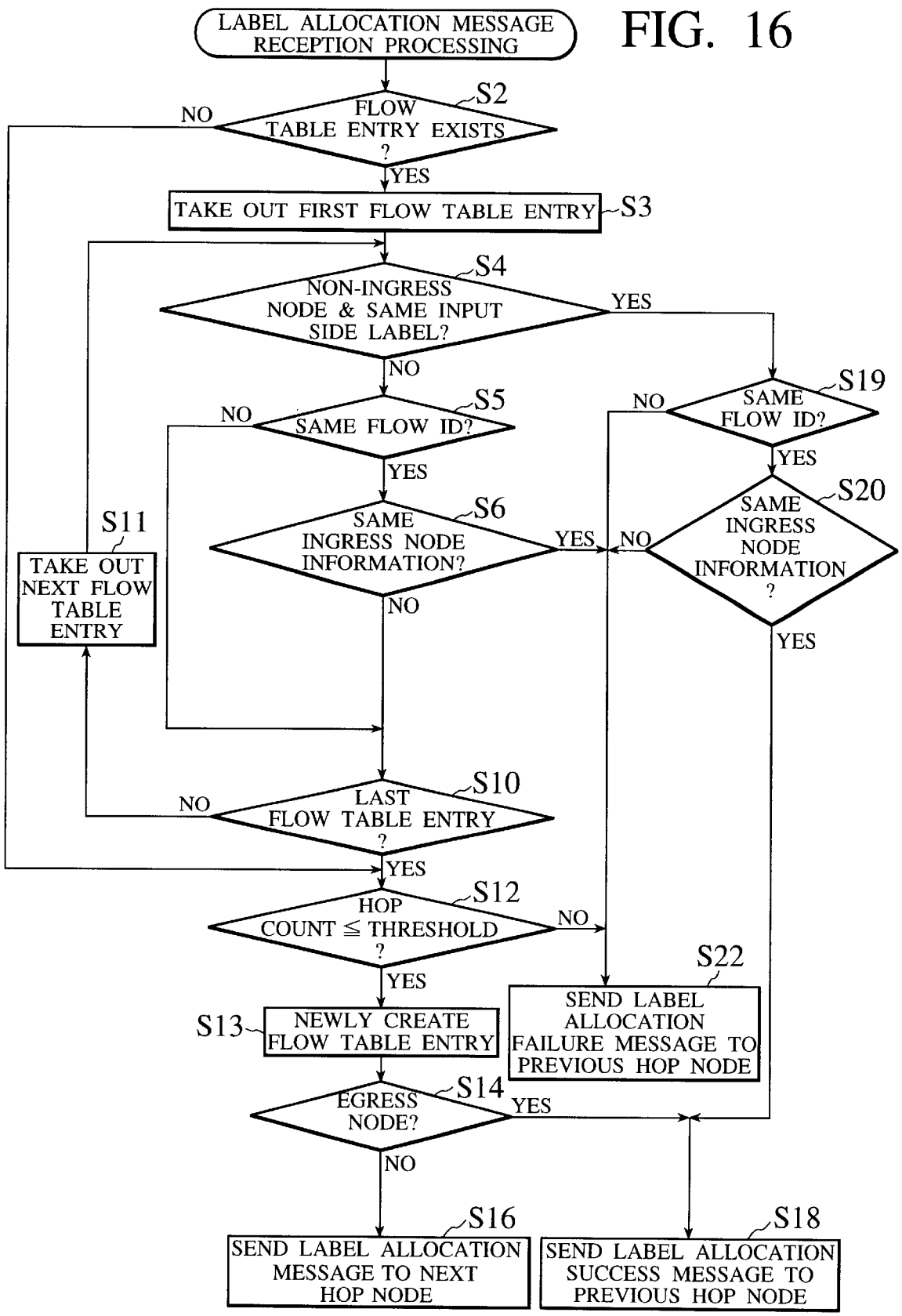
FIG. 16 is a flow chart for another exemplary operation of a node device according to the present invention at a time of label allocation message reception.

Next, FIG. 16 shows another exemplary operation of the node device at a time of receiving the label allocation message in the first embodiment or the second embodiment. When the label allocation message is received, the flow table entry is sequentially taken out from the top of the flow table (steps S2, S3, S10, S11). When there is no flow table entry, the operation proceeds to the step S12.

When it is not an ingress node (the ingress flag is OFF) and the input side label in the entry is the same as the label in the received message (step S4 YES), whether the flow ID and the ingress node information in the received message are the same as the values in the entry or not is checked (steps S19, S20) and when they all coincide, the label allocation success message is returned to the previous hop node (step S18). Otherwise, the label allocation failure message is returned to the previous hop node (step S22). In this case, the label allocation message reception processing is terminated here.

On the other hand, when it is an ingress node (the ingress flag is ON) or the input side label in the entry is different from the label in the received message (step S4 NO), the flow ID is checked (step 5S). When the flow ID is different, the next flow table entry is checked (steps S10, S11). When the flow ID is the same, whether the ingress node information is the same or not is checked (step S6). When the ingress node information is the same, the label allocation failure message is returned to the previous hop node (step S22). When the ingress node information is different, the next flow table entry is checked (steps S10, S11).

When the check of the flow table entry is finished to the end (step S10 YES), the hop count in the received message is checked (step S12). When the hop count exceeds the threshold, the label allocation failure message is returned to the previous hop node (step S22). When the hop count is less than or equal to the threshold, a flow table entry is newly created (step S13). Then, if it is not an egress node (the egress flag is OFF) (step S14 NO), the label allocation message is transmitted to the next hop node (step S16). If it is an egress node (the egress flag is ON) (step S14 YES), the label allocation success message is transmitted to the previous hop node (step S18).

FIG. 16 corresponds to the protocol that also uses the hop count, and in the case of not using the hop count, in FIG. 16, the step S12 can be omitted and the steps S2 and S10 can be directly connected to the step S13. In this example, however, in the case of not using the hop count, the ingress node information must be used for the loop detection.

Note that, by setting the node device of the second embodiment that uses the procedure of FIG. 15 such that it does not carry out the label merging all the times, it can be used as the node device (that uses the hop count as well) of the first embodiment.

The processing procedure of the node device at a time of receiving the label allocation success message or the label allocation failure message, as well as the processing procedure of the ingress node device at a time of transmitting the label allocation message are the same as described above.

The exemplary node device operation procedures described so far are directed to the case where the node device is separately carrying out an exclusive control by which the node device refuses to receive a message that requires a change of state from the previous hop node while waiting for an ACK signal after the message transmission to the next hop node. The following examples are directed to the case where the node device carries out an exclusive control by which the consistency of states over the entire label switched path is maintained at a time such as that of receiving a message that requires a change of state from the previous hop node while being in a state of waiting for ACK. In the following examples, as long as the node carries out the label merging, it is possible to realize the loop detection without using the ingress node information.

The message formats to be used in the following examples are the same as those shown in FIG. 11 and FIG. 12.

Next, FIG. 17 shows another exemplary format of a flow table to be used at the node device on which the label allocation protocol of the present invention operates.

The flow table registers a flow ID, an ingress node information (ingress node address or a set of ingress node address and ingress node local ID), an input side label (link ID, label), an output side label (link ID, label), a hop count, an ingress flag indicating whether it is an ingress node or not, an egress flag indicating whether it is an egress node or not, and a confirmation flag indicating whether the entry has been confirmed or not, for the flow that is currently label switched. Note that FIG. 17 is for an exemplary case where the flow ID comes in one type.

In the case of not using the ingress node information for the loop detection, the ingress node information field may be omitted, but in comparison with the case of using the ingress node information for the loop detection, there is a possibility for the label allocation message and the hop count update message for the purpose of the loop detection to pass through more nodes.

In the first and second embodiments, the ingress node local ID field is unnecessary. In the case of not using the hop count in the first embodiment, the hop count field is unnecessary.

The ingress flag is set by the node device corresponding to the ingress node information, at a time of transmitting the label allocation message.

The egress flag is set by the node device which is a destination of the flow specified by the flow ID or the node device whose next hop node does not support the label allocation protocol of the present invention, at a time of receiving the label allocation message, for example.

Note that each node device can learn whether the neighboring node device is supporting the label allocation protocol of the present invention or not by carrying out communications with the neighboring node device either in advance or as the need arises, for example.

Figure 18:
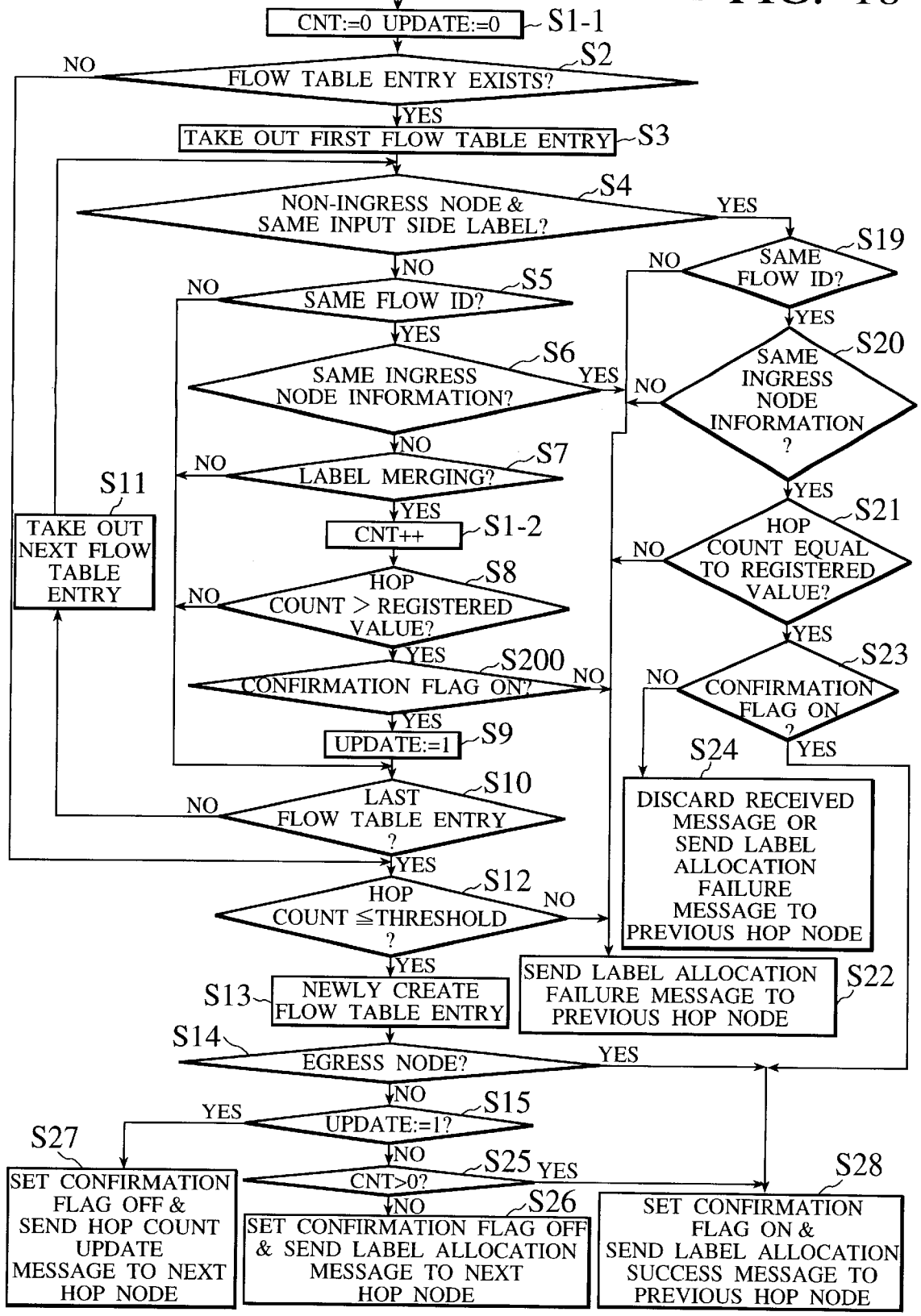
FIG. 18 is a flow chart for another exemplary operation of a node device according to the present invention at a time of label allocation message reception.

Next, FIG. 18 shows another exemplary operation of the node device at a time of receiving the label allocation message in the first embodiment or the second embodiment. This example is obtained by modifying the procedure of FIG. 14 such that always only one message is to be processed at a time of receiving the label allocation message.

When the label allocation message is received, an Update flag that indicates the hop count update is cleared and a counter Cnt that indicates the number of flows that are merged at the own node is reset to 0 first (step S1-1), and the flow table entry is sequentially taken out from the top of the flow table (steps S2, S3, S10, S81). When there is no flow table entry, the operation proceeds to the step S12.

When it is not an ingress node (the ingress flag is OFF) and the input side label in the entry is the same as the label in the received message (step S4 YES), whether the flow ID, the ingress node information and the hop count in the received message are the same as the values in the entry or not is checked (steps S19, S20, S21) and if any of them does not coincide, the label allocation failure message is transmitted to the previous hop node and the processing is terminated (step S22).

On the other hand, when they all coincide, the confirmation flag in the entry is checked (step S23), and if the confirmation flag is ON, the label allocation success message is transmitted to the previous hop node (step S28), whereas if the confirmation flag is OFF, either the received label allocation message is discarded or the label allocation failure message is transmitted to the previous hop node (step S24). In the case where the confirmation flag is OFF, the label allocation message reception processing is terminated here.

On the other hand, when it is an ingress node (the ingress flag is ON) or the input side label in the entry is different from the label in the received message (step S4 NO), the flow ID is checked (step S5). When the flow ID is different, the next flow table entry is checked (steps S10, S18). When the flow ID is the same, whether the ingress node information is the same or not is checked (step S6).

When the ingress node information is the same, the label allocation failure message is returned to the previous hop node (step S22).

When the ingress node information is different, if the label merging is supported (step S7 YES), the counter Cnt is incremented by one (step S1-2) and if also the hop count in the received message is greater than the hop count in the entry (steps S8 YES), whether the confirmation flag is ON or not is checked (step S200). If the confirmation flag is ON, the Update flag is set (step S9), and the next flow table entry is checked (steps S10, S11). If the confirmation flag is OFF, the label allocation message is transmitted to the previous hop node and the processing is terminated (step S22). In the case where the label merging is not supported or the hop count in the received message is less than or equal to the hop count in the entry (step S7 NO or S8 NO), the next flow table entry is checked (steps S10, S11) while leaving the Update flag unchanged.

When the check of the flow table entry is finished to the end (step S10 YES), the hop count in the received message is checked (step S12). When the hop count exceeds the threshold, the label allocation failure message is returned to the previous hop node (step S22). When the hop count is less than or equal to the threshold, a flow table entry is newly created (step S13). Then, if it is an egress node (the egress flag is ON) (step S14 YES), the confirmation flag is turned ON and the label allocation success message is transmitted to the previous hop node (step S18).

If it is not an egress node (the egress flag is OFF) (step S14 NO), the Update flag is checked (step S15), and when the Update flag is ON, the confirmation flag is turned OFF and the hop count update message is transmitted to the next hop node (step S27). When the Update flag is OFF, if cnt=0 (the own node is not the merging point) (step S25 NO), the confirmation flag is turned OFF and the label allocation message is transmitted to the next hop node (step S26), whereas if cnt=1 (the own node is the merging point) (step S25 YES), the confirmation flag is turned ON (the merging setting is made) and the label allocation success message is transmitted to the previous hop node (step S28). In the case where the Update flag is OFF and Cnt=0, the label allocation success message may also be transmitted to the previous hop node in addition to the above operation at the step S26.

Note that in the creation of the flow table entry at the step S13, the decision is kept pending (the confirmation flag is set OFF), and confirmed only when the label allocation success message is returned, as already described above (the confirmation flag is set ON).

Also, in the case of not using the ingress node information for the loop detection, in FIG. 18, the output of the step S5 YES can be directly connected to the input of the step S7, and the output of the step S19 YES can be directly connected to the input of the step S21. In this case, in comparison with the case of using the ingress node information for the loop detection, the label allocation message and the hop count update message for the purpose of the loop detection will pass through more nodes.

Also, in the case of not using the hop count, in FIG. 18, the output of the step S1-2 YES can be directly connected to the input of the step S200, the output of the step S2 NO and the output of the step S10 YES can be directly connected to the input of the step S13, and the output of the step S20 YES can be directly connected to the input of the step S23. In this case, the hop count update message will always be transmitted to the next hop node from the merging point if it is not an egress node, so that the number of messages to be transmitted increases compared with the case of using the hop count.

Figure 19:
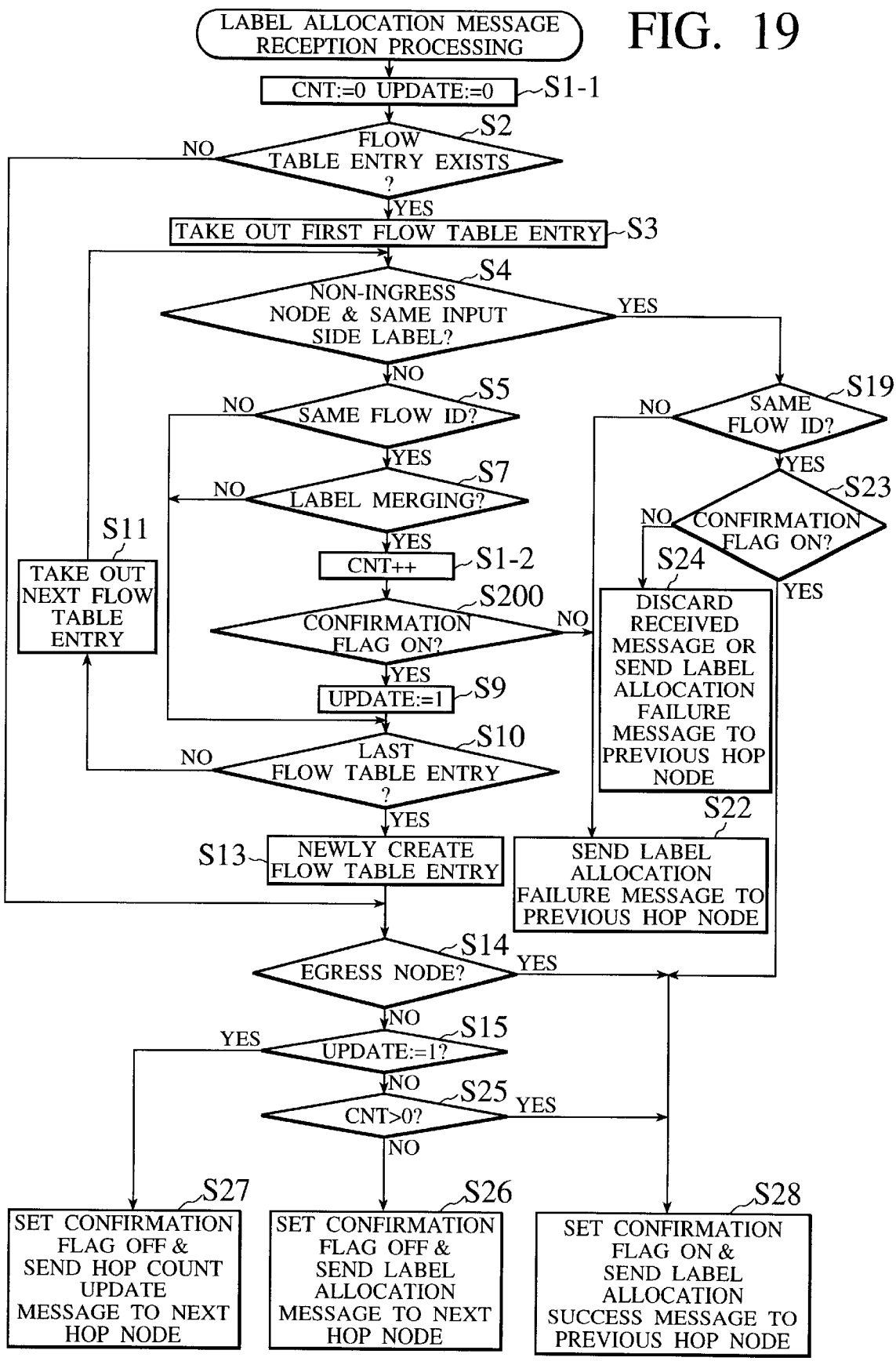
FIG. 19 is a flow chart for another exemplary operation of a node device according to the present invention at a time of label allocation message reception.

In the case where every node in the network supports the label merging, it is also possible not to use both the ingress node information and the hop count. In this case, the flow chart for the operation becomes the common part of the flow chart for the case of not using the ingress node information for the loop detection and the flow chart for the case of not using the hop count, which is as shown in FIG. 19.

Figure 20:
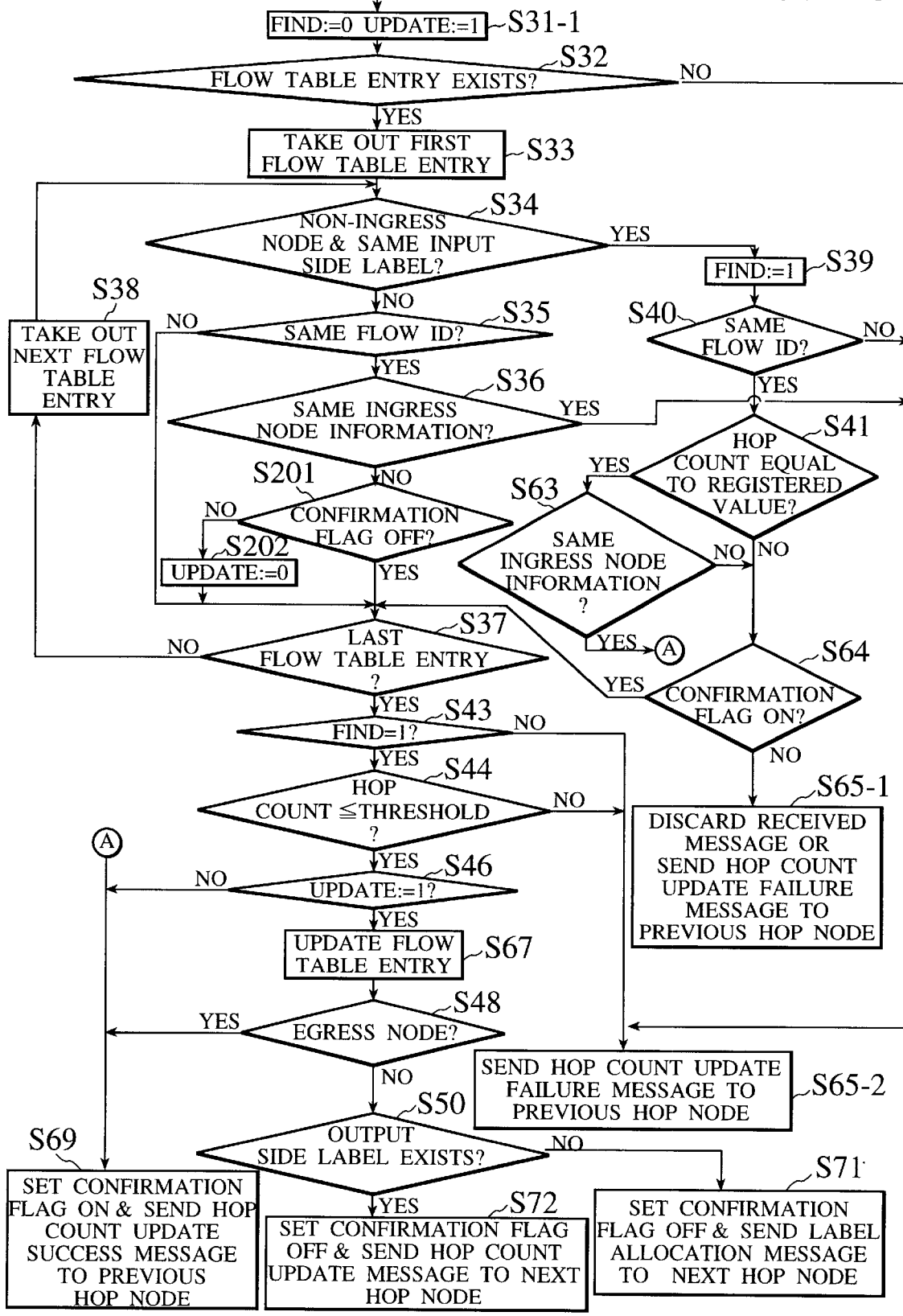
FIG. 20 is a flow chart for another exemplary operation of a node device according to the present invention at a time of hop count update message reception.

Next, FIG. 20 shows another exemplary operation of the node device at a time of receiving the hop count update message in the second embodiment. This example is obtained by modifying the procedure of FIG. 15 such that always only one message is to be processed at a time of receiving the hop count update message.

When the hop count update message is received, a Find flag is set to 0 and an Update flag is set to 1 (step S31-1), and the flow table entry is sequentially taken out from the top of the flow table (steps S32, S33, S37, S38). When there is no flow table entry, the hop count update failure message is returned to the previous hop node (step S65-2).

When it is not an ingress node (the ingress flag is OFF) and the input side label in the entry is the same as the label in the received message (step S34 YES), the Find flag is set to 1 (step S39), and whether the flow ID in the received message is the same as the value in the entry or not is checked (step S40), and if they do not coincide, the hop count update failure message is returned to the previous hop node and the processing is terminated (step S65-2). If they coincide, whether the hop count is the same as the value in the entry or not is checked (step S41), and if the hop count is the same, whether the ingress node information is the same or not is checked (step S63).

If the ingress node information is the same, the confirmation flag is turned ON and the hop count update success message is transmitted to the previous hop node (step S69). If the hop count is different or the ingress node information is different, the confirmation flag in the entry is checked (step S64), and if the confirmation flag is ON, the next flow table entry is checked (steps S37, S38). If the confirmation flag is OFF, either the received message is discarded or the hop count update failure message is transmitted to the previous node and the processing is terminated (step S65-1).

On the other hand, when it is an ingress node (the ingress flag is ON) or the input side label in the entry is different from the label in the received message (step S34 NO), whether the flow ID in the received message is the same as the value in the entry or not is checked (step S35), and if they do not coincide, the next flow table entry is checked (steps S37, S38). If they coincide, whether the ingress node information in the received message is the same as the value in the entry or not is checked (step S36). If they coincide, the hop count update failure message is returned to the previous hop node (step S65-2). If they do not coincide, whether the confirmation flag is OFF or not is checked (step S201), and if the confirmation flag is OFF, the next flow table entry is checked (steps S37, S38) whereas if the confirmation flag is ON, the Update flag is cleared to 0 (step S202) and the next flow table entry is checked (steps S37, S38).

When the check of all the flow table entries is finished (step S37 YES), if the Find flag still remains 0 (step S43 NO), the hop count update failure message is returned to the previous hop node (step S65-2). If the Find flag is 1 (step S43 YES), whether the hop count in the received message is less than or equal to the threshold or not is checked (step S44), and if it exceeds the threshold, the hop count update failure message is returned to the previous hop node (step S65-2). If the hop count is less than or equal to the threshold, the Update flag is checked next (step S46).

If the Update flag still remains 0, the confirmation flag is turned ON and the hop count update success message is transmitted to the previous hop node (step S69). If the Update flag is 1, the processing for updating the ingress node information and the hop count in the flow table entry is carried out (step S67), and whether it is an egress node or not is checked (step S48). If it is an egress node, the confirmation flag is turned ON and the hop count update success message is transmitted to the previous hop node (step S69). If it is not an egress node, whether the output side label exists or not is checked (step S50). If it exists, the confirmation flag is turned OFF and the hop count update message is transmitted to the next hop node (step S72), whereas if it does not exist, the confirmation flag is turned OFF and the label allocation message is transmitted to the next hop node (step S71).

Here, the node other than the egress node may transmit the hop count update success message to the previous hop node while executing the step S71 or S72 in the case where the updated hop count value becomes less than the value before the update.

Note that in the processing for updating the ingress node information and the hop count in the flow table entry at the step S67, the decision is kept pending, and confirmed only when the hop count update success message is returned, as already described above.

Also, in the case of not using the ingress node information for the loop detection, in FIG. 20, the output of the step S35 YES can be directly connected to the input of the step S201, and the output of the step S41 YES can be directly connected to the input of the step S69. In this case, in comparison with the case of using the ingress node information for the loop detection, the label allocation message and the hop count update message for the purpose of the loop detection will pass through more nodes.

Also, in the case of not using the hop count, in FIG. 20, the output of the step S43 YES can be directly connected to the input of the step S46, and the output of the step S40 YES can be directly connected to the input of the step S64 (as a result the step S63 is omitted). Also, the message to be transferred through a portion after the merging point where the label switched path already exists may be given in a form of "update message" without containing the hop count. In this case, the label allocation message or the hop count update message will always be transmitted to the next hop node if Find=1 and it is not an egress node, so that the number of messages to be transmitted increases compared with the case of using the hop count.

Figure 21:
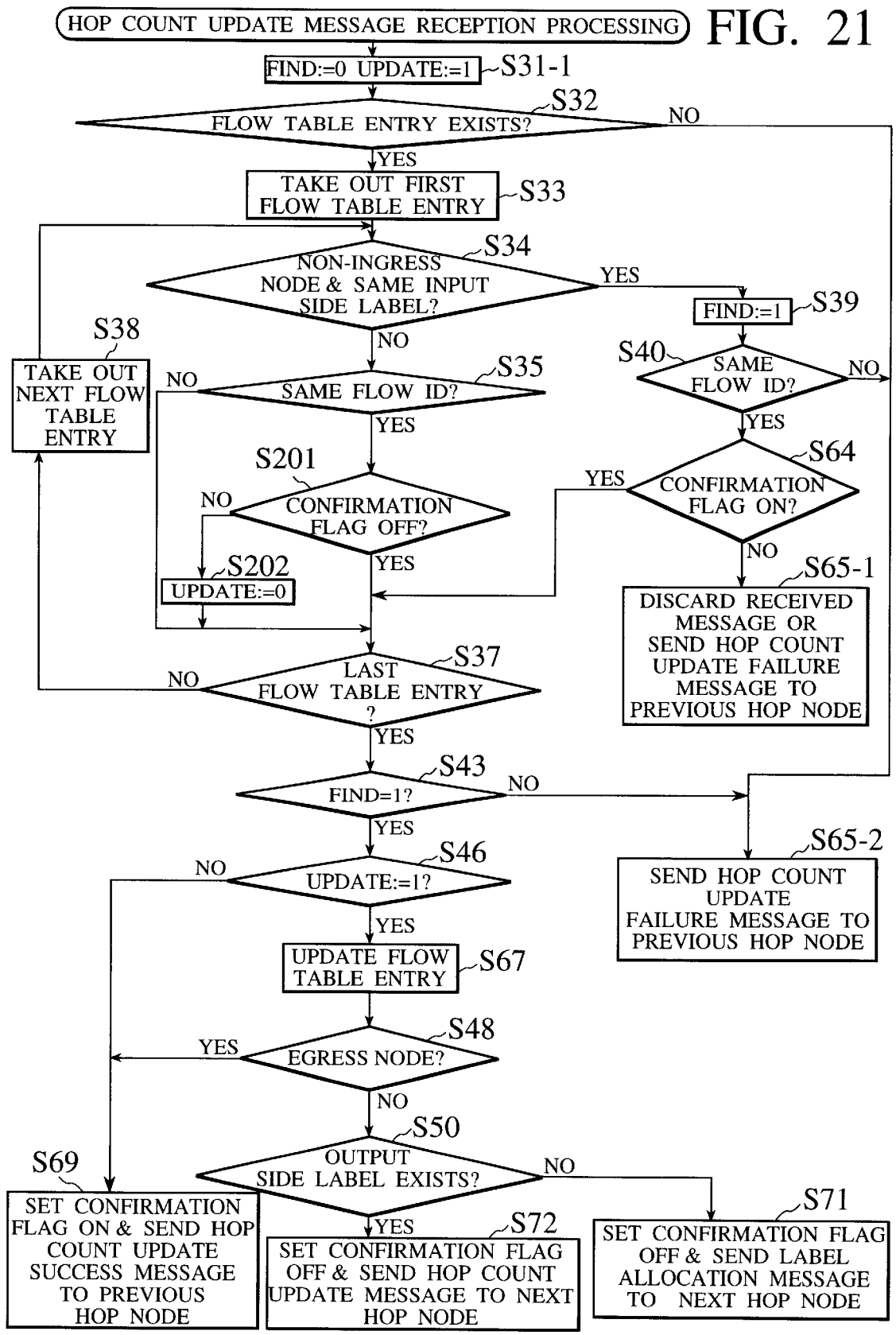
FIG. 21 is a flow chart for another exemplary operation of a node device according to the present invention at a time of hop count update message reception.

In the case where every node in the network supports the label merging, it is also possible not to use both the ingress node information and the hop count. In this case, the flow chart for the operation becomes the common part of the flow chart for the case of not using the ingress node information for the loop detection and the flow chart for the case of not using the hop count, which is as shown in FIG. 21.

The processing procedure of the node device at a time of receiving the label allocation success message, the label allocation failure message, the hop count update success message or the hop count update failure message as well as the processing procedure of the ingress node device at a time of transmitting the label allocation message are the same as described above.

Figure 22:
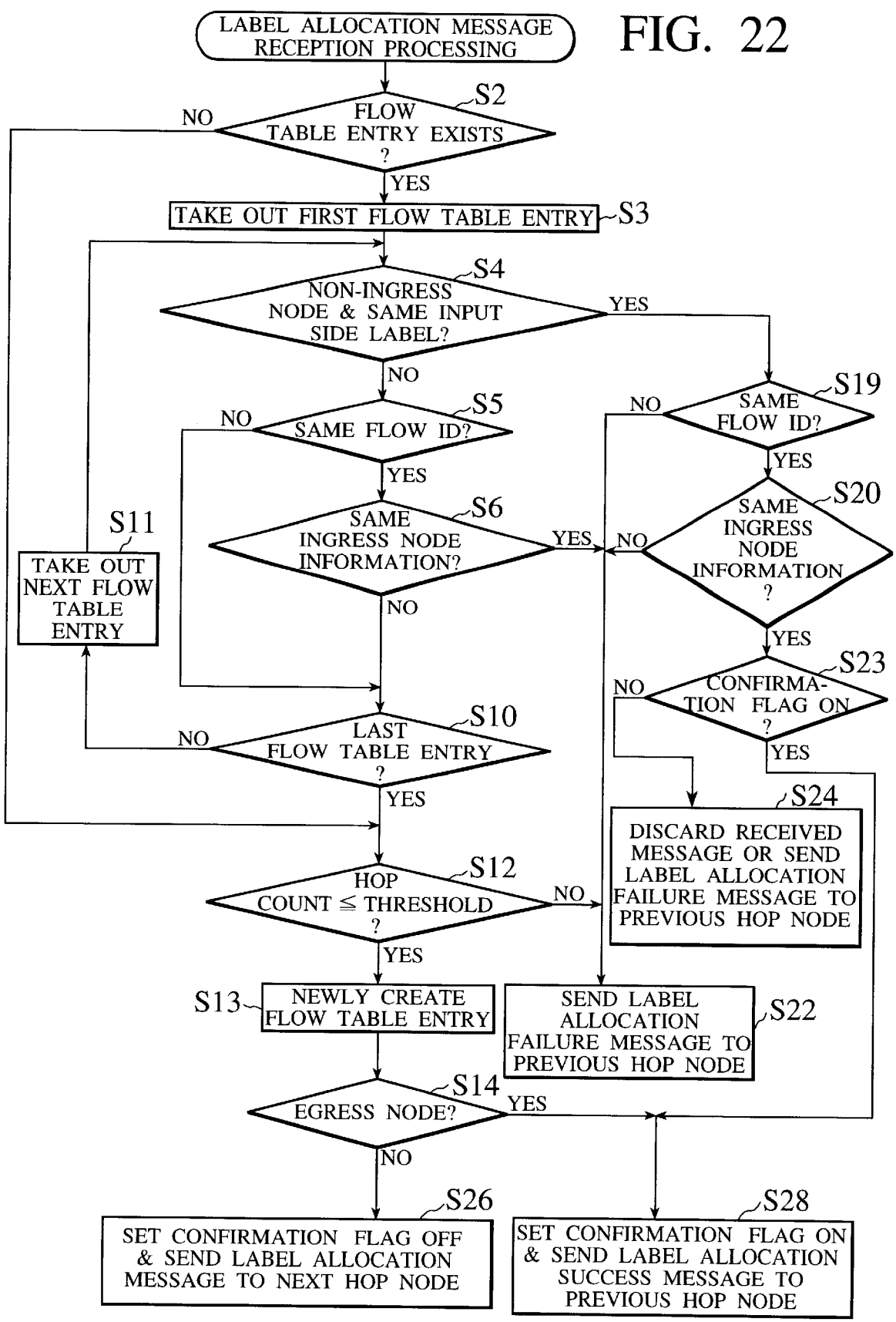
FIG. 22 is a flow chart for another exemplary operation of a node device according to the present invention at a time of label allocation message reception.

Next, FIG. 22 shows another exemplary operation of the node device at a time of receiving the label allocation message in the first embodiment or the second embodiment. This example is obtained by modifying the procedure of FIG. 16 such that always only one message is to be processed at a time of receiving the label allocation message.

When the label allocation message is received, the flow table entry is sequentially taken out from the top of the flow table (steps S2, S3, S10, S11). When there is no flow table entry, the operation proceeds to the step S12.

When it is not an ingress node (the ingress flag is OFF) and the input side label in the entry is the same as the label in the received message (step S4 YES), whether the flow ID and the ingress node information in the received message are the same as the values in the entry or not is checked (steps S19, S20) and when they all coincide, whether the confirmation flag is ON or not is checked (step S23). If the confirmation flag is OFF, either the received message is discarded or the label allocation failure message is transmitted to the previous hop node (step S24). If the confirmation flag is ON, the label allocation success message is returned to the previous hop node (step S28). If the flow ID is different or the ingress node information is different, the label allocation failure message is returned to the previous hop node (step S22). In this case, the label allocation message reception processing is terminated here.

On the other hand, when it is an ingress node (the ingress flag is ON) or the input side label in the entry is different from the label in the received message (step S4 NO), the flow ID is checked (step S5). When the flow ID is different, the next flow table entry is checked (steps S10, S11). When the flow ID is the same, whether the ingress node information is the same or not is checked (step S6). When the ingress node information is the same, the label allocation failure message is returned to the previous hop node (step S22). When the ingress node information is different, the next flow table entry is checked (steps S10, S11).

When the check of the flow table entry is finished to the end (step S10 YES), the hop count in the received message is checked (step S12). When the hop count exceeds the threshold, the label allocation failure message is returned to the previous hop node (step S22). When the hop count is less than or equal to the threshold, a flow table entry is newly created (step S13). Then, if it is not an egress node (the egress flag is OFF) (step S14 NO), the confirmation flag is turned OFF and the label allocation message is transmitted to the next hop node (step S26). If it is an egress node (the egress flag is ON) (step S14 YES), the confirmation flag is turned ON and the label allocation success message is transmitted to the previous hop node (step S18).

FIG. 22 corresponds to the protocol that also uses the hop count, and in the case of not using the hop count, in FIG. 22, the step S12 can be omitted and the steps S2 and S10 can be directly connected to the step S13. In this example, however, in the case of not using the hop count, the ingress node information must be used for the loop detection.

Note that, by setting the node device of the second embodiment that uses the procedure of FIG. 20 such that it does not carry out the label merging all the times, it can be used as the node device (that uses the hop count as well) of the first embodiment.

The processing procedure of the node device at a time of receiving the label allocation success message or the label allocation failure message, as well as the processing procedure of the ingress node device at a time of transmitting the label allocation message are the same as described above.

Next, the operation of the node device in the case of releasing the label switched path while the merging is possible will be described. In the case of releasing the label switched path, the node device transmits a "label release message" to the next hop node. Then, upon receiving a "label release success message" from the next hop node, the node that transmitted the "label release message" deletes the corresponding flow table entry.

Figure 23:
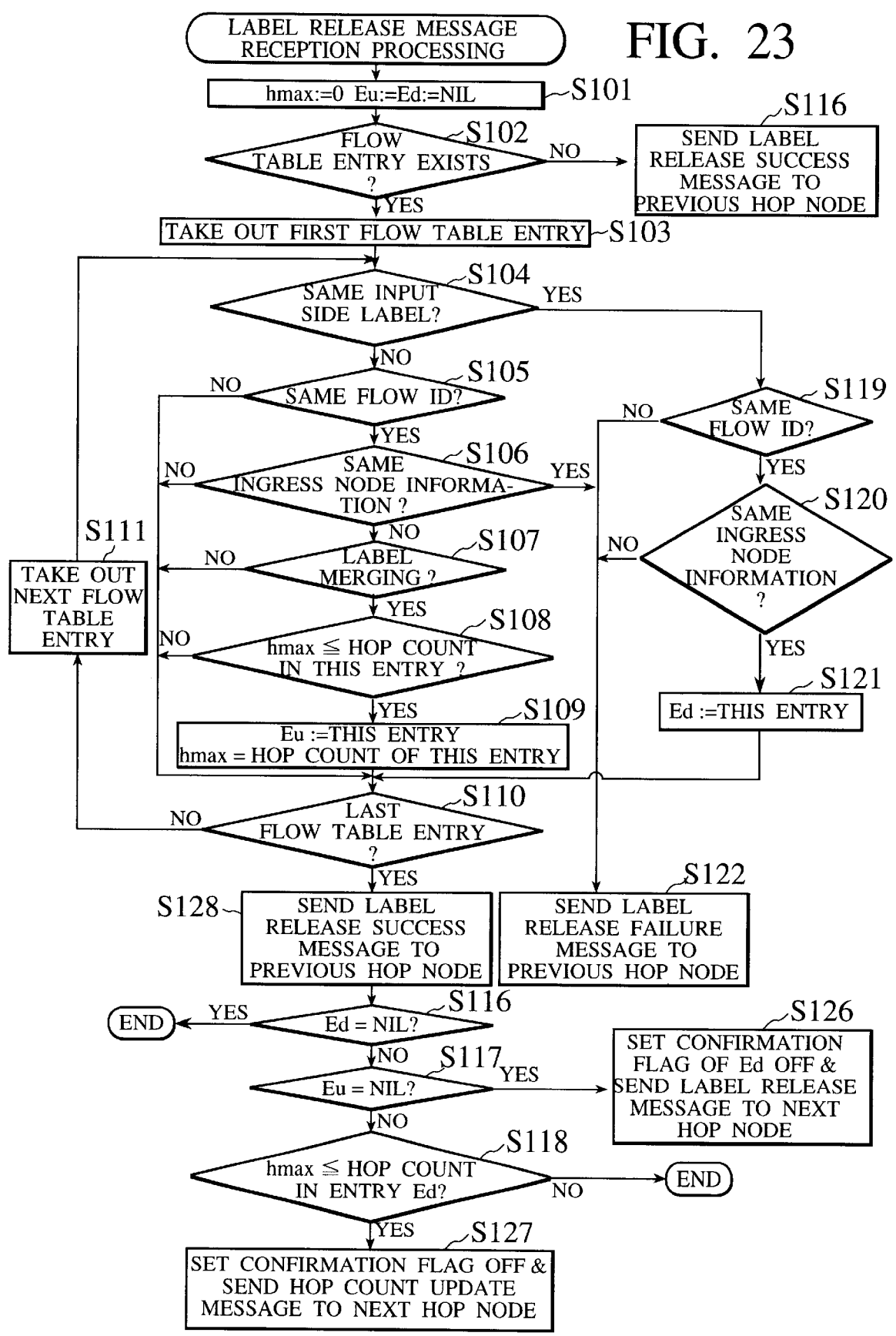
FIG. 23 is a flow chart for one exemplary operation of a node device according to the present invention at a time of label release message reception.

FIG. 23 shows an exemplary operation of the node device at a time of receiving the label release message in the first embodiment or the second embodiment.

In FIG. 23, Ed is a variable for indicating a flow table entry corresponding to the received label release message, Eu is a variable for indicating a flow table entry that gives the maximum hop count from the ingress node after the entry Eu is deleted, and hmax is a variable for indicating the maximum hop count value from the ingress node after the entry Ed is deleted.

When the label release message is received, Ed and Eu are initialized to NIL and hmax is initialized to 0 (step S101), and the flow table entry is sequentially taken out from the top of the flow table (steps S102, S103, S110, S111). When there is no flow table entry, the label release success message is returned to the previous hop node (step S116).

For each flow table entry, the following processing is carried out. First, whether the input side label is the same as the label value in the received message or not is checked (step S104), and if it is the same, whether the flow ID and the ingress node information in the received message are the same as the values in the entry or not is checked (steps S119, S120). If either one of them does not coincide, the label release failure message is transmitted to the previous hop node and the processing is terminated (step S122), whereas if both the flow ID and the ingress node information are the same as the values in the entry, Ed is set equal to this entry (step S121), and the next flow table entry is checked (steps S110, S111).

On the other hand, when the input side label differs from the label value in the received message, whether the flow ID in the message is the same as the value in the entry or not is checked (step S105). When the flow ID is different, the next flow table entry is checked (steps S110, S111). When the flow ID is the same, whether the ingress node information in the message is the same as the value in the entry or not is checked (step S106). When the ingress node information is the same, the label release failure message is transmitted to the previous hop node and the processing is terminated (step S122).

When the ingress node information is different, whether this node supports the label merging or not is checked (step S107), and if the label merging is not supported, the next flow table entry is checked (steps S110, S111). If the label merging is supported, when hmax is greater than the hop count of this entry (step S108 NO), the next flow table entry is checked (steps S110, S111), whereas when hmax is less than or equal to the hop count of this entry (step S108 YES), Eu is set equal to this entry and hmax is set equal to the hop count of this entry (step S109) and the next flow table entry is checked (steps S110, S111).

When the check of the flow table entry is finished (step S110 YES), the label release success message is transmitted to the previous hop node (step S128). Then, the processing is terminated if Ed is NIL (step S116 YES), or otherwise whether Eu is NIL or not is checked (step S117). If Eu is NIL, the confirmation flag of Ed is turned OFF and the label release message is transmitted to the next hop node and then the processing is terminated (step S126). If Eu is not NIL, when hmax is greater than the hop count in the entry Ed (step S118 NO), the processing is terminated, and when hmax is less than or equal to the hop count in the entry Ed (step S118 YES), the confirmation flag of Eu is turned OFF and the hop count update message is transmitted to the next hop node and then the processing is terminated (step S127).

Here, the values in the entry Eu are written into the hop count and the ingress node information in the hop count update message to be transmitted.

Note that when the node receives the label release success message (the label release failure message) with respect to some output side label, this node deletes that entry if the confirmation flag in the flow table entry for that output side label is OFF.

By the above processing, it becomes possible to maintain the updated ingress node information and hop count value correctly after the label release at each node, even in the case where the ingress node that gives the maximum hop count value among the upstream side nodes changes, and it becomes possible to carry out the loop detection even in the case where the label switched path generation and release occur asynchronously.

Note that, in the case of not using the ingress node information for the loop detection, in FIG. 23, the output of the step S105 YES can be directly connected to the input of the step S107, and the output of the step S119 YES can be directly connected to the input of the step S121.

Also, in the case of not using the hop count, in FIG. 23, the processing at the step S109 can be modified to just setting Eu equal to this entry by omitting the operation for setting hmax equal to the hop count of this entry, while the output of the step S107 YES can be directly connected to the input of the step S109 as modified above, and the output of the step S117 NO can be directly connected to the input of the step S127. In this case, the number of messages to be transmitted increases compared with the case of using the hop count.

Note that, in the case of carrying out the loop detection by writing the ingress node information of arbitrary flow table entry with respect to the flow of interest which has the common output side label into the hop count update message and transmitting such a hop count update message, the label switched path release procedure can be realized similarly as in the case of not using the hop count.

Figure 24:
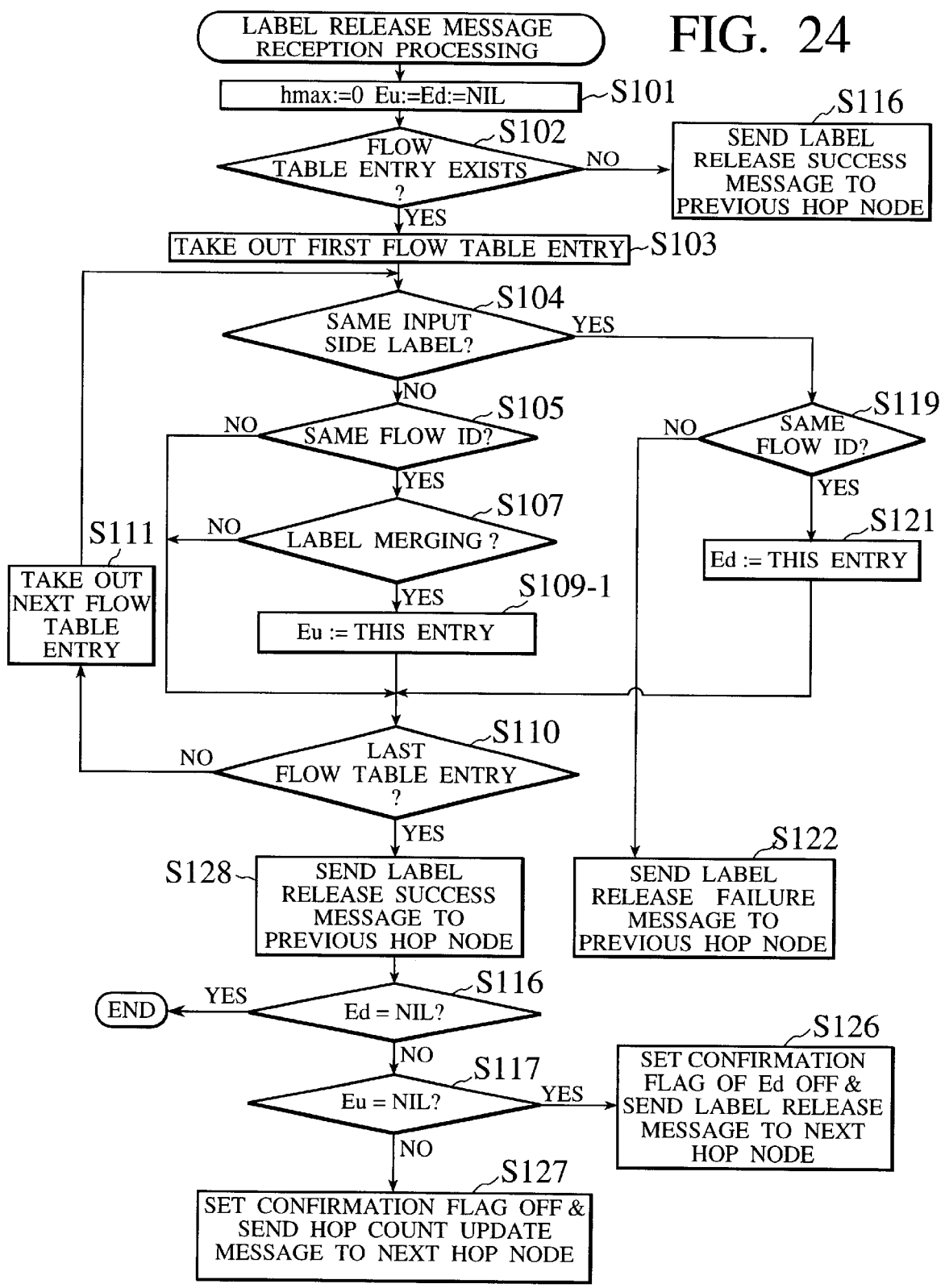
FIG. 24 is a flow chart for another exemplary operation of a node device according to the present invention at a time of label release message reception.

In the case where every node in the network supports the label merging, it is also possible not to use both the ingress node information and the hop count. In this case, the flow chart for the operation becomes the common part of the flow chart for the case of not using the ingress node information for the loop detection and the flow chart for the case of not using the hop count, which is as shown in FIG. 24.

Note that the procedures of FIG. 14, FIG. 15 and FIG. 16 are those to which the modification for not using the confirmation flag is applied to the procedures of FIG. 18, FIG. 20 and FIG. 22, respectively, and it is similarly possible to apply the modification for not using the confirmation flag to the procedure of FIG. 23. It is also possible to apply the modification for not using the confirmation flag to the procedure of FIG. 23 which is also modified not to use the hop count.

Next, an exemplary case of carrying out the label switched path loop detection of the above described embodiments in the case of multicast will be described. In the case of multicast, the label merging is not carried out, and the label switched path is set up by the initiative of the ingress node. The packet format is the same as in the case of unicast, and the label can be allocated at either the upstream side node or the downstream side node.

For the flow ID, the multicast group address is used when the multicast routing table entry is provided for each multicast group address, or a set of the source address and the multicast group address is used when the multicast routing table entry is provided for each set of the source address and the multicast group address.

The flow table format in the case of not using the confirmation flag is similar to that of FIG. 13 except that the output side label field is replaced by one or more output side label fields corresponding to output branches of the multicast at the own node.

The flow table format in the case of using the confirmation flag is similar to that of FIG. 17 except that the output side label field is replaced by one or more output side label fields corresponding to output branches of the multicast at the own node.

Next, the operation at a time of the label switched path generation in the case of multicast will be described.

First, the ingress node transmits the label allocation message to each output branch of the multicast at the own node, at a time of activating the label switched path generation.

In the case of not using the confirmation flag, the node that received the label allocation message operates similarly as in the case of unicast according to the flow chart of FIG. 16, except that the step S16 of FIG. 16 is changed to the step for transmitting the label allocation message to each output branch of the multicast at the own node.

In the case of using the confirmation flag, the node that received the label allocation message operates similarly as in the case of unicast according to the flow chart of FIG. 22, except that the step S26 of FIG. 22 is changed to the step of turning the confirmation flag OFF and transmitting the label allocation message to each output branch of the multicast at the own node.

On the other hand, at the node that received the label allocation success message or the label allocation failure message from the downstream side neighboring node of each branch of the multicast at the own node, any one of the following operations is carried out.

(1) When the label allocation success messages are received from the downstream side neighboring nodes of all the branches, the label allocation success message is returned to the upstream side neighboring node, whereas when the label allocation failure message is received from the downstream side neighboring node of at least one branch, the label allocation failure message is returned to the upstream side neighboring node. (If it is possible to form the label switched paths end-to-end for all the branches, the label switched paths to all the multicast receivers are set up.)

(2) The label allocation success message is always returned to the upstream side neighboring node. (Regardless of the downstream side, the label switched path from the sender up to the own node is set up.)

(3) When the label allocation success message is received from the downstream side neighboring node of at least one branch, the label allocation success message is returned to the upstream side neighboring node, whereas when the label allocation failure messages are received from the downstream side neighboring nodes of all the branches, the label allocation failure message is returned to the upstream side neighboring node. (If it is possible to form the label switched path end-to-end for some branch, the label switched path from the sender to that receiver is set up.)

Next, the operation at a time of the label switched path release in the case of multicast will be described.

First, the node that activates the label switched path release transmits the label release message to each output branch of the multicast at the own node.

In the case of using the hop count, the node that received the label release message operates similarly as in the case of unicast according to the flow chart of FIG. 23, except that the step S126 of FIG. 23 is changed to the step of turning the confirmation flag of Ed OFF and transmitting the label release message to each output branch of the multicast at the own node. Also, in this case, there is no possibility for the step S117 NO.

In the case of not using the hop count, the node that received the label release message operates similarly as in the case of unicast according to the flow chart of FIG. 24, except that the step S126 of FIG. 24 is changed to the step of turning the confirmation flag of Ed OFF and transmitting the label release message to each output branch of the multicast at the own node. Also, in this case, there is no possibility for the step S117 NO.

Also, the node that received the label release success message from the downstream side neighboring nodes of all the branches of the multicast at the own node will delete the flow table entry.

The embodiments described above are directed to the case where the label allocation message is transmitted from the ingress node toward the next hop node, and the label allocation success/failure message is transmitted from the egress node toward the previous hop node (i.e., the case of Ingress control), but the present invention is also applicable to the case where the label allocation message is transmitted from the egress node toward the previous hop node, and the label allocation success/failure message is transmitted from the ingress node toward the next hop node (i.e., the case of Egress control).

Note that in the various embodiments of the Ingress control type described above, it is also possible to realize the loop detection by transmitting the update message for the purpose of the loop detection in a direction opposite to that of the path.

In this case, the node that is supposed to transmit the update message upon receiving the label allocation message is going to transmit a "query message" to the node that transmitted the label allocation message, instead of transmitting the update message to the downstream side neighboring node, and turns the confirmation flag OFF.

The node that received the query message transmits the update message to each upstream side neighboring node for which the input side label exists, and turns the confirmation flag OFF. The update message is then successively forwarded to the upstream side neighboring nodes for which the input side label exists, and when the node with the confirmation flag OFF receives the update message, it is judged that there is a loop and the update failure message is returned. On the other hand, in the case where the confirmation flag is ON when the ingress node receives the update message, the update success message is returned. When the update failure message is received from at least one upstream side neighboring node, the update failure message is returned to the downstream side neighboring nodes, or otherwise the update success message is returned. In either case the confirmation flag is turned ON.

When the node that initially transmitted the update message receives the update failure message, the query failure message is transmitted to the downstream side neighboring nodes, and whereas when the node that initially transmitted the update message receives the update success message, the query success message is transmitted to the downstream side neighboring nodes. In either case the confirmation flag is turned ON. The node that receives the query success message becomes capable of carrying out the label switching, whereas the node that received the query failure message deletes the input side label. In either case the confirmation flag is turned ON.

For example, in FIG. 5, when the node device R5 transmitted the label allocation message to the node device R2, the node device R2 transmits the query message to the node device R5 and turns the confirmation flag OFF. Upon receiving the query message from the node device R2, the node device R5 transmits the update message to the node device R4 and turns the confirmation flag OFF. The update message is then forwarded from the node device R4 to the node device R3, from the node device R3 to the node devices R2 and R8, from the node device R8 to the node device R7, and from the node device R7 to the node device R6. When the node device R2 receives the update message, it is judged that there is a loop because the confirmation flag is already OFF, and the update failure message is returned to the node device R3. The node device R6 transmits the update success message, which is forwarded up to the node device R3. The node device R3 transmits the update failure message to the node device R4, which is forwarded up to the node device R5. Upon receiving the update failure message, the node device R5 returns the query failure message to the node device R2, so that the label switching is not carried out between the node device R2 and the node device R5.

The query message and the query success message has a format similar to that of FIG. 11, while the query failure message has a format similar to that of FIG. 12, except that the label value is specified in these messages.

Note also that the description up to now presupposes the hard state type protocol in which the label allocation message is not transmitted to the path to which the label is allocated once, but the present invention is also effective for the soft state type protocol in which the label allocation message is transmitted regularly even for the path to which the label is allocated once. In the case of the soft state type protocol, the label is released when the label allocation message is not received for a prescribed period of time.

Fourth Embodiment

Up to this point, the loop detection method in the case of setting up the label switched path by the initiative of the ingress node has been described. Now, the loop detection method in the case of setting up the label switched path by the initiative of the egress node will be described.

Here, the method for setting up the label switched path by the initiative of the egress node is basically the method disclosed in N. Feldman and A. Viswanathan, "ARIS Specification", Internet Draft (work in progress), draft-feldman-aris-soec-00.txt, March 1997, but the loop detection method is different from this reference in that the path vector that is a list of nodes on the path is not used so that the message length can be shortened compared with the case of using the path vector.

In the following description, the basic issues related to the node device, such as the fact that the node device has a function for carrying out the IP processing as well as a function for carrying out the label switching according to the label allocation protocol according to the present invention, the terms such as the ingress node information, the flow ID, the link ID, the interface ID, the input side label, and the output side label and their definitions, etc., are basically the same as those of the first and second embodiments described above.

As for the timing at which the node device transmits the label allocation message as an egress node, the following options are available, for example.

(1) The label allocation message is transmitted at a timing where each node device that is registered as an egress is activated.

(2) The label allocation message is transmitted at a timing where the amount of passing traffics of the flow at each node device that is registered as an egress (the packet flow that passes through each node that is registered as an egress) exceeds a threshold.

(3) Only a node that satisfies a condition that the amount of traffics for the flow (the packet flow that passes through each node that is registered as an egress) exceeds a threshold and the next hop node for the flow does not support the label allocation protocol according to the present invention, judges the own node as an egress at this timing and transmits the label allocation message.

Examples of nodes that can be registered as egress include an area border router of OSPF, a domain boundary router, and a neighbor BGP router.

Note that in the case of (3) described above, a node registered as an egress and a node that actually becomes an egress of the label switched path will be different.

Now, in the case of generating the label switched path by the initiative of the egress node (Egress control), the process for label allocation is activated from the egress node with respect to all the upstream side neighboring nodes, and when the process for label allocation is activated from the next hop node of the flow, each node other than the egress node activates he process for label allocation with respect to the further upstream side neighboring nodes (the neighboring nodes other than the next hop node). Eventually, when the process for label allocation is activated at the ingress node, the label switched path from the ingress node to the egress node is formed. This process is called an initial generation process. At this point, the label switched path has a tree-like shape with the ingress node as a leaf and the egress node as a root.

Note that, if the route change does not occur at a node that is executing the process for label allocation during the initial generation process, the above process guarantees that there is no loop because the path is formed sequentially from the exit of the path (because the existence of the exit of the path is guaranteed).

However, in the case of releasing the label allocation at the already existing output side and carrying out the label allocation with a new next hop node due to the route change or the other cause, that is, in the case of newly allocating the output side label while the input side label exists, a loop will be formed if the own node is located on the downstream side of the new next hop node so that there is a need to check that the own node is not located at the downstream side of the new next hop node before the label allocation with the new next hop node is carried out.

For this reason, in the case of newly allocating the output side label while the input side label exists at some node, the message for the loop detection is transmitted to the downstream side node while setting the confirmation flag OFF, and it is judged that there is a loop when this message is received from the upstream side node while the confirmation flag is OFF. Otherwise when this message reaches to the egress node, it is judged that there is no loop. In the case of using the ingress node information and the hop count from the ingress node for the purpose of the loop detection, it is possible to detect a loop before the message for the loop detection goes around the loop once.

For the message for loop detection, the update message is used. The update message is used not only for the purpose of the loop detection, but also for the purpose of notifying the change of a path state to the downstream side node.

In this fourth embodiment, the case of using the number of hops from the egress node as the hop count will be described, but the hop count may be omitted. The examples described below are all directed to the operation regarding a flow with a certain Flowid=Egress [R1] (a packet stream having R1 as an egress node).

Note that, in this fourth embodiment, the node address (R1 in the notation of Flowid=Egress [R1]) to be used for identifying the flow coincides with the node that actually becomes the egress of the label switched path, but in general, the node address to be used for identifying the flow may not necessarily coincide with the actual egress node of the label switched path. For example, in FIG. 25 which will be described in detail below, a node R0 (not shown) that is registered as an egress may exist as a next hop node of the node R1, in which case Flowid=Egress [R0] will be used, but the actual egress node of the label switched path is the node R1.

Now, some exemplary cases of setting up the label switched path by the initiative of the egress node will be described.

First, the method not using the ingress node information will be described. For the sake of simplicity, it is assumed that every node is capable of carrying out the label merging. The case of not carrying out the label merging will be described later. Also, it is assumed that each node carries out the label allocation by the initiative of the downstream side (Downstream label allocation), but the label allocation by the initiative of the upstream side (Upstream label allocation) is equally possible.

Initially, every node initializes the confirmation flag to ON state.

The egress node transmits the label allocation message in which the hop count=1 is specified to all the upstream side neighboring nodes (neighboring nodes other than the next hop node) of the flow.

When the output side label for that flow is set up, the node other than the egress node transmits the label allocation message in which the hop count obtained by incrementing the hop count received from the egress node by one is specified to all the upstream side neighboring nodes (neighboring nodes other than the next hop node) of the flow. For those upstream side neighboring nodes for which the input side label does not exist, the label allocation message is transmitted regularly.

A node U that received the label allocation message returns the label allocation failure message if a message source node D is not a next hop node for that flow, or if the received hop count exceeds the threshold, or if the confirmation flag is OFF, or if it is the egress node itself. When none of these conditions holds, if the output side label does not exist despite that the input side label exists, the confirmation flag is turned OFF and a "query message" is transmitted to the node D. Otherwise, the label allocation success message is transmitted to the node D. At this point, if the output side label does not exist, the allocation of the output side label is carried out and the hop count in the message is stored as the hop count from the egress node.

The node that received the label allocation success message from the upstream side neighboring node becomes capable of carrying out the label switching between the input side label and the output side label thereafter, unless it is the egress node itself.

The node that received the label allocation failure message quits the registration of the input side label.

In the case where the route change or the route deletion occurs at a node U on the path, the node U transmits the label release message to a next hop node Dold of an old route, and turns the confirmation flag OFF.

The node Dold that received the label release message transmits the label release success message to the node U and releases the label.

The node U that received the label release success message turns the confirmation flag ON, and if there is a next hop node Dnew of a new route, transmits a label allocation trigger message to the node Dnew. The label allocation trigger message is regularly re-transmitted until the label allocation message is received from the node Dnew.

The node Dnew that received the label allocation trigger message returns to the node U the label allocation message in which the hop count obtained by incrementing the hop count from the egress node to the own node by one is specified, if the confirmation flag is ON and either it is the egress node itself or the output side label exists.

The node D that received the query message from the node U returns the query failure message to the node U if the confirmation flag is OFF, and does not carry out the registration of the input side label. When the confirmation flag is not OFF, if the output side label exists, the update message is transmitted to the downstream side neighboring node, and the confirmation flag is turned OFF. Otherwise, the query success message is transmitted to the node U.

The node that received the update message from the upstream side neighboring node returns the update failure message if the confirmation flag is OFF. When the confirmation flag is not OFF, if the output side label exists, the update message is transmitted to the downstream side neighboring node, and the confirmation flag is turned OFF. Otherwise, the update success message is returned.

The node that received the update success message from the downstream side neighboring node turns the confirmation flag ON, and returns the update success message to the upstream side neighboring node that transmitted the update message while transmitting the query success message to the upstream side neighboring node that transmitted the query message.

The node that received the update failure message from the downstream side neighboring node turns the confirmation flag ON, and returns the update failure message to the upstream side neighboring node that transmitted the update message while transmitting the query failure message to the upstream side neighboring node that transmitted the query message.

The node U that received the query success message from the node D registers the output side label and turns the confirmation flag ON. Thereafter, the label switching between the input side label and the output side label becomes possible.

The node U that received the query failure message from the node D turns the confirmation flag ON. Thereafter, the label switching between the input side label and the output side label is not carried out.

Figure 25:
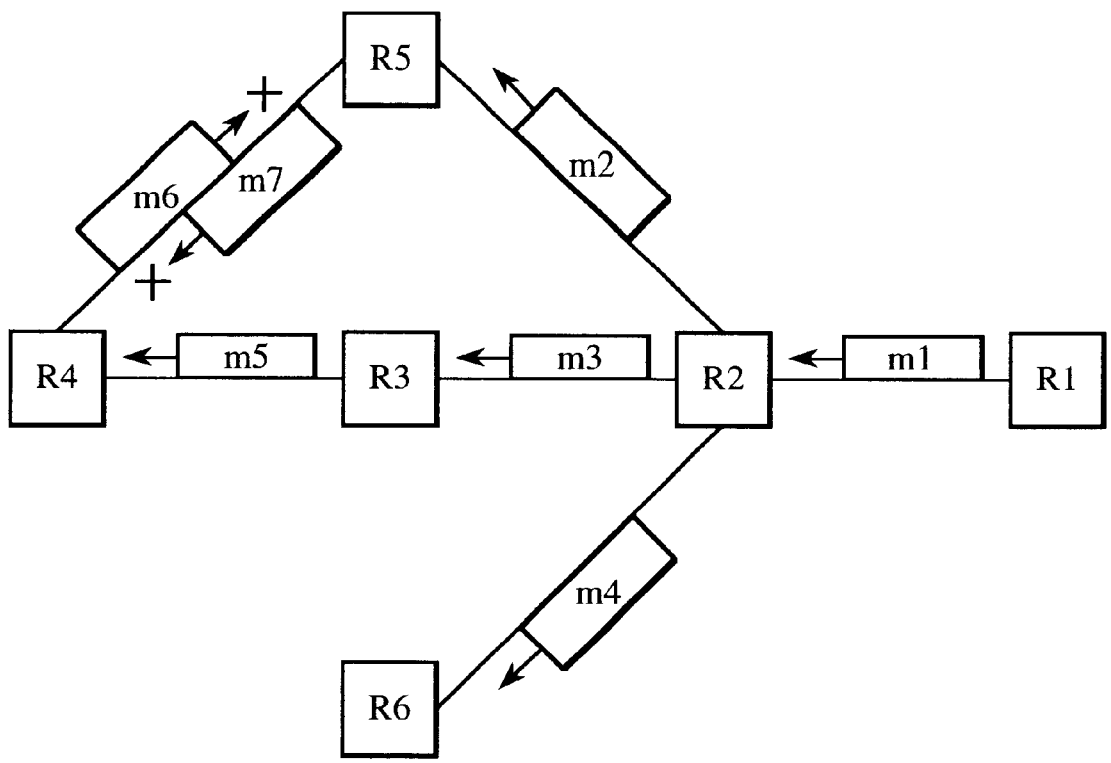
FIG. 25 is a schematic diagram for explaining an operation of a node device according to the fourth embodiment of the present invention.

Next, with reference to FIG. 25, the exemplary operation at a time of the label switched path generation will be described. In FIG. 25, it is assumed that R1 is the egress node. It is also assumed that the next hop nodes of R2, R3, R4, R5 and R6 are respectively R1, R2, R3, R2 and R2.

The node device R1 transmits the label allocation message m1 (Flowid=Egress [R1], Label=a, Hopcount=1) to the node device R2.

Upon receiving the label allocation message m1 from the node device R1, the node device R2 stores Label=a and returns the label allocation success message to the node device R1 because the node device R1 is the next hop node of this flow and the confirmation flag is ON. Then, the node device R2 transmits the label allocation messages m2 (Flowid=Egress [R1], Label=b, Hopcount=2), m3 (Flowid=Egress [R1], Label=c, Hopcount=2), and m4 (Flowid=Egress [R1], Label=d, Hopcount=2) to the node devices R5, R3 and R6, respectively, which are the neighboring nodes other than the next hop node.

Upon receiving the label allocation message m2 from the node device R2, the node device R5 stores Label=b and returns the label allocation success message to the node device R2 because the node device R2 is the next hop node of this flow and the confirmation flag is ON. Then, the node device R5 transmits the label allocation messages m7 (Flowid=Egress [R1], Label=g, Hopcount=3) to the node device R4 which is the neighboring node other than the next hop node.

Upon receiving the label allocation message m3 from the node device R2, the node device R3 stores Label=c and returns the label allocation success message to the node device R2 because the node device R2 is the next hop node of this flow and the confirmation flag is ON. Then, the node device R3 transmits the label allocation messages m5 (Flowid=Egress [R1], Label=e, Hopcount=3) to the node device R4 which is the neighboring node other than the next hop node.

Upon receiving the label allocation message m4 from the node device R2, the node device R6 stores Label=d and returns the label allocation success message to the node device R2 because the node device R2 is the next hop node of this flow and the confirmation flag is ON.

Upon receiving the label allocation message m5 from the node device R3, the node device R4 stores Label=e and returns the label allocation success message to the node device R3 because the node device R3 is the next hop node of this flow and the confirmation flag is ON. Then, the node device R4 transmits the label allocation messages m6 (Flowid=Egress [R1], Label=f, Hopcount=4) to the node device R5 which is the neighboring node other than the next hop node.

Upon receiving the label allocation message m7 from the node device R5, the node device R4 returns the label allocation failure message to the node device R5 because the node device R5 is not the next hop node of this flow.

Upon receiving the label allocation message m6 from the node device R4, the node device R5 returns the label allocation failure message to the node device R4 because the node device R4 is not the next hop node of this flow.

Upon receiving the label allocation success message from the node device R4, the node device R3 registers Label=e, and thereafter the label switching between the input side label Label=e and the output side label Label=c becomes possible.

Upon receiving the label allocation success messages from the node devices R5, R3 and R6, the node device R2 registers the respective input side labels Label=b, Label =c and Label=d, and thereafter the label switching W between these input side labels and the output side Label=a becomes possible.

Upon receiving the label allocation success message from the node device R2, the node device R1 registers the input side label Label=a.

Figure 26:
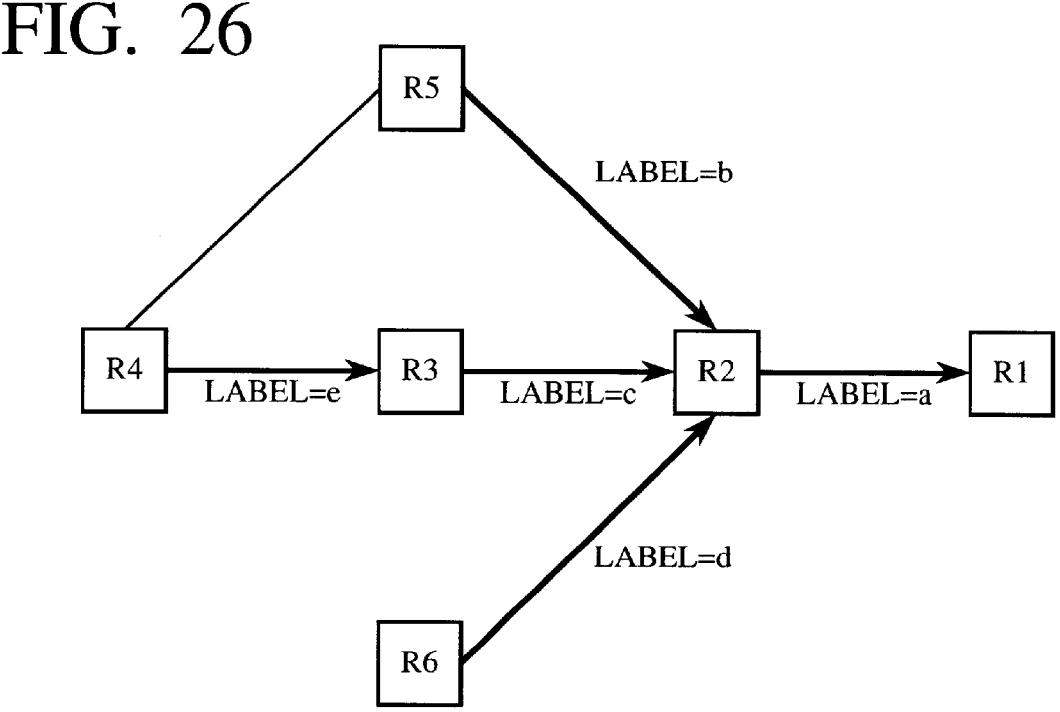
FIG. 26 is another schematic diagram for explaining an operation of a node device according to the fourth embodiment of the present invention.

As a result, the merged label switched path as shown in FIG. 26 can be formed.

Next, the exemplary operation at a time of the route change will be described, for an exemplary case where the route change occurred at the node device R5 in FIG. 26 such that the next hop node for Flowid=Egress [R1] is changed from R2 to R4.

Figure 27:
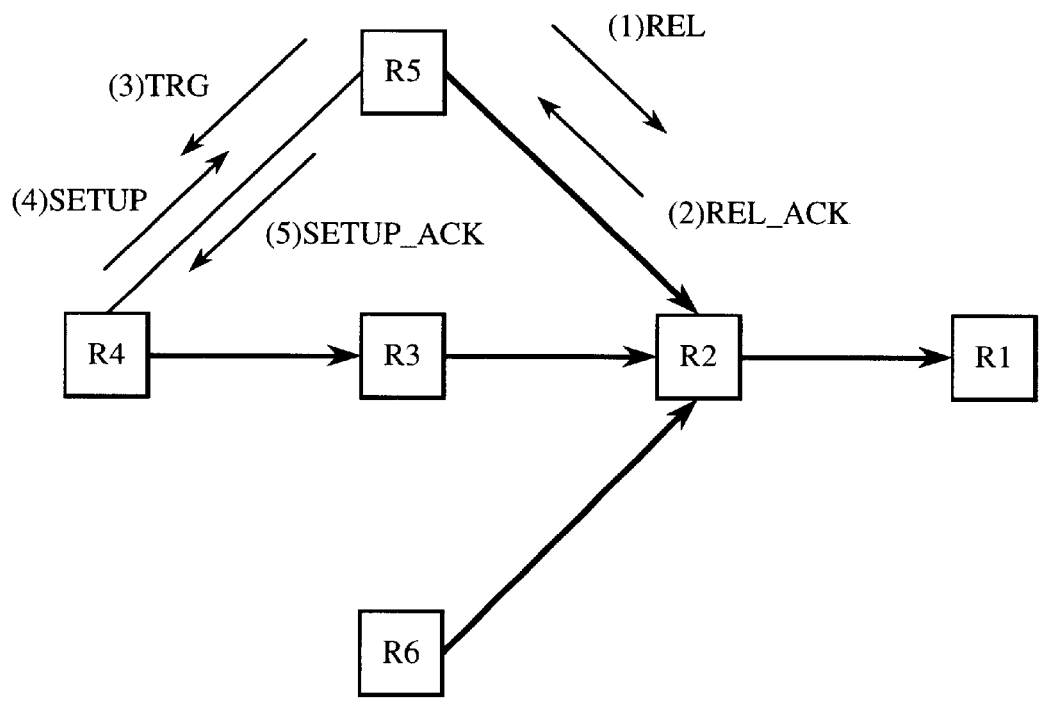
FIG. 27 is another schematic diagram for explaining an operation of a node device according to the fourth embodiment of the present invention.

In such a case, the packet exchanges as shown in FIG. 27 are carried out in conjunction with the route change. In FIG. 27, REL denotes the label release message, REL_ACK denotes the label release success message, TRG denotes the label allocation trigger message, SETUP denotes the label allocation message, and SETUP_ACK denotes the label allocation success message.

First, the node device R5 transmits the label release message to the node device R2 which is the next hop node before the route change, and turns the confirmation flag OFF.

Upon receiving the label release message from the node device R5, the node device R2 releases the label allocation between the own device and the node device R5, and returns the label release success message to the node device R5.

Upon receiving the label release success message from the node device R2, the node device R5 turns the confirmation flag ON, and transmits the label allocation trigger message to the node device R4 which is the next hop node on a new route.

Upon receiving the label allocation trigger message from the node device R5, the node device R4 returns the label allocation message to the node device R5.

Upon receiving the label allocation message from the node device R4, the node device R5 allocates the output side label between the own node and the node device R4 and transmits the label allocation success message to the node device R4, because the node device R4 is the next hop node of this flow, the received hop count does not exceed the threshold, the confirmation flag is ON, it is not the egress node itself, and the input side label does not exist.

Upon receiving the label allocation success message from the node device R5, the node device R4 cancels a response to the label allocation success message waiting state, and turns the confirmation flag ON. Thereafter, the label switching becomes possible at the node device R4.

Figure 28:
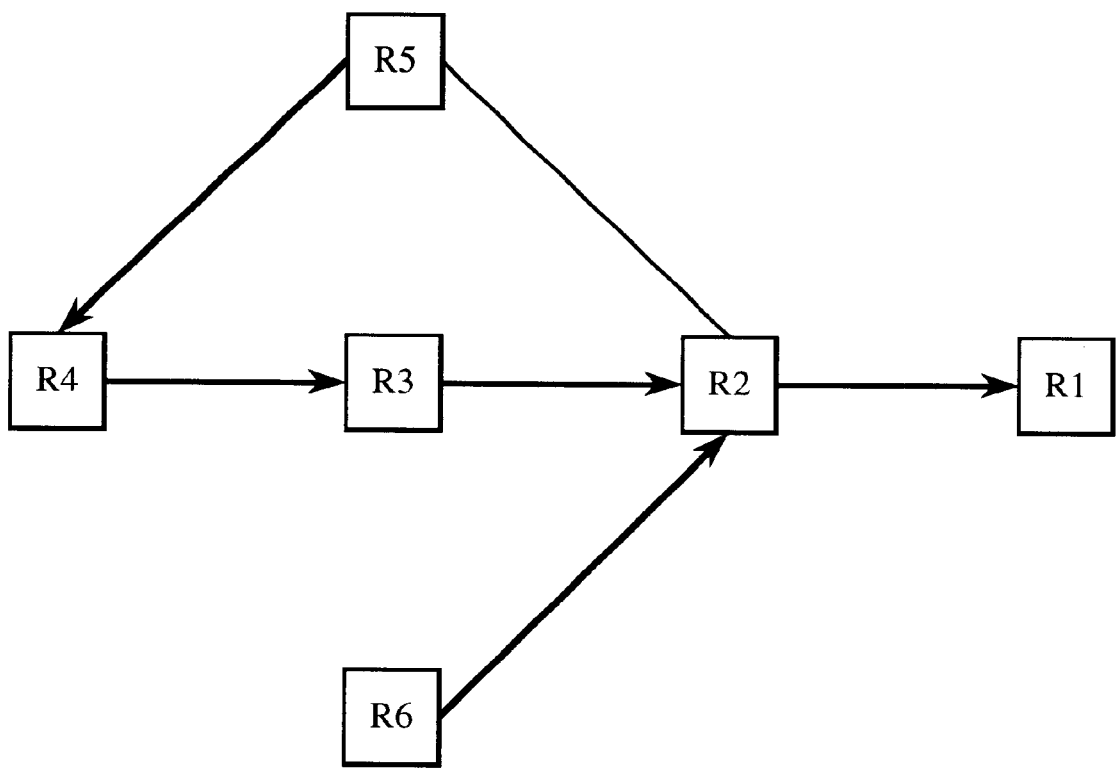
FIG. 28 is another schematic diagram for explaining an operation of a node device according to the fourth embodiment of the present invention.

As a result, the label switched path as shown in FIG. 28 can be formed.

Next, suppose that the further route change occurred from a state of FIG. 28 such that the next hop node of R2 is changed from R1 to R5. In this case, the route becomes a looping one in the sequence of R2→R5→R4→R3→R2 for Flowid=Egress [R1].

Figure 29:
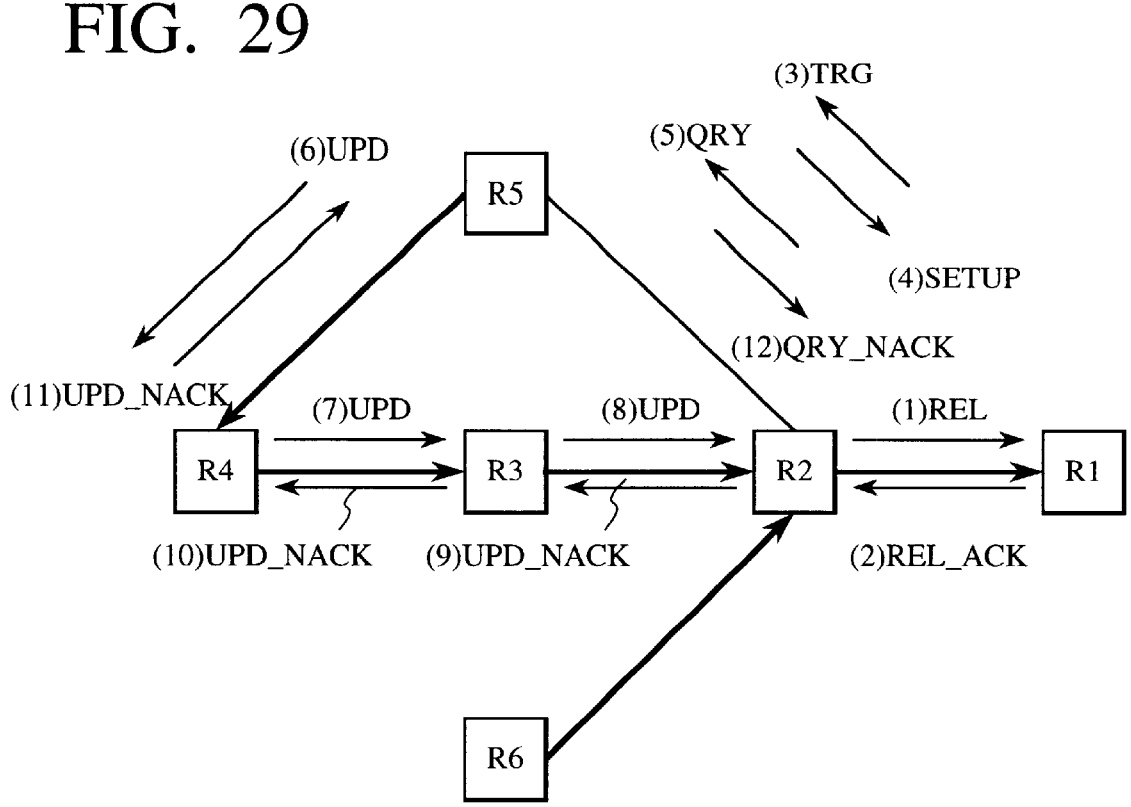
FIG. 29 is another schematic diagram for explaining an operation of a node device according to the fourth embodiment of the present invention.

In such a case, the packet exchanges as shown in FIG. 29 are carried out in conjunction with the route change. In FIG. 29, REL denotes the label release message, REL_ACK denotes the label release success message, TRG denotes the label allocation trigger message, SETUP denotes the label allocation message, QRY denotes the query message, QRY_NACK denotes the query failure message, UPD denotes the update message, and UPD_NACK denotes the update failure message.

First, the node device R2 transmits the label release message to the node device R1 which is the next hop node before the route change, and turns the confirmation flag OFF.

Upon receiving the label release message from the node device R2, the node device R1 releases the label allocation between the own device and the node device R2, and returns the label release success message to the node device R2.

Upon receiving the label release success message from the node device R1, the node device R2 turns the confirmation flag ON, and transmits the label allocation trigger message to the node device R5 which is the next hop node on a new route.

Upon receiving the label allocation trigger message from the node device R2, the node device R5 returns the label allocation message to the node device R2.

Upon receiving the label allocation message from the node device R5, the node device R2 transmits the query message to the node device R5 and turns the confirmation flag OFF, because the node device R5 is the next hop node of this flow, the received hop count does not exceed the threshold, the confirmation flag is ON, it is not the egress node itself, and the output side label does not exist despite that the input side label exists.

Upon receiving the query message from the node device R2, the node device R5 turns the confirmation flag OFF, and transmits the update message to the node device R4 which is a neighboring node for which the output side label exists.

Upon receiving the update message from the node device R5, the node device R4 turns the confirmation flag OFF, and transmits the update message to the node device R3 which is a neighboring node for which the output side label exists.

Upon receiving the update message from the node device R4, the node device R3 turns the confirmation flag OFF, and transmits the update message to the node device R2 which is a neighboring node for which the output side label exists.

Upon receiving the update message from the node device R3, the node device R2 returns the update failure message to the node device R3 because the confirmation flag is OFF.

Upon receiving the update failure message from the node device R2, the node device R3 returns the update failure message to the node device R4, and turns the confirmation flag ON.

Upon receiving the update failure message from the node device R3, the node device R4 returns the update failure message to the node device R5, and turns the confirmation flag ON.

Upon receiving the update failure message from the node device R4, the node device R5 returns the query failure message to the node device R2, and turns the confirmation flag ON.

Upon receiving the query failure message from the node device R5, the node device R2 returns the label allocation failure message to the node device R5, and turns the confirmation flag ON.

Upon receiving the label allocation failure message from the node device R2, the node device R5 releases the input side label between the own node and the node device R2.

Figure 30:
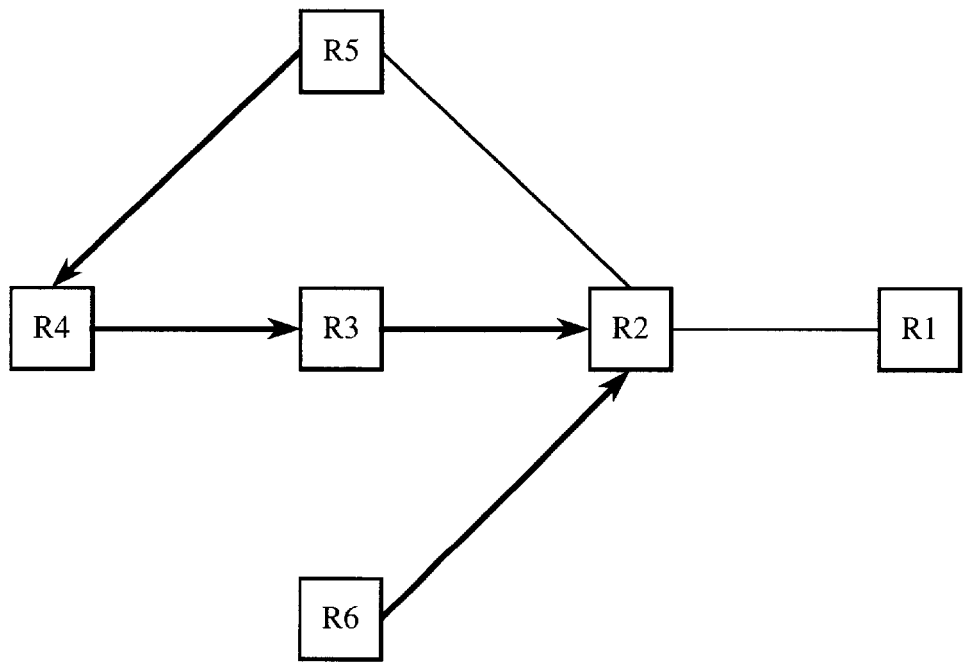
FIG. 30 is another schematic diagram for explaining an operation of a node device according to the fourth embodiment of the present invention.

As a result, the loop-free label switched path as shown in FIG. 30 can be formed, despite of the fact that the route is looping.

Figure 31:
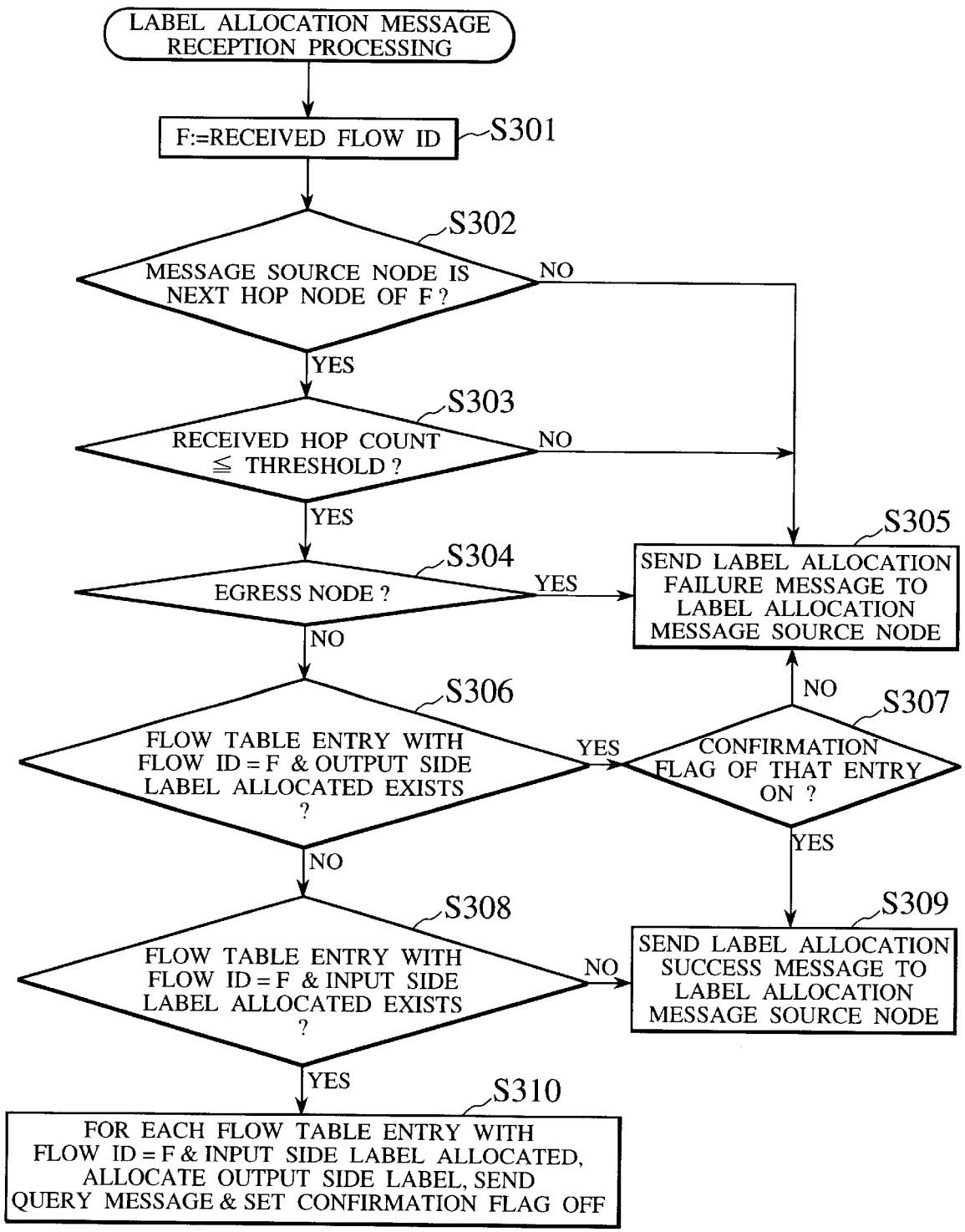
FIG. 31 is a flow chart for an exemplary operation of a node device according to the fourth embodiment of the present invention at a time of label allocation message reception.

Next, the operation procedure of the node that received the label allocation message in this fourth embodiment will be described with reference to FIG. 31.

Initially, the flow ID in the received message is set to be F (step S301).

Then, if the next hop of the packet flow identified by F is different from the label allocation message source node (step S302 NO), or if the received hop count exceeds the threshold (step S303 NO), or if it is the egress node itself (step S304 YES), the label allocation failure message is returned to the label allocation message source node (step S305).

Otherwise, if there exists a flow table entry with the flow ID=F and the output side label allocated (step S306 YES), the label allocation failure message is returns to the label allocation message source node (step S305) when the confirmation flag is OFF (step S307 NO), or the label allocation success message is returns to the label allocation message source node (step S309) when the confirmation flag is ON (step S307 YES).

Otherwise, if there exists a flow table entry with the flow ID=F and the input side label allocated (step S308 YES), for each flow table entry with the flow ID=F and the input side label allocated, the output side label is allocated and the query message is transmitted while the confirmation flag is turned OFF (step S310). If there is no flow table entry with the flow ID=F and the input side label allocation (step S308 NO), the label allocation success message is returned to the label allocation message source node (step S309).

Fifth Embodiment

Next, the case of carrying out the loop detection using the ingress node information and the hop count from the ingress node in addition to the confirmation flag in the Egress control will be described.

Initially, every node initializes the confirmation flag to ON state.

The egress node transmits the label allocation message in which the hop count=1 is specified to all the upstream side neighboring nodes (neighboring nodes other than the next hop node) of the flow.

When the output side label for that flow is set up, the node other than the egress node transmits the label allocation message in which the hop count obtained by incrementing the hop count received from the egress node by one is specified to all the upstream side neighboring nodes (neighboring nodes other than the next hop node) of the flow. For those upstream side neighboring nodes for which the input side label does not exist, the label allocation message is transmitted regularly.

A node U that received the label allocation message returns the label allocation failure message if a message source node D is not a next hop node for that flow, or if the received hop count exceeds the threshold, or if the confirmation flag is OFF, or if it is the egress node itself. When none of these conditions holds, if the output side label does not exist despite that the input side label exists, the confirmation flag is turned OFF and a "query message" that contains the ingress node information held at the node U and the hop count obtained by incrementing the hop count received from the ingress node by one is transmitted to the node D. Otherwise, the label allocation success message is transmitted to the node D. At this point, if the output side label does not exist, the allocation of the output side label is carried out and the hop count in the message is stored as the hop count from the egress node.

Here, however, in the case of the ingress node which transmits the label allocation success message, the router ID of the own node or the network address of the output interface is set to be the ingress node address, the newly allocated ingress node local ID is set to be the ingress node, and the hop count=1 is specified (the transmission of the ingress node information). When it is not the ingress node itself, none of them are specified.

The node that received the label allocation success message from the upstream side neighboring node becomes capable of carrying out the label switching between the input side label and the output side label thereafter, unless it is the egress node itself.

When the ingress node information and the hop count are specified in the received message, these are set in correspondence to the input side label, and if the received hop count is greater than the hop count corresponding to all the current input side labels and if it is not the egress node itself, the update message that contains the received ingress node information and the hop count obtained by incrementing the received hop count by one is transmitted to the next hop node, and the confirmation flag is turned OFF (the forwarding of the ingress node information).

The node that received the label allocation failure message quits the registration of the input side label.

In the case where the route change or the route deletion occurs at a node U on the path, the node U transmits the label release message to a next hop node Dold of an old route, and turns the confirmation flag OFF.

The node Dold that received the label release message returns the label release failure message if the confirmation flag is OFF, or transmits the label release success message to the node U and releases the label if the confirmation flag is ON. In addition, when the ingress node having the maximum hop count is changed after the release, the confirmation flag is turned OFF and the update message specifying the (ingress node information, hop count) set after the change is transmitted to the downstream side nodes.

The node U that received the label release success message turns the confirmation flag ON, and if there is a downstream side node Dnew of a new route, transmits a label allocation trigger message to the node Dnew. The label allocation trigger message is regularly re-transmitted until the label allocation message is received from the node Dnew.

The node Dnew that received the label allocation trigger message returns to the node U the label allocation message in which the hop count obtained by incrementing the hop count from the egress node to the own node by one is specified, if the confirmation flag is ON and either it is the egress node itself or the output side label exists.

The node D that received the query message from the node U returns the query failure message to the node U if the received ingress node information is already set in correspondence to the other input side label, or if the node D itself is the ingress node for the received ingress node information, or if there exists the input side label for which the ingress node information is not yet set up, or if the confirmation flag is OFF, and does not carry out the registration of the input side label. When none of these conditions are satisfied, if the received hop count is greater than the hop count corresponding to all the current input side labels and if it is not the egress node itself, the update message that contains the received ingress node information and the hop count obtained by incrementing the received hop count by one is transmitted to the downstream side neighboring node, and the confirmation flag is turned OFF. Otherwise, the query success message is transmitted to the node U.

The node that received the update message from the upstream side neighboring node returns the update failure message if the received ingress node information is already set in correspondence to the other input side label, or if there exists the input side label for which the ingress node information is not yet set up, or if the confirmation flag is OFF. When none of these conditions are satisfied, if the received hop count is greater than the hop count corresponding to all the current input side labels and if it is not the egress node itself, the update message that contains the received ingress node information and the hop count obtained by incrementing the received hop count by one is transmitted to the downstream side neighboring node, and the confirmation flag is turned OFF. Otherwise, the update success message is returned, and the update of the ingress node information and the hop count is carried out.

The node that received the update success message from the downstream side neighboring node turns the confirmation flag ON, and decides upon the update of the ingress node information and the hop count. Then, the update success message is returned to the upstream side neighboring node that is waiting a response to the update message if such a node exists, while the query success message is returned to the upstream side neighboring node that transmitted the query message if such a node exists.

The node that received the update failure message from the downstream side neighboring node turns the confirmation flag ON, and quits the update of the ingress node information and the hop count. Then, the update failure message is returned to the upstream side neighboring node that is waiting a response to the update message if such a node exists, while the query failure message is returned to the upstream side neighboring node that transmitted the query message if such a node exists.

The node U that received the query success message from the node D registers the output side label and turns the confirmation flag ON. Thereafter, the label switching between the input side label and the output side label becomes possible.

The node U that received the query failure message from the node D turns the confirmation flag ON. Thereafter, the label switching between the input side label and the output side label is not carried out.

Next, the exemplary operation at a time of the label switched path generation will be described. Here, it is assumed that the router ID of a node is used as the ingress node information.

Figure 32:
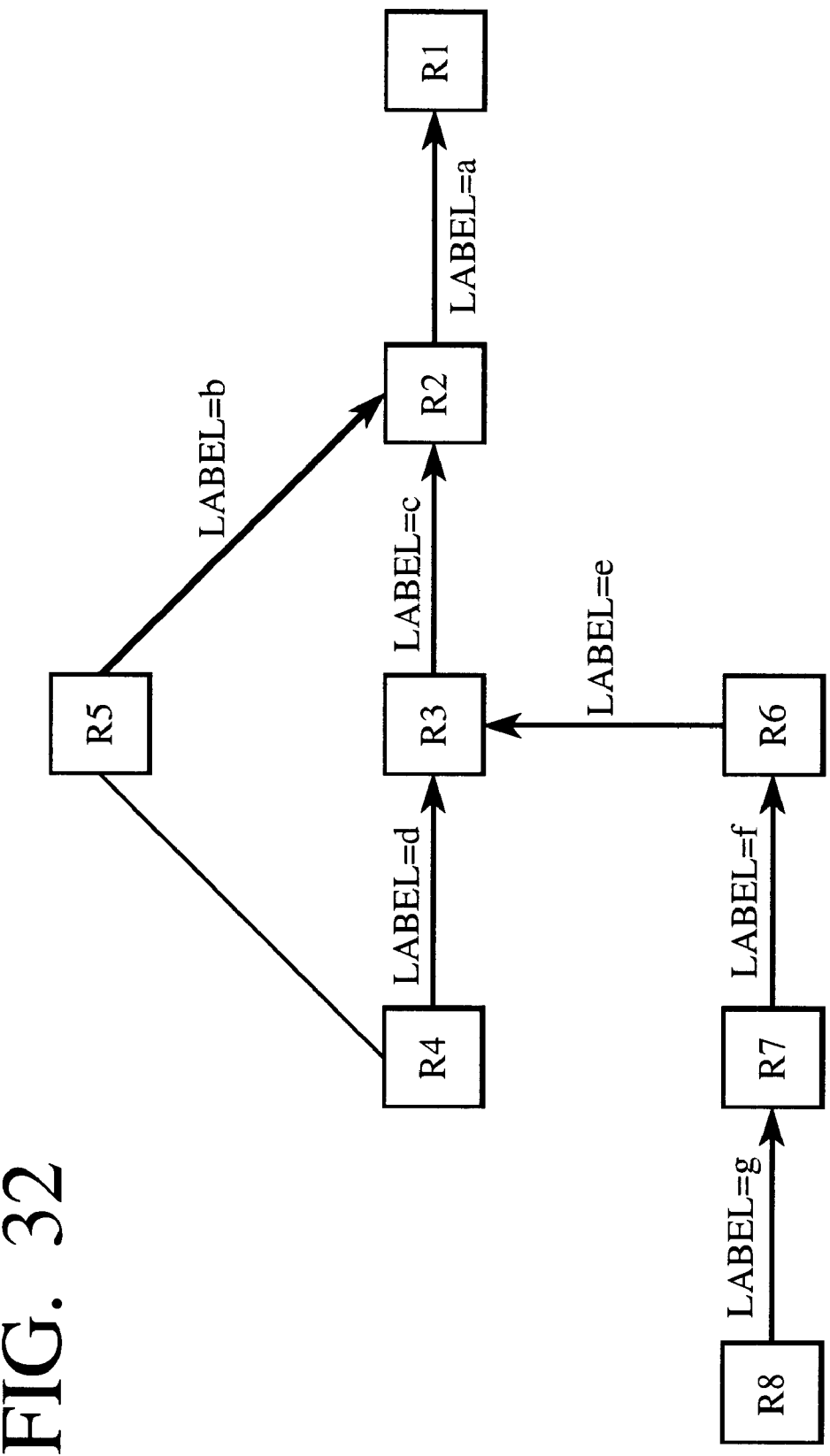
FIG. 32 is a schematic diagram for explaining an operation of a node device according to the fifth embodiment of the present invention.

In FIG. 32, it is assumed that R1 is the egress node. It is also assumed that the next hop nodes of R2, R3, R4, R5, R6, R7 and R8 are respectively R1, R2, R3, R2, R3, R6 and R7. FIG. 32 shows a state of the path after the initial generation process of the Egress control similar to that of the fourth embodiment.

Here, the ingress nodes R5, R4 and R8 specify the ingress node information and the hop count in the label allocation success message, and each node forwards to the downstream side neighboring node the label allocation success message specifying the ingress node information that gives the maximum hop count among the label allocation success messages received from the upstream side neighboring nodes and the hop count obtained by incrementing the corresponding hop count by one. As a result, the (ingress node information, hop count) sets that are notified by the nodes R5, R4, R8, R7, R6, R3 and R2 to the respective downstream side neighboring nodes become (R5, 1), (R4, 1), (R8, 1), (R8, 2), (R8, 3), (R8, 4), and (R8, 5), respectively.

Next, the exemplary operation at a time of the route change will be described, for an exemplary case where the route change occurred at the node device R5 in FIG. 32 such that the next hop node for Flowid=Egress [R1] is changed from R2 to R4.

Figure 33:
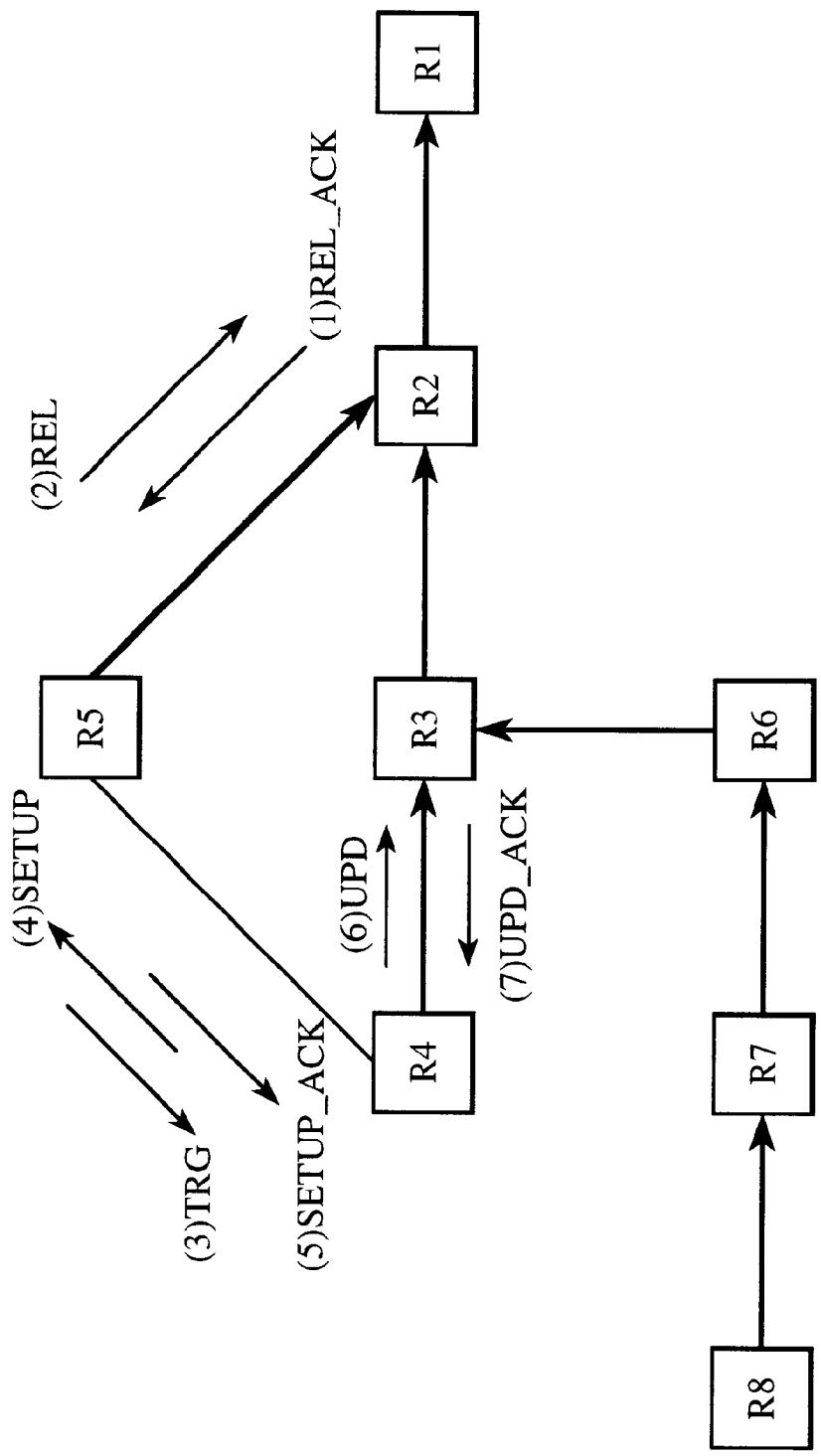
FIG. 33 is another schematic diagram for explaining an operation of a node device according to the fifth embodiment of the present invention.

In such a case, the packet exchanges as shown in FIG. 33 are carried out in conjunction with the route change. In FIG. 33, REL denotes the label release message, REL_ACK denotes the label release success message, TRG denotes the label allocation trigger message, SETUP denotes the label allocation message, SETUP_ACK denotes the label allocation success message, UPD denotes the update message, and the UPD_ACK denotes the update success message.

First, the node device R5 transmits the label release message to the node device R2 which is the next hop node before the route change, and turns the confirmation flag OFF.

Upon receiving the label release message from the node device R5, the node device R2 releases the label allocation between the own device and the node device R5, and returns the label release success message to the node device R5.

Upon receiving the label release success message from the node device R2, the node device R5 turns the confirmation flag ON, and transmits the label allocation trigger message to the node device R4 which is the next hop node on a new route.

Upon receiving the label allocation trigger message from the node device R5, the node device R4 returns the label allocation message to the node device R5.

Upon receiving the label allocation message from the node device R4, the node device R5 transmits the label allocation success message to the node device R4, because the node device R4 is the next hop node of this flow, the received hop count does not exceed the threshold, the confirmation flag is ON, it is not the egress node itself, and the input side label does not exist. In the label allocation success message, (ingress node information, hop count)= (R5, 1) is specified.

Upon receiving the label allocation success message from the node device R5, the node device R4 transmits the update message specifying (ingress node information, hop count)= (R5, 2) to the next hop node R3, and turns the confirmation flag ON.

Upon receiving the update message from the node device R4, the node device R3 sets the received (ingress node information, hop count)=(R5, 2) in correspondence to the input side label Label=d, and returns the update success message to the node device R3.

Upon receiving the update success message from the node device R3, the node device R4 turns the confirmation flag ON. Thereafter the label switching between the input side label and the output side label becomes possible.

Figure 34:
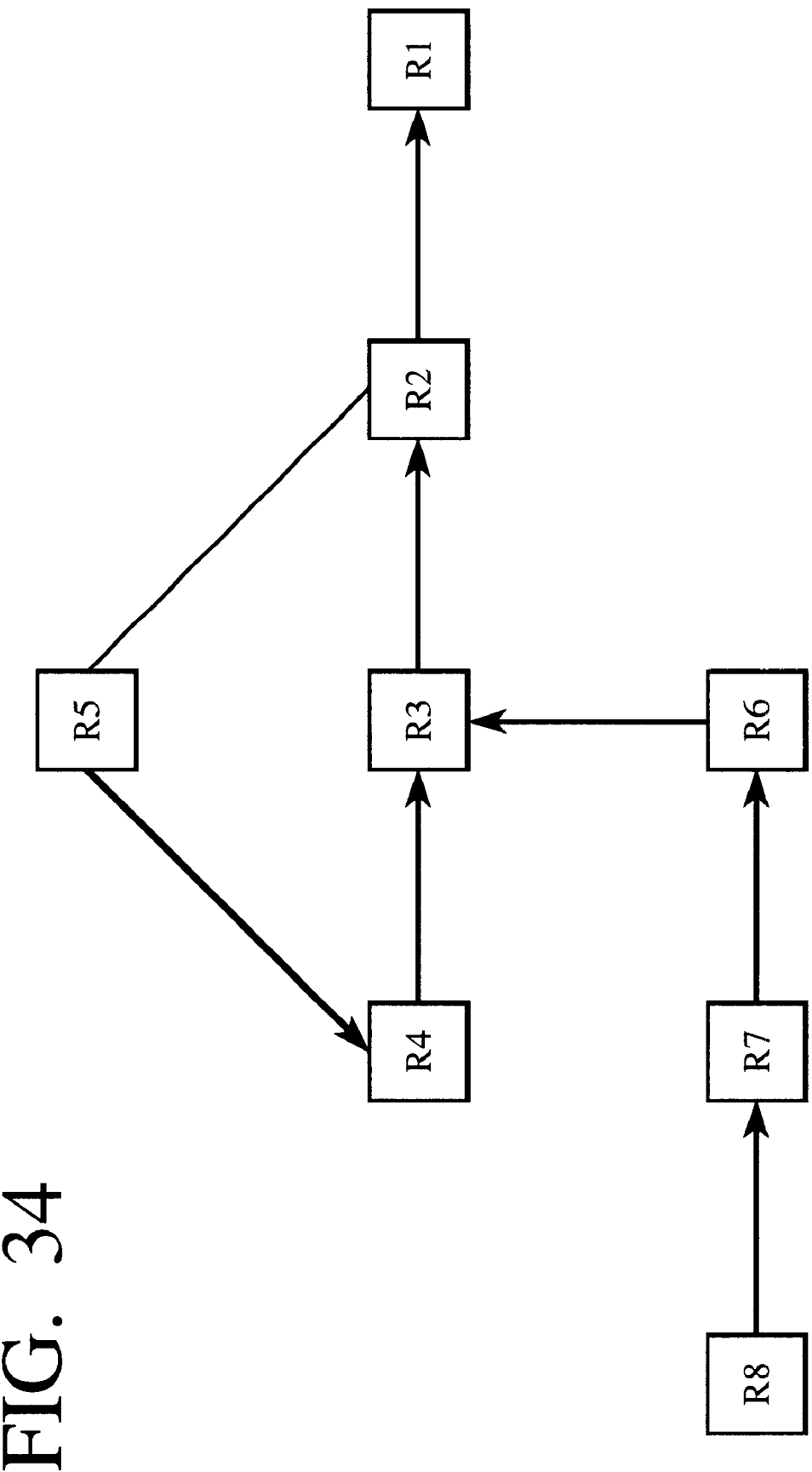
FIG. 34 is another schematic diagram for explaining an operation of a node device according to the fifth embodiment of the present invention.

As a result, the label switched path as shown in FIG. 34 can be formed.

Next, suppose that the further route change occurred from a state of FIG. 34 such that the next hop node of R2 is changed from R1 to R5. In this case, the route becomes a looping one in the sequence of R2→R5→R4→R3→R2 for Flowid=Egress [R1].

Figure 35:
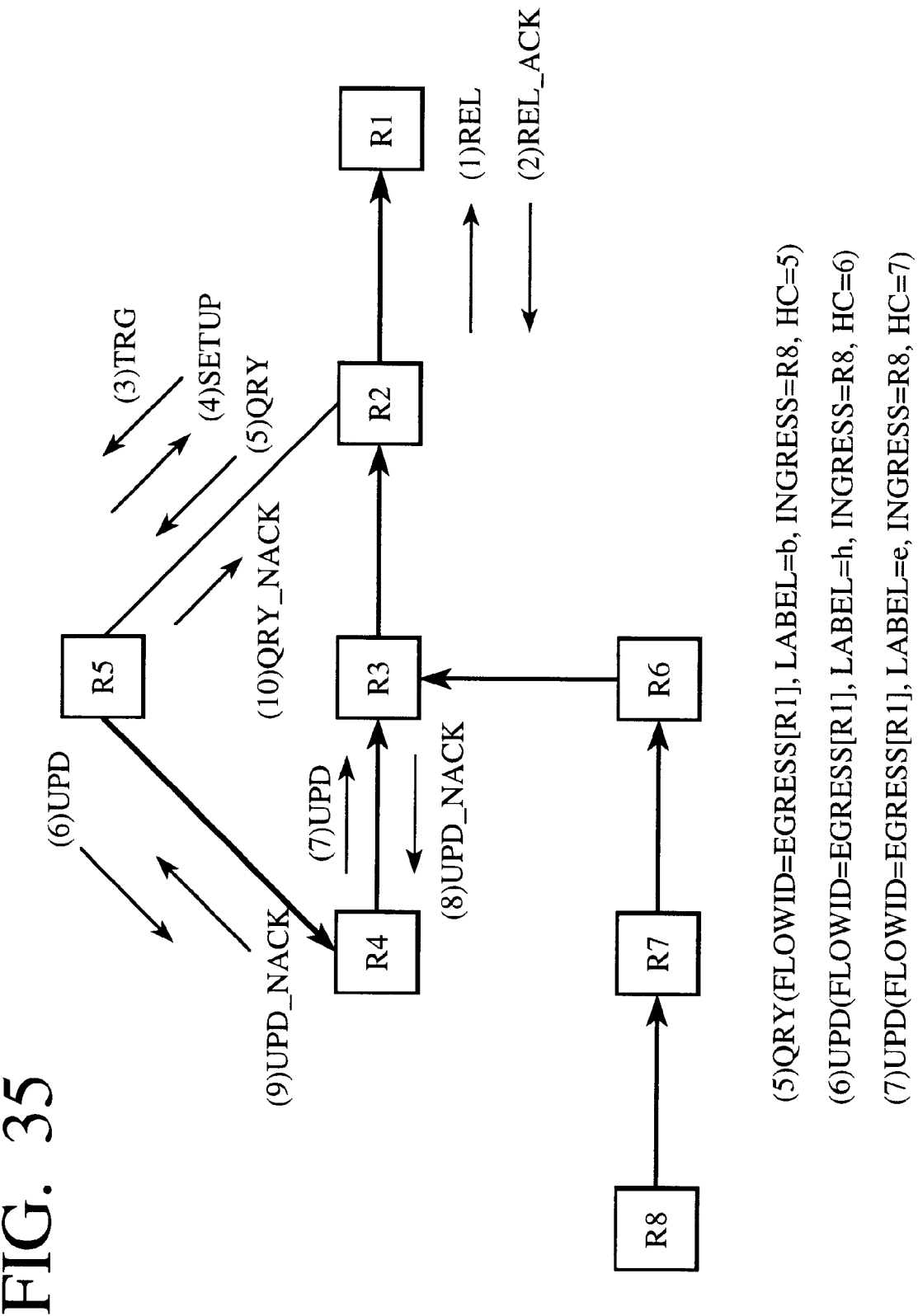
FIG. 35 is another schematic diagram for explaining an operation of a node device according to the fifth embodiment of the present invention.

In such a case, the packet exchanges as shown in FIG. are carried out in conjunction with the route change. In FIG. 35, REL denotes the label release message, REL_ACK denotes the label release success message, TRG denotes the label allocation trigger message, SETUP denotes the label allocation message, QRY denotes the query message, QRY_NACK denotes the query failure message, UPD denotes the update message, and UPD_NACK denotes the update failure message.

First, the node device R2 transmits the label release message to the node device R1 which is the next hop node before the route change, and turns the confirmation flag OFF.

Upon receiving the label release message from the node device R2, the node device R1 releases the label allocation between the own device and the node device R2, and returns the label release success message to the node device R2.

Upon receiving the label release success message from the node device R1, the node device R2 turns the confirmation flag ON, and transmits the label allocation trigger message to the node device R5 which is the next hop node on a new route.

Upon receiving the label allocation trigger message from the node device R2, the node device R5 returns the label allocation message to the node device R2.

Upon receiving the label allocation message from the node device R5, the node device R2 transmits the query message to the node device R5 and turns the confirmation flag OFF. In the query message, (ingress node information, hop count)=(R8, 5) is specified.

Upon receiving the query message from the node device R2, the node device R5 turns the confirmation flag OFF, and transmits the update message to the next hop node device R4. In the update message, (ingress node information, hop count)=(R8, 6) is specified.

Upon receiving the update message from the node device R5, the node device R4 turns the confirmation flag OFF, and transmits the update message to the next hop node device R3. In the update message, (ingress node information, hop count)=(R8, 7) is specified.

Upon receiving the update message from the node device R4, the node device R3 judges that there is a loop because the received ingress node information R8 is already set in correspondence to the output side label Label=e that was allocated between the own node and the node device R6, and returns the update failure message to the node device R4.

Upon receiving the update failure message from the node device R3, the node device R4 returns the update failure message to the node device R5 and turns the confirmation flag ON.

Upon receiving the update failure message from the node device R4, the node device R5 returns the query failure message to the node device R2, and turns the confirmation flag ON.

Upon receiving the query failure message from the node device R5, the node device R2 turns the confirmation flag ON. Thereafter the label switching between the input side label and the output side label is not carried out.

Figure 36:
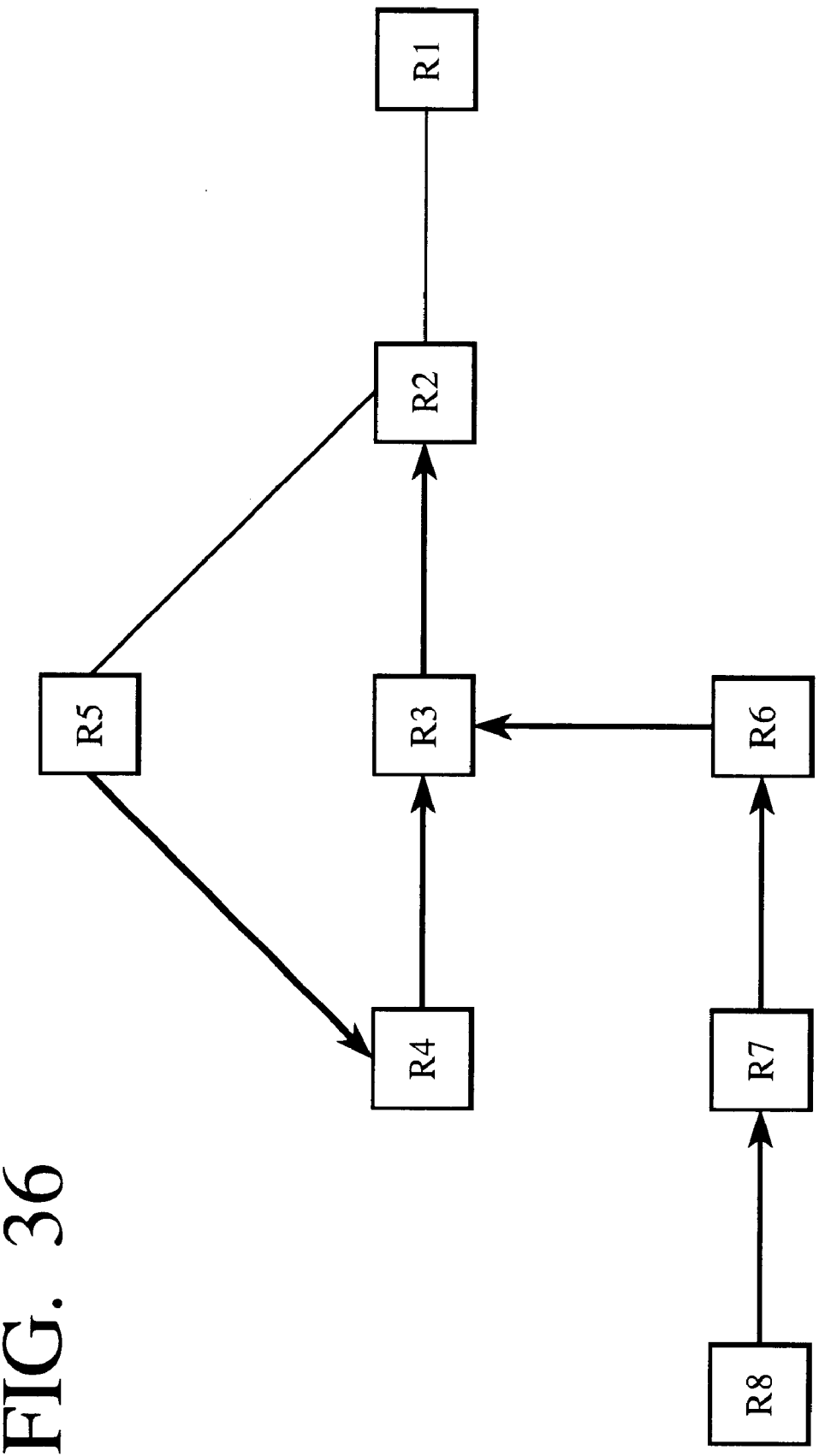
FIG. 36 is another schematic diagram for explaining an operation of a node device according to the fifth embodiment of the present invention.

As a result, the loop-free label switched path as shown in FIG. 36 can be formed, despite of the fact that the route is looping.

Note that, in this fifth embodiment, the case of using the ingress node information and the hop count from the ingress node in addition to the confirmation flag has been =described, but it is also possible to carry out the loop detection without using either the ingress node information or the hop count similarly as in the first and second embodiments described above.

Figure 37:
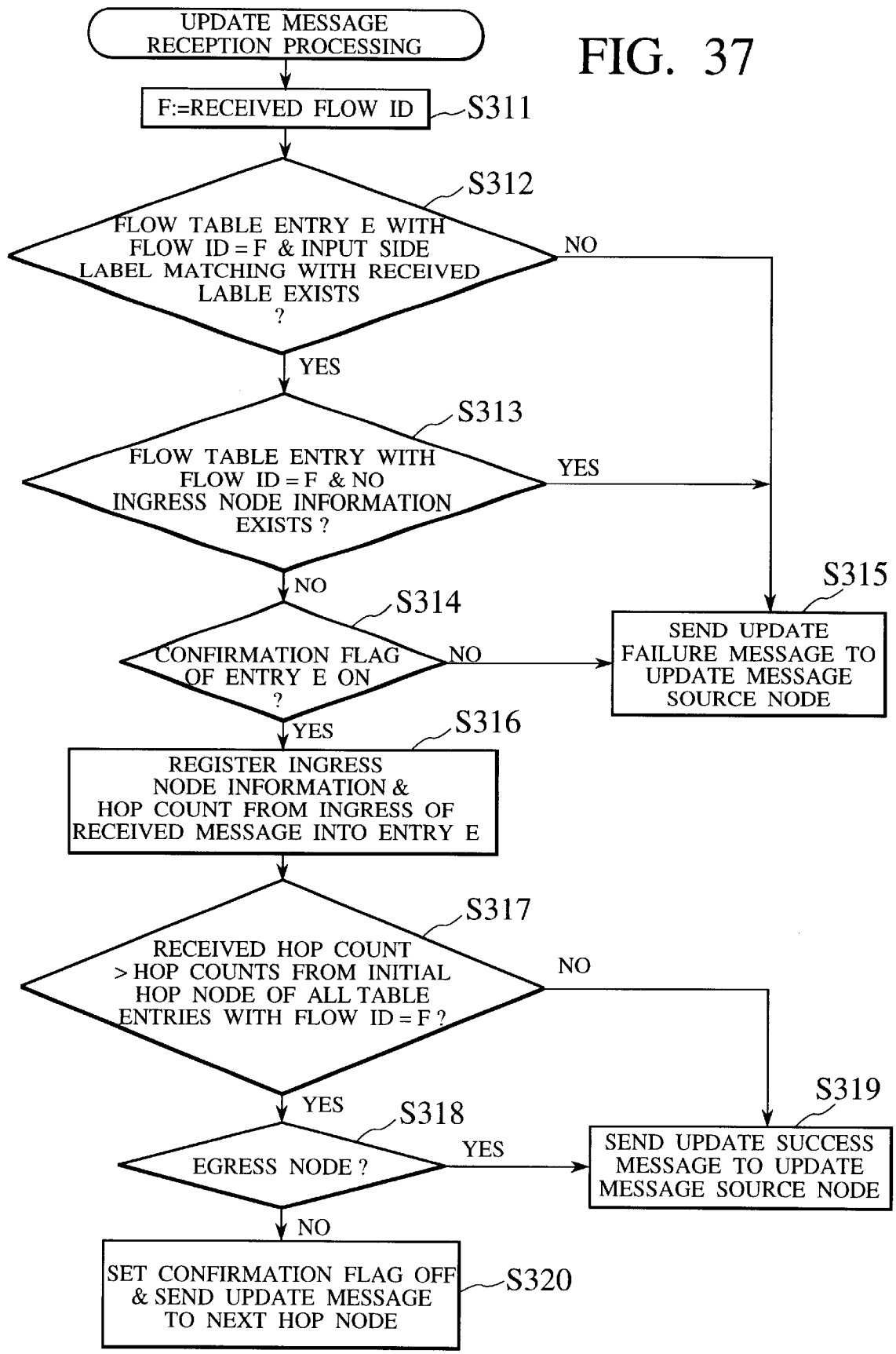
FIG. 37 is a flow chart for an exemplary operation of a node device according to the fifth embodiment of the present invention at a time of label allocation message reception.

Next, the operation procedure of the node that received the label allocation message in this fifth embodiment will be described with reference to FIG. 37.

Initially, the flow ID in the received message is set to be F (step S311).

Then, whether there exists a flow table entry E with flow ID=F and the input side label matching with the received label or not is checked (step S312). If no such entry exists, the update failure message is transmitted to the update message source node (step S315). If such an entry E exists, whether there exists a flow table entry with flow ID=F and no ingress node information or not is checked (step S313). If such an entry exists, the update failure message is transmitted to the update message source node (step S315). If no such entry exists, and if the confirmation flag of the entry E is OFF (step S314 NO), the update failure message is transmitted to the update message source node (step S315). If the confirmation flag of the entry E is ON (step S314 YES), the received ingress node information and hop count from the ingress node are registered into the entry E (step S316).

Next, whether the received hop count is greater than the hop counts from the ingress node of all the table entries with flow ID=F (other than the entry E) or not is checked (step S317). If not, the update success message is transmitted to the update message source node (step S319). Otherwise, whether it is the egress node itself or not is checked (step S318). If so, the update success message is transmitted to the update message source node (step S319).

Otherwise, the confirmation flag is turned OFF and the update message is transmitted to the next hop node (step S320).

Next, the case of transmitting the update message for the purpose of the loop detection into a direction opposite to that of the path in the fourth and fifth embodiments will be described.

In this case, the node that transmitted the label allocation message turns the confirmation flag OFF, and the node that was supposed to transmit the query message transmits the update message to the upstream side neighboring node for which the input side label exists and turns the confirmation flag OFF, instead of transmitting the query message. The update message is then successively forwarded to the upstream side neighboring nodes for which the input side labels exist, and when the update message is received by the node at which the confirmation flag is OFF, it is Judged that there is a loop and the update failure message is returned.

On the other hand, if the confirmation flag is ON when the ingress node receives the update message, the update success message is returned. When the update failure message is received from at least one upstream side neighboring node, the update failure message is returned to the downstream side neighboring node, and otherwise the update success message is returned. In either case the confirmation flag is turned ON.

At the node that initially transmitted the update message, when the update failure message is received, the label allocation failure message is transmitted to the downstream side neighboring node, whereas when the update success message is received, the label allocation success message is transmitted to the downstream side neighboring node. In either case the confirmation flag is turned ON.

The label switching becomes possible at the node that received the label allocation success message, whereas the node that received the label allocation failure message deletes the input side label. In either case the confirmation flag is turned ON.

For example, in FIG. 36, The node device R5 turns the confirmation flag OFF and transmits the label allocation message to the node device R5. Upon receiving the label allocation message from the node device R5, the node device R2 turns the confirmation flag OFF and transmits the update message to the node device R3. This update message is successively forwarded from the node device R3 to the node devices R4 and R6, from the node device R4 to the node device R5, from the node device R6 to the node device R7, and from the node device R7 to the node device R8. When the node device R5 receives the update message, it is judged that there is a loop because the confirmation flag is already OFF, and the update failure message is returned to the node device R4. Then the node device R4 returns the update failure message to the node device R3. On the other hand, the update success message is forwarded from the node device R8 to the node device R3. Then the node device R3 returns the update failure message to the node device R2. Upon receiving the update failure message, the node device R2 returns the label allocation failure message to the node device R5.

Next, the operation in the case of having a node that does not carry out the label merging in the fourth and fifth embodiments will be described.

In this case, the label field is divided into the flow identification field and the ingress identification field at each node. The flow identification field is used for identifying the flow, while the ingress identification field is used in identifying the ingress node for each flow.

The label switched path generation procedure is basically the same as in the fourth and fifth embodiments described above, except that the node which does not carry out the label merging specifies a value only to the flow identification field of the label, without specifying any value to the ingress identification field of the label, in the label allocation message. Such a label will be referred to as "half allocation label". The node that carries out the label merging specifies values for both the flow identification field and the ingress identification field of the label in the label allocation message. Such a label will be referred to as "full allocation label". In order to distinguish the half allocation label and the full allocation label, one bit of the label is used.

When the label allocation message with the half allocation label specified arrives at the ingress node, the allocation of the full allocation label is carried out, and the allocated label is notified from the ingress node toward the egress node. For this notification, the update message is used. When the update message is received, if the full allocation label in the message is not yet registered, the received full allocation label is registered as the input side label, and the allocation of the output side full allocation label corresponding to the input side label is carried out, and then the update message containing the output side full allocation label is transmitted to the downstream side neighboring node.

In addition, in the case where the node that received the label allocation message with the half allocation label specified transmits the query message to the next hop node, in correspondence to each input side full allocation label allocated to the flow, the output side full allocation label using a value of the flow identification field in the message as a value of the flow identification field is allocated, and the query message containing the allocation output side label is transmitted for each allocated output side label.

Also, in the case where the update message is transmitted from the upstream to the downstream and the node that received the query message transmits the update message, in correspondence to the full allocation label written in the query message, the output side full allocation label using a value of the flow identification field in the message as a value of the flow identification field is allocated, and this is written into the update message. Also, in the case where the node that received the update message transmits the update message, in correspondence to the full allocation label written in the update message, the output side full allocation label using a value of the flow identification field in the message as a value of the flow identification field is allocated, and this is written into the update message.

For example, in FIG. 29, assuming that every node does not carry out the label merging, the node device R2 transmits two query messages including the query message that contains the full allocation label that was allocated for the path whose ingress node is the node device R5 and the query message that contains the full allocation label that was allocated for the path whose ingress node is the node device R6. Also, the node devices R5, R4 and R3 respectively transmits to the node devices R4, R3 and R2 the update message that contains the full allocation label that was allocated for the path whose ingress node is the node device R5, and the update message that contains the full allocation label that was allocated for the path whose ingress node is the node device R6.

On the other hand, in the case where the update message is transmitted from the downstream to the upstream and the node transmits the update message, the already allocated half allocation label is written into the update message.

Note that, for the half allocation message, both the Upstream label allocation and the Downstream label allocation are possible, whereas for the full allocation label, the Upstream label allocation is preferable.

Also, in the case of using VPI/VCI as the label, VPI or VCI is used as the flow identification field or the ingress identification field.

Next, the case of generating the label switched path for multipath in the Egress control will be described.

In the case of generating the label switched path for multipath, at a branching node of the multipath, separate labels are registered for the label allocation messages from the respective downstream side neighboring nodes of the multipath, and the separate label allocation messages are transmitted to the respective upstream side neighboring nodes.

Also, when one route of the multipath is deleted, the label release messages for releasing the label switched path corresponding to the deleted route are transmitted to the respective upstream side neighboring nodes. The label release message is forwarded to the ingress node.

Next, the exemplary message format to be used in the fourth and fifth embodiments will be described.

The format for the label allocation message, the label allocation success message, the label allocation failure message, the label release message, the label release success message, the label release failure message, the update message, the update success message, and the update failure message is the same as that shown in FIG. 11 or FIG. 12, except that the label value is to be specified in the update message, the update success message, and the update failure message. Also, the format for the query message and the query success message is the same as that shown in FIG. 11, and the format for the query failure message is the same as that shown in FIG. 12, except that the label value is to be specified in these messages. In addition, in these messages, the field for the ingress node information or the hop count may be omitted in the case of not using the ingress node information or the hop count.

Also, the format for the label allocation trigger message can be obtained by omitting the fields for the ingress node address, the ingress node local ID, the hop count, the label, and the request ID from the format shown in FIG. 11.

Next, an exemplary configuration of the node device according to the present invention will be described with reference to FIG. 38.

Figure 38:
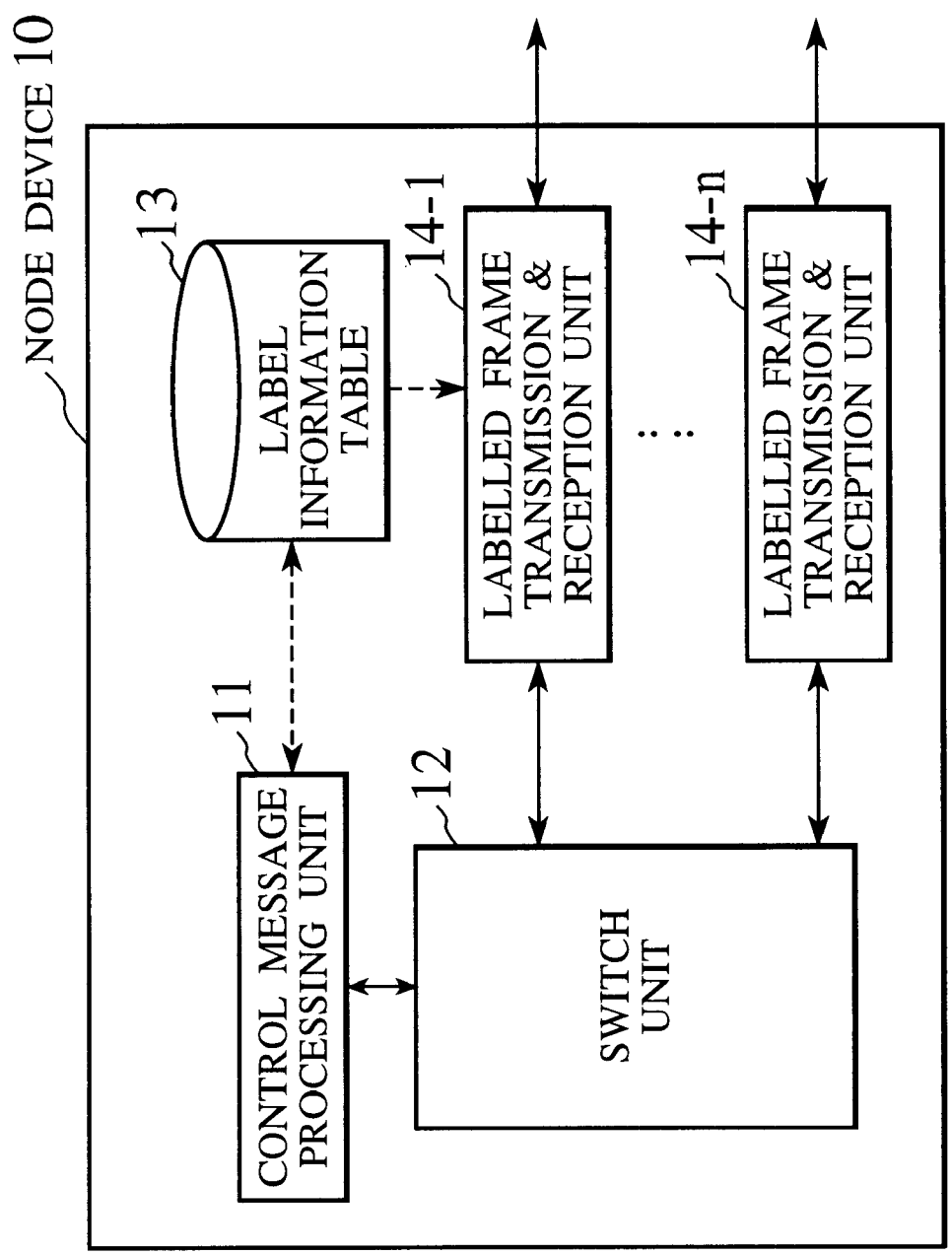
FIG. 38 is a block diagram showing an exemplary configuration of a node device according to the present invention.

The node device 10 of FIG. 38 comprises a control message processing unit 11, a switch unit 12, a label information table 13, and a plurality of labelled frame transmission and reception units 14-1 to 14-n.

In this node device 10, the labelled frames are entered from external devices, switched at the switch unit 12, and then outputted to the external devices.

Each labelled frame transmission and reception unit 14 enters the labelled frame from the external device or the switch unit 12, refers to the label value written in the header of the frame, and if necessary, carries out the rewriting of the header of the labelled frame and the attaching/removing of an internal header which is necessary in switching frames at the switch unit 12, according to the label information stored in the label information table 13, and then outputs the labelled frame to the switch unit 12 or the external device.

The switch unit 12 is a unit for switching and outputting the labelled frame received from one labelled frame transmission and reception unit 14 to another labelled frame transmission and reception unit 14 or the control message processing unit 11 according to the internal header information.

The control message processing unit 11 carries the protocol message processing used for the purpose of the label allocation/release and the label switched path loop detection, as well as reading/writing of information with respect to the label information table according to the need.

The label information table 13 stores the flow table containing information on the input side label and the output side label.

As described, according to the present invention, it becomes possible to detect a loop quicker than the conventional method using the hop count. Also, according to the present invention, it becomes possible to detect a loop quickly even in the case of using the label merging.

Note that the above description is mainly directed to an exemplary case where it is judged that there is a loop when the label allocation or update message having the same ingress node information for the same packet flow as the previously received label allocation or update message is received in relation to a different input link (received from a different previous hop node or received as a message with a different input side label), but it is possible to loosen this loop judgement condition such that there can be cases where it is not judged that there is a loop even when the above condition is satisfied.

Similarly, for the case of using the confirmation flag, the above description is mainly directed to an exemplary case where it is judged that there is a loop when the label allocation/update message is received for the packet flow for which the state is pending, but it is also possible to loosen this loop judgement condition by using additional information contained in the message as well.

In these variations, when the label allocation/update message is received, whether this message contains the same flow ID and the same ingress node information as the previously received label allocation/update message and is related to the different input link or not, or whether this message contains the same flow ID as the previously received label allocation/update message that is in the state of pending or not, is utilized as at least a part of criteria for judging whether there is a loop or not, similarly as in the embodiments described above, so that these variations should also be properly construed as contained in the scope of the present invention.

Also, the above description is mainly directed to an exemplary case where the failure message (NACK) is returned when it is judged that there is a loop, but it is possible to modify this processing variously (not returning ACK rather than returning NACK, for example), and these variations should also be properly construed as contained in the scope of the present invention.

Note also that the above description presupposes the hard state type protocol in which the label allocation message is not transmitted to the path to which the label is allocated once, but the present invention is also effective for the soft state type protocol in which the label allocation message is transmitted regularly even for the path to which the label is allocated once. In the case of the soft state type protocol, the label is released when the label allocation message is not received for a prescribed period of time.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the node device in any of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An article of manufacture, comprising:
   a computer usable medium having computer readable program code means embodied therein for causing a computer to function as a node device for label switching entered packets by referring to an input label information capable of identifying a packet flow to be entered and a corresponding information for specifying at least an output side interface, the computer readable program code means includes:
   first computer readable program code means for causing said computer to store a flow ID capable of network globally identifying a packet flow and an ingress node information regarding an ingress node of a label switched path, according to one label allocation message requesting a setup of the label switched path which is received from one previous hop node; and
   second computer readable program code means for causing said computer to judge whether a label switched path loop is formed or not according to from which node another label allocation message that contains an identical flow ID and an identical ingress node information as said one label allocation message is received.

2. An article of manufacture, comprising:
   a computer usable medium having computer readable program code means embodied therein for causing a computer to function as a node device for transmitting packets to be label switched using an output label information capable of identifying a packet flow to be outputted, the computer readable program code means includes:
   first computer readable program code means for causing said computer to transmit a label allocation message requesting a set up of a label switched path that contain at least an information on said node device as an ingress node information regarding an ingress node of the label switched path; and
   second computer readable program code means for causing said computer to judge that a label switched path loop is formed upon receiving a label allocation message in which the ingress node information specifies said node device as the ingress node.

3. An article of manufacture, comprising:
   a computer usable medium having computer readable program code means embodied therein for causing a computer to function as a node device for label switching entered packets by referring to an input side label information capable of identifying a packet flow to be entered and a corresponding output label information capable of identifying the packet flow to be outputted, the computer readable program code means includes:
   first computer readable program code means for causing said computer to exchange with a neighboring node on a route of one packet flow a label allocation message requesting a set up of a label switched path which contains a flow ID capable of network globally identifying said one packet flow and an ingress node information regarding an ingress node of the label switched path; and second computer readable program code means for causing said computer to judge whether a label switched path loop is formed or not, when a label allocation message that contains a flow ID and an ingress node information that are matching with an existing label switched path is received, according to a change in the input side label information for the existing label switched path.

4. An article of manufacture, comprising:

a computer usable medium having computer readable program code means embodied therein for causing a computer to function as a node device for label switching entered packets by referring to an input side label information capable of identifying a packet flow to be entered and corresponding one or a plurality of output label information capable of identifying the packet flow to be outputted, the computer readable program code means includes:

first computer readable program code means for causing said computer to exchange with each one of a previous hop node and one or a plurality of next hop nodes on a route of one packet flow a label allocation message requesting a set up of a label switched path which contains an identifier for identifying said one packet flow and an ingress node information regarding an ingress node of the label switched path; and second computer readable program code means for causing said computer to detect whether or not a message containing an identifier and an ingress node information that are identical to those of a previously exchanged message is received from a previous hop node different from one previous hop node from which the previously exchanged message is received, or whether or not a message that contains an identifier and an ingress node information that are identical to those of the previously exchanged message and changes the input side label information is received, and judge whether a label switched path loop is formed or not according to a result of detecting.

5. An article of manufacture, comprising:

a computer usable medium having computer readable program code means embodied therein for causing a computer to function as a node device for label switching entered packets by referring to one or a plurality of input side label information capable of identifying a packet flow to be entered and a corresponding output label information capable of identifying the packet flow to be outputted, the computer readable program code means includes:

first computer readable program code means for causing said computer to exchange with a neighboring node on a route of one packet flow a message for setting up a new label switched path or utilizing an existing label switched path, which contains an identifier for identifying said one packet flow and an ingress node information regarding an ingress node of the new label switched path or the existing label switched path; and second computer readable program code means for causing said computer to detect whether or not a message containing an identifier and an ingress node information that are identical to those of a previously exchanged message is received from a previous hop node device different from one previous hop node device from which the previously exchanged message is received, or whether or not a message that contains an identifier and an ingress node information that are identical to those of the previously exchanged message and changes the input side label information is received, and Judge whether a label switched path loop is formed or not according to a result of detections.

6. An article of manufacture, comprising:

a computer usable medium having computer readable program code means embodied therein for causing a computer to function as a node device for label switching entered packets by referring to an input side label information capable of identifying a packet flow to be entered and a corresponding output side label information capable of identifying the packet flow to be outputted, and for merging label switched paths by setting one output side label information and a plurality of input side label information in correspondence for one packet flow, the computer readable program code means includes:

first computer readable program code means for causing said computer to transmit to a next hop node in an existing label switched path a hop count update message that contains at least an ingress node information after merging and an updated hop count value, upon receiving one label allocation message requesting a set up of one label switched path that contains at least a given ingress node information regarding an ingress node of said one label switched path and a given hop count value, when said one label allocation message requires merging to the existing label switched path and the given hop count value makes a hop count value of the existing label switched path updated to a larger value than a current value; and second computer readable program code means for causing said computer to judge whether a label switched path loop is formed or not according to from which node another hop count update or label allocation message for an identical packet flow that contains an identical ingress node information as a previously received label allocation message is received.

7. An article of manufacture, comprising:

a computer usable medium having computer readable program code means embodied therein for causing a computer to function as a node device for label switching entered packets by referring to one or a plurality of input side label information capable of identifying a packet flow to be entered and a corresponding output label information capable of identifying the packet flow to be outputted, the computer readable program code means includes:

first computer readable program code means for causing said computer to exchange with a neighboring node on a route of one packet flow a message for setting up a new label switched path or utilizing an existing label switched path, which contains an identifier for identifying said one packet flow;

second computer readable program code means for causing said computer to store an information indicating a set up of a label switched path corresponding to said message as pending until a response message corresponding to said message is received; and third computer readable program code means for causing said computer to Judge whether a label switched path loop is formed or not according to whether or not a message regarding a label switched path for which the information indicating pending is stored in the memory unit according to a previously exchanged message is received.

8. An article of manufacture, comprising:

a computer usable medium having computer readable program code means embodied therein for causing a computer to function as a node device for label switching entered packets by referring to an input side label information capable of identifying a packet flow to be entered and a corresponding output side label information capable of identifying the packet flow to be outputted, and for merging label switched paths by setting one output side label information and a plurality of input side label information in correspondence for one packet flow, the computer readable program code means includes:

first computer readable program code means for causing said computer to transmit to a next hop node in an existing label switched path a hop count update message that contains at least an updated hop count value, upon receiving one label allocation message requesting a set up of one label switched path that contains at least a given hop count value, when said one label allocation message requires merging to the existing label switched path and the given hop count value makes a hop count value of the existing label switched path updated to a larger value than a current value;

second computer readable program code means for causing said computer to store a correspondence between the input side label information and the output side label information for said one packet flow according to said one label allocation message, and storing an information indicating a storing of the correspondence as pending until a success message corresponding to the hop count update message is received; and third computer readable program code means for causing said computer to Judge whether a label switched path loop is formed or not according to whether or not a hop count update or label allocation message indicating a packet flow or a correspondence between the input side label information and the output side label information for which the information indicating the storing of the correspondence as pending is stored in the memory unit according to a previously received label allocation message is received.

* * * * *